(12) United States Patent
Lane et al.

(10) Patent No.: US 12,465,678 B2
(45) Date of Patent: Nov. 11, 2025

(54) SYSTEMS, APPARATUS, AND METHODS FOR FLUID INFUSION

(71) Applicant: 410 Medical, Inc., Research Triangle Park, NC (US)

(72) Inventors: Andrew W. Lane, Rolesville, NC (US); Galen C. Robertson, Apex, NC (US); Savannah K. Steele, Durham, NC (US); Robert W. Titkemeyer, Chesterfield, MO (US); Luke D. Oltmans, Durham, NC (US); Matthew J. Hanlon, Clifton, VA (US); Scott Cooper, Los Angeles, CA (US)

(73) Assignee: 410 Medical, Inc., Durham, NC (US)

( * ) Notice: Subject to any disclaimer, the term of this patent is extended or adjusted under 35 U.S.C. 154(b) by 0 days.

(21) Appl. No.: 19/066,915

(22) Filed: Feb. 28, 2025

(65) Prior Publication Data

US 2025/0195749 A1 Jun. 19, 2025

Related U.S. Application Data

(63) Continuation of application No. PCT/US2024/046808, filed on Sep. 13, 2024, which
(Continued)

(51) Int. Cl.
*A61M 5/142* (2006.01)
*A61M 1/02* (2006.01)
(Continued)

(52) U.S. Cl.
CPC ...... *A61M 5/14216* (2013.01); *A61M 1/0281* (2013.01); *A61M 5/1454* (2013.01);
(Continued)

(58) Field of Classification Search
CPC .......... A61M 2205/12; A61M 5/14216; A61M 1/0281; A61M 5/16813; A61M 5/365
See application file for complete search history.

(56) References Cited

U.S. PATENT DOCUMENTS 4,065,230 A 12/1977 Gezari
4,379,452 A * 4/1983 DeVries .............. A61M 1/3693
604/6.11
(Continued)

FOREIGN PATENT DOCUMENTS

EP 3854432 A1 7/2021
WO WO-2008024814 A2 2/2008
(Continued)

OTHER PUBLICATIONS

International Search Report and Written Opinion for International Application No. PCT/US2024/046808 mailed Jan. 24, 2025, 19 pages.
(Continued)

*Primary Examiner* — Bradley J Osinski
(74) *Attorney, Agent, or Firm* — COOLEY LLP

(57) ABSTRACT

In some embodiments, a system can include a fluid delivery assembly and a motor drive assembly. The fluid delivery assembly is configured to be releasably mechanically and, optionally, electrically coupled to the motor drive assembly. When the fluid delivery assembly is releasably coupled to the motor drive assembly, the motor drive assembly can control delivery of fluid from the fluid delivery assembly (e.g., to a patient). For example, the motor drive assembly can be releasably coupled to the fluid delivery assembly to control delivery of fluid from the fluid delivery assembly to provide continuous (e.g., non-pulsatile) fluid flow from the fluid delivery assembly.

20 Claims, 36 Drawing Sheets

Related U.S. Application Data is a continuation-in-part of application No. 18/771,867, filed on Jul. 12, 2024, now abandoned.

(60) Provisional application No. 63/632,515, filed on Apr. 10, 2024, provisional application No. 63/583,181, filed on Sep. 15, 2023.

(51) Int. Cl.
*A61M 5/145* (2006.01)
*A61M 5/168* (2006.01)
*A61M 5/36* (2006.01)
*A61M 5/44* (2006.01)

(52) U.S. Cl.
CPC .... *A61M 5/14546* (2013.01); *A61M 5/16813* (2013.01); *A61M 5/365* (2013.01); *A61M 5/445* (2013.01); *A61M 2205/12* (2013.01); *A61M 2205/3344* (2013.01); *A61M 2205/8237* (2013.01)

(56) References Cited

U.S. PATENT DOCUMENTS

| | | | |
|---|---|---|---|
| 4,808,077 A | 2/1989 | Kan et al. | |
| 4,919,649 A | 4/1990 | Timothy et al. | |
| 5,304,147 A | 4/1994 | Johnson et al. | |
| 5,389,070 A | 2/1995 | Morell | |
| 5,840,068 A | 11/1998 | Cartledge | |
| 5,865,805 A | 2/1999 | Ziemba | |
| 6,142,974 A | 11/2000 | Kistner et al. | |
| 6,257,265 B1 | 7/2001 | Brunner et al. | |
| D447,558 S | 9/2001 | Cartledge et al. | |
| D462,121 S | 8/2002 | Cartledge et al. | |
| 6,554,791 B1 | 4/2003 | Cartledge et al. | |
| 7,160,087 B2 | 1/2007 | Fathallah et al. | |
| 7,553,294 B2 | 6/2009 | Lazzaro et al. | |
| 7,563,248 B2 | 7/2009 | Smisson, III et al. | |
| 7,570,314 B2 | 8/2009 | Lee | |
| 7,637,279 B2 | 12/2009 | Amley et al. | |
| 7,670,315 B2 | 3/2010 | Cowan et al. | |
| 7,753,885 B2 | 7/2010 | Duchon et al. | |
| 7,819,835 B2 | 10/2010 | Landy et al. | |
| 7,846,130 B2 | 12/2010 | Elazari-Volcani et al. | |
| 7,951,112 B2 | 5/2011 | Patzer | |
| 7,975,491 B2 | 7/2011 | Smisson, III et al. | |
| 8,079,981 B2 | 12/2011 | Vishnia et al. | |
| 8,133,203 B2 | 3/2012 | Hack | |
| 8,142,397 B2 | 3/2012 | Patzer | |
| 8,387,963 B2 | 3/2013 | Moutafis | |
| 8,425,486 B2 | 4/2013 | Smisson et al. | |
| 8,574,200 B2 | 11/2013 | Hack | |
| 9,057,363 B2 | 6/2015 | Capone et al. | |
| 9,107,986 B2 | 8/2015 | Bonnette et al. | |
| 9,192,711 B2 | 11/2015 | Barnes | |
| 9,220,835 B2 | 12/2015 | Cane' | |
| 9,267,498 B2 | 2/2016 | Kolln | |
| 9,295,778 B2 | 3/2016 | Kamen et al. | |
| 10,004,846 B2 | 6/2018 | Bonnette et al. | |
| 10,016,564 B2 | 7/2018 | Piehl et al. | |
| 10,322,227 B2 | 6/2019 | Piehl et al. | |
| 10,391,257 B2 | 8/2019 | Piehl et al. | |
| 10,661,029 B2 | 5/2020 | Robertson et al. | |
| 10,780,258 B2 | 9/2020 | Pettini et al. | |
| 11,458,256 B2 | 10/2022 | Piehl et al. | |
| 11,744,936 B2 | 9/2023 | Lane et al. | |
| 11,957,886 B2 | 4/2024 | Piehl et al. | |
| 2007/0173753 A1* | 7/2007 | Paul | A61M 1/3603 604/4.01 |
| 2008/0097291 A1 | 4/2008 | Hanson et al. | |
| 2011/0313351 A1 | 12/2011 | Kamen et al. | |
| 2014/0309612 A1 | 10/2014 | Smisson, III et al. | |
| 2015/0120105 A1 | 4/2015 | Naqvi et al. | |
| 2017/0021951 A1 | 1/2017 | Teague | |
| 2018/0296752 A1 | 10/2018 | Bonnette et al. | |
| 2018/0353678 A1* | 12/2018 | Adams | A61M 5/14228 |
| 2019/0365567 A1 | 12/2019 | Balkenbush et al. | |
| 2019/0374724 A1 | 12/2019 | Piehl et al. | |
| 2020/0001022 A1 | 1/2020 | Landy, III et al. | |
| 2020/0016317 A1 | 1/2020 | Kelly et al. | |
| 2020/0061273 A1* | 2/2020 | Hogard | A61M 1/1656 |
| 2020/0188586 A1 | 6/2020 | Sims et al. | |
| 2020/0230304 A1 | 7/2020 | Field et al. | |
| 2020/0282135 A1 | 9/2020 | Breitweiser et al. | |
| 2021/0060237 A1 | 3/2021 | Pedroni et al. | |
| 2022/0313901 A1* | 10/2022 | Lane | A61M 5/14216 |
| 2022/0362447 A1* | 11/2022 | Narayana | A61M 1/159 |

FOREIGN PATENT DOCUMENTS

| | | |
|---|---|---|
| WO | WO-2022192285 A1 | 9/2022 |
| WO | WO-2023230585 A2 | 11/2023 |
| WO | WO-2025059603 A1 | 3/2025 |

OTHER PUBLICATIONS

Invitation to Pay Additional Fees and, Where Applicable, Protest Fee for International Application No. PCT/US2024/046808, dated Nov. 19, 2024, 3 pages.

* cited by examiner

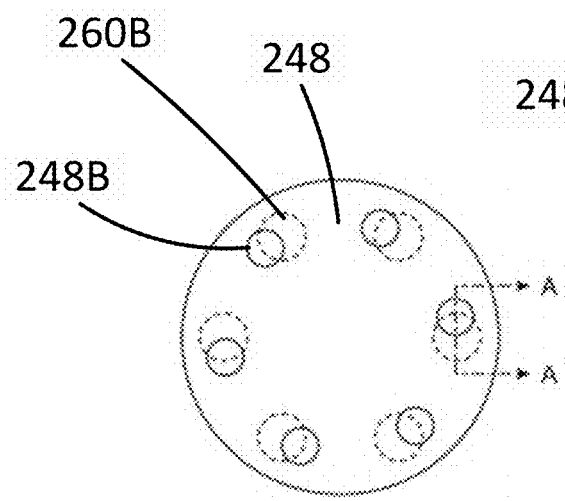
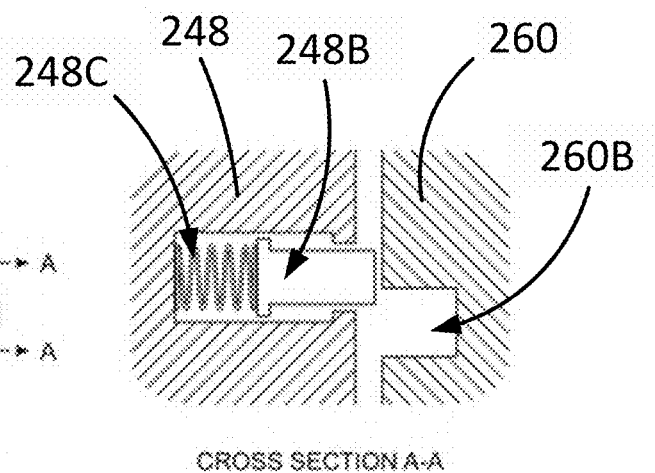
FIG. 16A
FIG. 16B
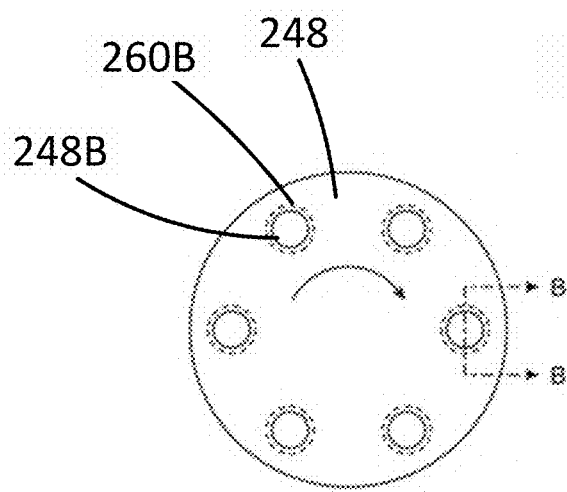
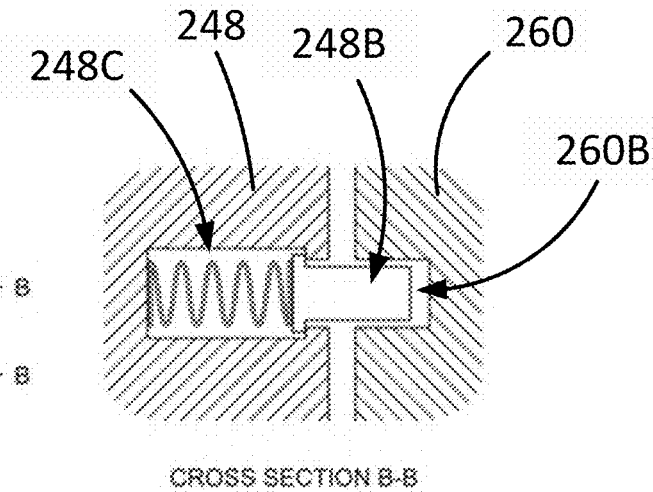
FIG. 17A
FIG. 17B

SYSTEMS, APPARATUS, AND METHODS FOR FLUID INFUSION

CROSS-REFERENCE TO RELATED APPLICATIONS

This application is a continuation of International Patent Application No. PCT/US2024/046808, filed Sep. 13, 2024 and entitled "Systems, Apparatus, and Methods for Fluid Infusion," which is a continuation-in-part of and claims priority to U.S. non-provisional application Ser. No. 18/771,867, filed Jul. 12, 2024 and entitled "Systems, Apparatus, and Methods for Fluid Infusion," which claims priority to and the benefit of U.S. provisional application No. 63/632,515, filed Apr. 10, 2024 and entitled "Systems, Apparatus, and Methods for Fluid Infusion," and U.S. provisional application No. 63/583,181, filed Sep. 15, 2023 and entitled "Systems, Apparatus, and Methods for Fluid Infusion," and said International Patent Application No. PCT/US2024/046808 claims priority to and the benefit of U.S. provisional application No. 63/632,515, filed Apr. 10, 2024 and entitled "Systems, Apparatus, and Methods for Fluid Infusion," and U.S. provisional application No. 63/583,181, filed Sep. 15, 2023 and entitled "Systems, Apparatus, and Methods for Fluid Infusion," the entire contents of each of which are incorporated by reference herein for all purposes.

STATEMENT REGARDING RESEARCH AND DEVELOPMENT

This invention was made with government support under Contract No. W81XWH-22-C-0002 awarded by SOCOM (Special Operations Command). The government has certain rights in the invention.

BACKGROUND

Many medical conditions require the delivery of intravenous fluids and/or blood products, and some conditions, such as hemorrhagic shock, require rapid delivery of the fluids and blood products. Rapid infusers are typically bulky and complex to set up and use. Additionally, rapid infusers typically are not easily portable and operate to infuse and/or warm fluids based on power provided via a wired connection with a wall outlet. Thus, typical rapid infusers are not designed for and/or capable of warming and rapid infusion of large volumes of fluid during transit of a patient, such as on an ambulance or a medical helicopter. Additionally, rapid infusers are typically limited in the amount of pressure they can generate (e.g., to 300 mmHg) due to the types of mechanisms they use to generate pressure (external pressurization of the intravenous (IV) bag, peristaltic pump). While they may be able to deliver fluids and blood quickly through large-bore IV access (upwards of 1000 mL/min), typical rapid infusers have limited flow rates through peripheral IVs. Furthermore, single-syringe pumps used for fluid delivery require a period of zero flow between syringe ejections while the syringe is filled with fluid, resulting in a highly-pulsatile pressure profile which limits flow rate and has higher pressures during peak flow.

Therefore, there is a need for systems, apparatus, and methods for fluid infusion that allow for easy transportation, simple set up and user control, continuous fluid flow at high flow rates through peripheral IV sites, and fluid warming. Specifically, there is a need for systems, apparatus, and methods for intravenous fluid warming that is energy efficient, consistent, and effective at high fluid flow rates, while also being portable and allowing for quick and simple set up.

SUMMARY

In some embodiments, a system can include a fluid delivery assembly and a motor drive assembly. The fluid delivery assembly is configured to be releasably mechanically and, optionally, electrically coupled to the motor drive assembly. When the fluid delivery assembly is releasably coupled to the motor drive assembly, the motor drive assembly can control delivery of fluid from the fluid delivery assembly (e.g., to a patient). For example, the motor drive assembly can be releasably coupled to the fluid delivery assembly to control delivery of fluid from the fluid delivery assembly to provide continuous (e.g., non-pulsatile) fluid flow from the fluid delivery assembly.

BRIEF DESCRIPTION OF THE DRAWINGS

FIGS. 4-23 are views of various implementations of a system 200 and components thereof, according to an embodiment.

DETAILED DESCRIPTION

Figure 1:
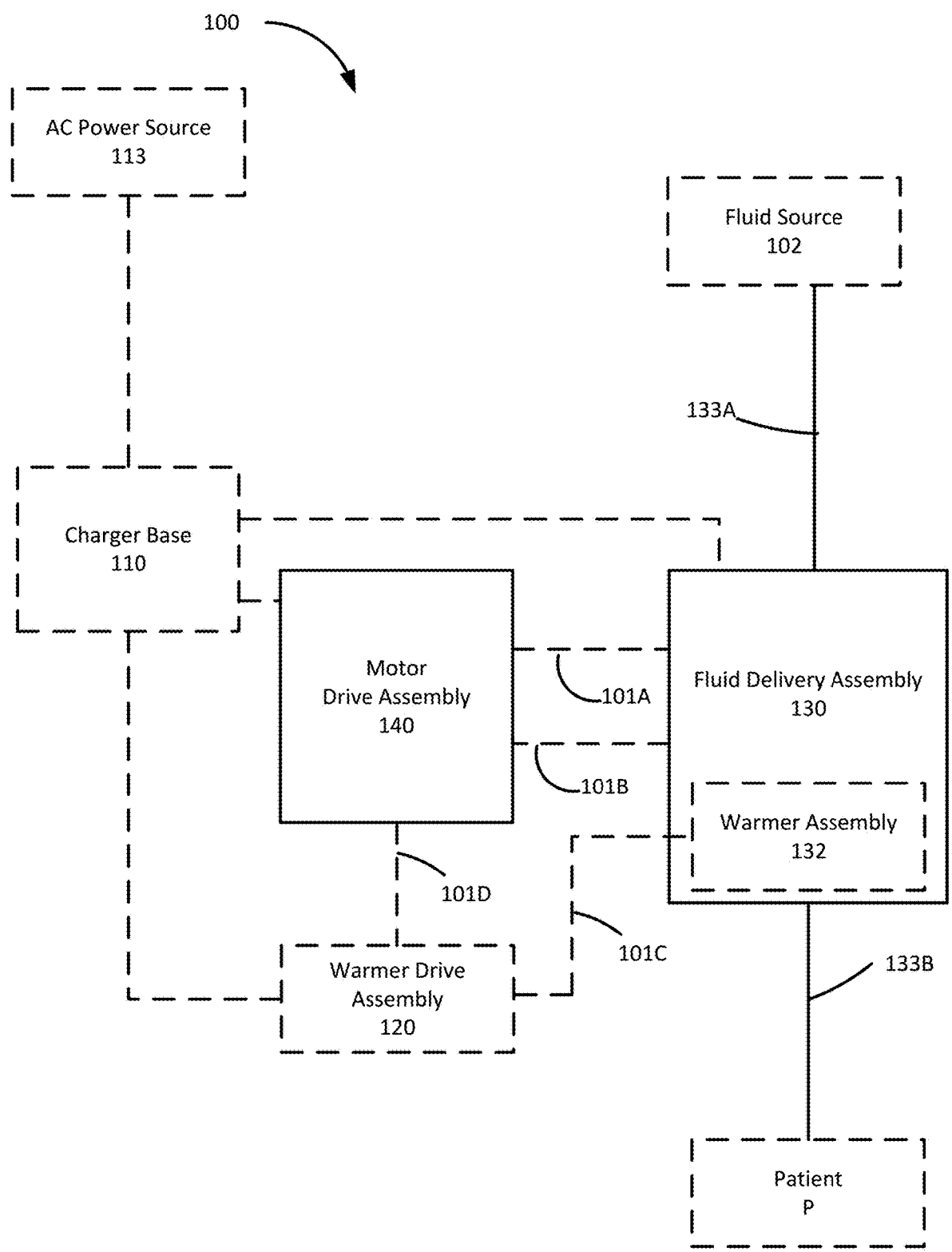
FIG. 1 is a schematic illustration of a system 100, according to an embodiment.

Systems, apparatus, and methods for fluid infusion are described herein. In some embodiments, the systems include a small, portable rapid infuser for IV fluids and/or blood administration. Many medical conditions require the delivery of intravenous fluids and/or blood products, and some conditions, such as hemorrhagic shock, require rapid delivery of the fluids and blood products. Unlike many other rapid infusers that are bulky and complex to set up and use, the systems, apparatus, and methods described herein allow for handheld, portable use and simple setup with a single-action connection between a reusable portion of the device or system and a disposable portion of the device or system (e.g., a portion including or coupled to intravenous (IV) tubing). The ability to connect the reusable portion with the disposable portion via a single action connection reduces both time and complexity for the user, which is valuable in a trauma or other time-critical medical procedures.

In some embodiments, the systems described herein are configured for easy and fast set up and have a sufficiently small size such that the systems can be used, for example, in an ambulance or a medical helicopter. In some embodiments, the systems described herein can be used to optionally warm and rapidly infuse several units of blood into a subject. In some embodiments, the systems described herein (e.g., a portable rapid infuser), after infusing a first volume of blood into a subject, can be set into a wall-powered base unit and continue to infuse additional units of blood (e.g., to provide a massive transfusion to the subject).

In some embodiments, the techniques described herein relate to a system, including: a motor drive assembly including a pump motor, a first torque transmission mechanism operably coupled to and rotatable by the pump motor, a recirculation motor, and a second torque transmission mechanism operably coupled to and rotatable by the recirculation motor, the first torque transmission mechanism and the second torque transmission mechanism forming a portion of an exterior surface of the motor drive assembly; and a fluid delivery assembly including a fluid pump, a first torque receiving mechanism operably coupled to the fluid pump such that rotation of the first torque receiving mechanism causes the fluid pump to dispense fluid, a valve, and a second torque receiving mechanism operably coupled to the valve such that rotation of the second torque receiving mechanism causes the valve to transition between a fluid dispensing configuration and a fluid recirculation configuration, the first torque receiving mechanism and the second torque receiving mechanism forming a portion of an exterior surface of the fluid delivery assembly, the fluid delivery assembly configured to be coupled to the motor drive assembly such that, simultaneously, the first torque transmission mechanism is removably coupled to the first torque receiving mechanism and the second torque transmission mechanism is removably coupled to the second torque receiving mechanism, the first torque transmission mechanism being configured to removably mate with the first torque receiving mechanism such that rotation of the first torque transmission mechanism causes rotation of the first torque receiving mechanism, the second torque transmission mechanism being configured to removably mate with the second torque receiving mechanism such that rotation of the second torque transmission mechanism causes rotation of the second torque receiving mechanism.

In some embodiments, the techniques described herein relate to a system, including: a motor drive assembly including a pump motor, a torque transmission mechanism operably coupled to and rotatable by the pump motor, the torque transmission mechanism forming a portion of an exterior surface of the motor drive assembly; and a fluid delivery assembly including a fluid pump, a torque receiving mechanism operably coupled to the fluid pump such that rotation of the torque receiving mechanism causes the fluid pump to dispense fluid, the torque receiving mechanism forming a portion of an exterior surface of the fluid delivery assembly, the torque transmission mechanism being configured to be aligned in a mating orientation with the torque receiving mechanism such that rotation of the torque transmission mechanism causes rotation of the torque receiving mechanism, the fluid delivery assembly configured to be coupled to the motor drive assembly such that the torque transmission mechanism is removably coupled to the torque receiving mechanism in a non-mating orientation, the torque transmission mechanism configured to rotate relative to the torque receiving mechanism from the non-mating orientation to the mating orientation while a housing of the fluid delivery assembly is fixedly coupled to a housing of the motor drive assembly.

In some embodiments, the techniques described herein relate to a method, including: coupling a torque receiving mechanism of a fluid delivery assembly to a torque transmission mechanism of a motor drive assembly such that the torque receiving mechanism is disposed coaxially with the torque transmission mechanism via translating the fluid delivery assembly relative to the motor drive assembly; and with the fluid delivery assembly fixedly coupled to the motor drive assembly, initiating operation of the motor drive assembly such that a motor of the motor drive assembly rotates the torque transmission mechanism relative to the torque receiving mechanism to align each pin from a plurality of pins of the torque transmission mechanism with a respective receiving hole from a plurality of receiving holes defined by the torque receiving mechanism, the pins from the plurality of pins configured to automatically extend into the respective receiving holes of the plurality of receiving holes upon alignment such that further rotation of the torque transmission mechanism causes corresponding rotation of the torque receiving mechanism and operation of a fluid pump of the fluid delivery assembly coupled to the torque receiving mechanism.

In some embodiments, the techniques described herein relate to a method, including: initiating, by a processor, operation of a pump motor coupled to a first torque coupler to rotate the first torque coupler to cause a fluid pump coupled to the first torque coupler to operate to deliver fluid, the first torque coupler including a first torque transmission mechanism and a first torque receiving mechanism configured to be releasably coupled to the first torque transmission mechanism, each of the processor, the pump motor, and the first torque transmission mechanism included in a motor drive assembly, each of the first torque receiving mechanism and the fluid pump included in a fluid delivery assembly; and initiating, by the processor in response to an air sensor operably coupled to the processor sensing a presence of air within a tubing portion of the fluid delivery assembly, operation of a recirculation motor coupled to a second torque coupler to rotate the second torque coupler to cause a valve mechanically coupled to the second torque coupler and fluidically coupled to the fluid pump to transition from a dispensing configuration to a recirculation configuration, the second torque coupler including a second torque transmission mechanism and a second torque receiving mechanism configured to be releasably coupled to the second torque transmission mechanism, each of the recirculation motor, the second torque transmission mechanism, and the air sensor included in the motor drive assembly, each of the second torque receiving mechanism and the valve included in the fluid delivery assembly.

In some embodiments, the techniques described herein relate to a system, including: a housing; a pump motor disposed within the housing; a first torque transmission mechanism operably coupled to and rotatable by the pump motor; a recirculation motor disposed within the housing; and a second torque transmission mechanism operably coupled to and rotatable by the recirculation motor, the first torque transmission mechanism and the second torque transmission mechanism accessible from an exterior of the housing and configured to be releasably coupled to a first torque receiving mechanism and a second torque receiving mechanism, respectively, of a fluid delivery assembly such that rotation of the first torque transmission mechanism by the pump motor causes the first torque receiving mechanism to rotate and a fluid pump of the fluid delivery assembly operatively coupled to the first torque receiving mechanism to operate and such that rotation of the second torque transmission mechanism by the recirculation motor causes the second torque receiving mechanism to rotate and a valve coupled to the second torque receiving mechanism to transition from a fluid delivery configuration and a fluid recirculation configuration.

In some embodiments, the techniques described herein relate to a system, including: a housing; a fluid pump disposed within the housing; a first torque receiving mechanism operably coupled to the fluid pump such that rotation of the first torque receiving mechanism causes the fluid pump to dispense fluid; a valve disposed within the housing; and a second torque receiving mechanism operably coupled to the valve such that rotation of the second torque receiving mechanism causes the valve to transition between a fluid dispensing configuration and a fluid recirculation configuration, the first torque receiving mechanism and the second torque receiving mechanism accessible from an exterior of the housing and configured to be releasably coupled to a first torque transmission mechanism and a second torque transmission mechanism, respectively, of a motor drive assembly such that rotation of the first torque transmission mechanism causes the first torque receiving mechanism to rotate and the fluid pump to operate and such that rotation of the second torque transmission mechanism causes the second torque receiving mechanism to rotate and the valve coupled to the second torque receiving mechanism to transition between a fluid delivery configuration and a fluid recirculation configuration.

FIG. 1 is a schematic illustration of a system 100 (also referred to as an infusion mechanism, an infuser, or a rapid infuser). In some embodiments, the system 100 can be a dual reservoir infuser. The system 100 can include a fluid delivery assembly 130 (also referred to as a disposable tubing assembly, a disposable cartridge assembly, or a cartridge) and a motor drive assembly 140 (also referred to as a reusable drive unit or a drive assembly). The fluid delivery assembly 130 is configured to be releasably mechanically and, optionally, electrically coupled to the motor drive assembly 140. For example, the fluid delivery assembly 130 can be coupled to the motor drive assembly 140 via one or more mechanical couplings 101A (including drive engagement components, retention components, and/or alignment components) and one or more electrical couplings 101B (configured for the transfer of power and/or data). Additionally, the motor drive assembly 140 can be configured to be releasably coupled to the fluid delivery assembly 130 (e.g., via a mechanical connection and/or contact) such that one or more sensors of the motor drive assembly 140 can sense one or more characteristics associated with the fluid delivery assembly 130 (e.g., one or more characteristics associated with fluid traveling through fluid pathways of the fluid delivery assembly 130, such as a pressure of the fluid or a presence of air bubbles within the fluid).

When the fluid delivery assembly 130 is releasably coupled to the motor drive assembly 140, the drive assembly 140 can operate to control delivery of fluid from the fluid delivery assembly 130 (e.g., to a patient P). For example, the motor drive assembly 140 can operate to cause the fluid delivery assembly 130 to deliver continuous (e.g., non-pulsatile) fluid flow from the fluid delivery assembly 130. In some embodiments, the motor drive assembly 140 can be the same as or similar in structure and/or function to any of the motor drive assemblies described herein. In some embodiments, the fluid delivery assembly 130 can be the same as or similar in structure and/or function to any of the fluid delivery assemblies described herein. Additionally, in some embodiments, any of the systems and/or assemblies described herein (e.g., the fluid delivery assembly 130 and/or the motor drive assembly 140) can be the same as or similar in structure and/or function to any of the systems and/or assemblies shown or described in International Patent Application No. PCT/US2022/019381, entitled Systems, Apparatus, and Methods for Fluid Infusion, filed on Mar. 8, 2022 (referred to herein as the '381 application), which is incorporated by reference herein in its entirety.

The fluid delivery assembly 130 can be configured to be fluidically coupled to a fluid source 102 via a fluid line 133A (also referred to as a fluid inlet line, a tubing, inlet tubing, fluid inlet tubing, and/or a tube) such that fluid can be drawn from the fluid source 102. The fluid source 102 can include one or more fluid containers (e.g., fluid bags) containing, for example, saline or blood. In some embodiments, the fluid source 102 can be included in the fluid delivery assembly 130 and/or the system 100. The fluid delivery assembly 130 can also include a fluid line 133B (also referred to as a fluid outlet line, a tubing, outlet tubing, fluid outlet tubing, and/or a tube) couplable to a patient P such that fluid can be expelled by the fluid delivery assembly 130 to the patient via the fluid line 133B. Each of the fluid line 133A and 133B can include or be coupled to any suitable fluid transfer component or combination of fluid transfer components such as tubing or tubes, catheters, fluid connectors, valves, chambers (e.g., recirculation chamber 104 described in more detail below), filters, and/or the like.

As shown in FIG. 1, the fluid delivery assembly 130 can optionally be coupled to or include a warmer assembly 132 (also referred to as a warmer) such that fluid delivered from the fluid delivery assembly 130 can be warmed (e.g., above a threshold temperature or to a temperature within a threshold temperature range) prior to and/or for delivery to the patient via the fluid line 133B. In some embodiments, the warmer assembly 132 can be the same as or similar in structure and/or function to any of the warmers shown or described in the '381 application, incorporated by reference above, and/or to any of the warmers shown or described in International Patent Application No. PCT/US2023/067515, entitled Systems, Apparatus, and Methods for Warming Fluid for Intravenous Infusion, filed on May 25, 2023, which is incorporated by reference herein in its entirety. In some embodiments, the warmer assembly 132 can include one or more heating elements and/or heat exchangers. In some embodiments, the warmer assembly 132 can include a fluid passageway defined by tubing or within a channel defined by the warmer assembly 132 that can be fluidically coupled to the fluid line 133B (e.g., directly or via one or more suitable fluid transfer components such as tubing, fluid connectors, and/or valves) such that fluid can flow from the warmer assembly 132 to the patient via the fluid line 133B. In some embodiments, one or more heating elements can be disposed within the fluid passageway of the warmer assembly such that fluid can contact the one or more heating elements and heat can transfer from the one or more heating elements to the fluid while the fluid travels through the fluid passageway.

In some embodiments, as shown in FIG. 1, the system 100 can optionally include a warmer drive assembly 120. The warmer drive assembly 120 is configured to be removably electrically coupled to the warmer assembly 132 via one or more electrical and/or mechanical couplings 101C to control operation of the warmer assembly 132. For example, the warmer drive assembly 120 can be configured to mechanically and electrically engage with the warmer assembly 132 such that the warmer drive assembly 120 can provide electrical current to one or more heating elements of the warmer assembly 132 to increase the temperature of the one or more heating elements. The warmer drive assembly 120 can also be configured to be removably mechanically and/or electrically coupled to the motor drive assembly 140 via one or more electrical and/or mechanical couplings 101D to receive data from and/or transmit data to the motor drive assembly 140. For example, in some embodiments, the warmer drive assembly 120 can be configured to receive data associated with fluid traveling through the fluid delivery assembly 130, such as pump data, from the motor drive assembly 140. In some embodiments, the warmer drive assembly 120 can control operation of the warmer assembly 132 based, at least in part, on the data received from the motor drive assembly 140. For example, in some embodiments, the warmer drive assembly 120 can provide electrical current to the warmer assembly 132 having parameters based on the data received from the motor drive assembly 140, such as pump operation status or pump motor speed. In some embodiments, rather than being removably couplable to the motor drive assembly 140, the warmer drive assembly 120 can be included in the motor drive assembly 140.

In some embodiments, the warmer drive assembly 120 can also include one or more sensors (e.g., one or more temperature sensors 126 described in more detail below) configured to identify (e.g., measure or determine) one or more characteristics of fluid (e.g., fluid temperature) traveling through one or more portions of a fluid passageway of the fluid delivery assembly 130 when the warmer drive assembly 120 is mechanically and/or electrically coupled to the warmer assembly 132. The warmer drive assembly 120 can also be configured to control operations of the warmer assembly 132 based, at least in part, on the data collected by the one or more sensors.

Additionally, in some embodiments, rather than the system 100 including the warmer drive assembly 120, the warmer assembly 132 can be configured to operate independently from a warmer drive assembly. For example, in some embodiments, the warmer assembly 132 can include an on-board power storage component (e.g., a rechargeable battery). In some embodiments, in addition to or as an alternative to the on-board power storage component, the warmer assembly 132 can be configured to receive operational power and/or charging power for the on-board power storage component via an electrical connection (e.g., between mating electrical contacts) with the motor drive assembly 140, the fluid delivery assembly 130, an alternating current (AC) power source 113 such as a wall outlet, and/or another suitable power generator or storage component. In some embodiments, the system 100 does not include the warmer assembly 132.

In some embodiments, the system 100 optionally includes a charger base 110 (also referred to as a charger base assembly, a charger assembly, a charger, or a base assembly). The charger base 110 can be configured to be electrically and mechanically coupled to the motor drive assembly 140 and/or to the warmer drive assembly 120 such that charging power and/or operational power can be provided to the motor drive assembly 140 (e.g., the power storage component 145 described below) and/or the warmer drive assembly 120 (e.g., the power storage component 122 described below) from the charger base 110. The charger base 110 can be coupled to an AC power source 113 (e.g., via a wall outlet) such that the charger base 110 can receive AC power from the AC power source 113. In some embodiments, although not shown, the charger base 110 can be coupled to another source of charging and/or operational power, such as an external power source (e.g., a battery) or a power generator. As noted above, although described as a "charger base," in some embodiments, such as any of the embodiments described herein, the charger base 110 can be operable to provide (and any of the drive assemblies or warmer assemblies can be configured to receive and operate based on) operational power, rather than or in addition to charging power. For example, the charger base 110 can provide operational power to any of the drive assemblies or warmer assemblies described herein, and such operational power can bypass an internal power storage device (e.g., a chargeable internal power storage device configured to provide operational power when the motor drive assembly 140 and/or the warmer drive assembly 120 is not coupled to the charger base 110) of any of the drive assemblies or warmer assemblies described herein.

Figure 2:
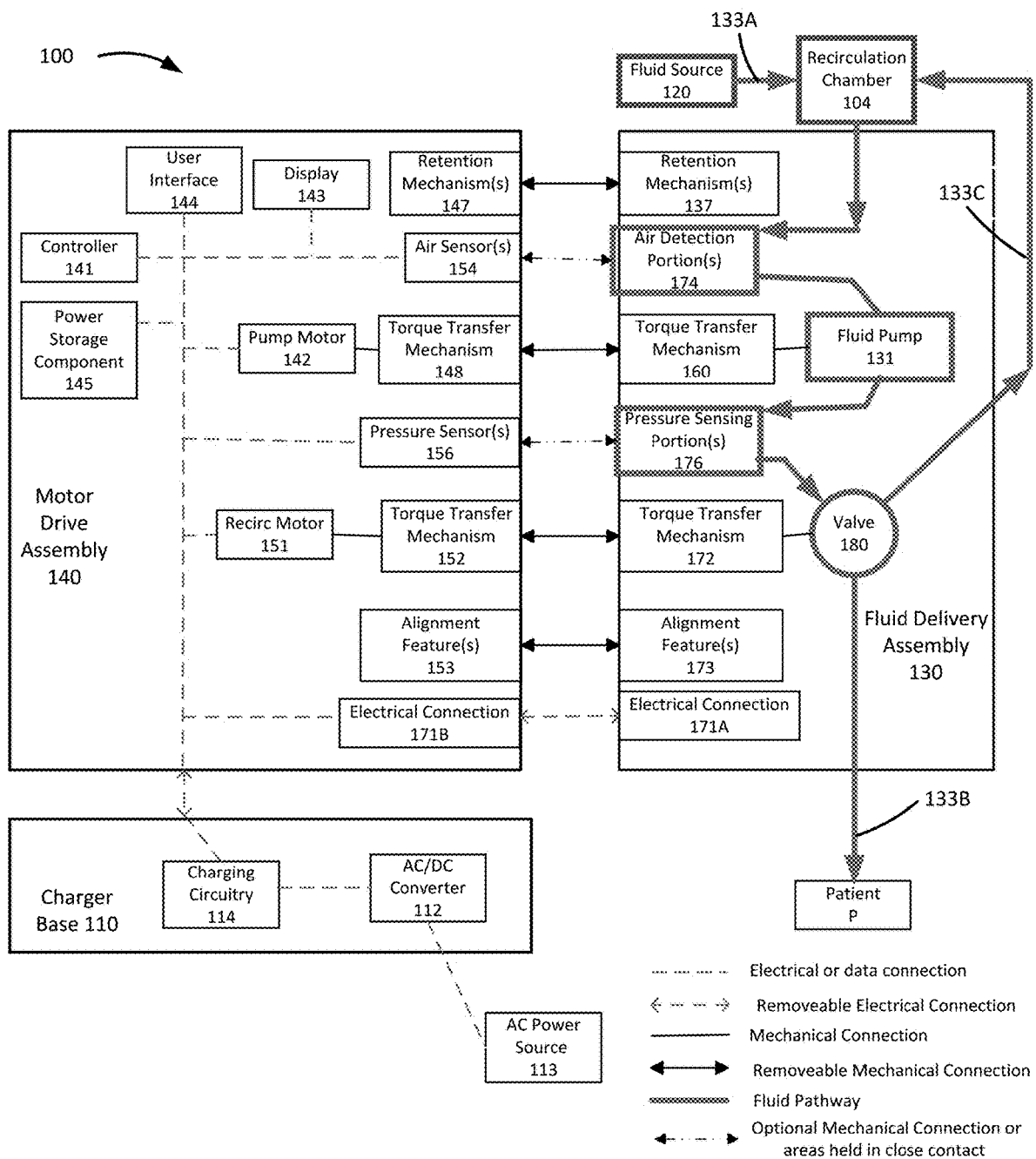
FIG. 2 is a schematic illustration of the system 100 showing some of the components of the system 100 in more detail, according to an embodiment.

FIG. 2 is a schematic illustration of the system 100 showing some of the components of the system 100 in more detail, according to an embodiment. As shown in FIG. 2, the fluid delivery assembly 130 can optionally include a torque transfer mechanism 160 and a fluid pump 131. The torque transfer mechanism 160 can also be referred to as a drive mechanism, a torque coupler, a torque transfer coupler, a pump torque transfer coupler, a receiving portion of a torque coupler, a torque receiving mechanism, or a first torque transfer mechanism. The fluid pump 131 can include one or more reservoirs (not shown). The torque transfer mechanism 160 is configured to be coupled to (e.g., via a torque output shaft) and to control operation of the fluid pump 131 such that fluid can be drawn into the fluid pump 131 and expelled from the fluid pump 131 based on movement (e.g., rotational movement) of and torque transferred from the torque transfer mechanism 160. For example, the torque transfer mechanism 160 can be coupled to the fluid pump 131 such that movement of the torque transfer mechanism 160 causes a pumping action (e.g., a drawing and/or an expelling movement) of the fluid pump 131. In some embodiments, the torque transfer mechanism 160 can control the fluid pump 131 to produce substantially continuous flow through the fluid line 133B. The flow may be substantially non-pulsatile. For example, in some embodiments, the fluid pump 131 can include two syringes, each defining a reservoir, and the fluid pump 131 can be operated such that the system 100 is a dual reservoir infuser. Movement (e.g., rotation) of the torque transfer mechanism 160 can cause the two syringes to be operated 180° out of phase from each other to produce a substantially continuous flow of fluid due to one syringe delivering fluid to the patient while the other syringe is being filled with fluid. For example, in some embodiments, the torque transfer mechanism 160 can include or be fixedly coupled to a torque output shaft which is coupled to two syringes of the fluid pump 131 via a pinion gear and a pair of rack gears, each rack gear fixedly coupled to a plunger of a respective syringe. The components can be arranged such that rotation of the torque output shaft causes rotation of the pinion gear, and rotation of the pinion gear causes one of the rack gears to translate in a first direction and the other rack gear to translate in a second direction opposite the first direction. Unlike a single-syringe pump, which would require a period of zero flow between syringe ejections during which the syringe is filled with fluid and result in a highly-pulsatile pressure profile, the double-syringe pump can deliver substantially continuous flow and maintain a lower maximum pressure on the IV site compared to a single-syringe pump under the same conditions, reducing pressure to minimize damage to blood products, potential injury to the patient, stress on the IV tubing, and instantaneous energy needs of the infuser.

The fluid delivery assembly 130 can include a set of one-way check valves such that fluid can be drawn from the fluid source 102 into the fluid pump 131 but cannot be expelled from the fluid pump 131 toward the fluid source 102 via the fluid line 133A, and so that fluid can be expelled from the fluid pump 131 to the patient P via the fluid line 133B but not drawn from the fluid line 133B into the fluid pump 131. The check valves can be passive valves that do not require external input or control. Thus, fluid flow can be passively controlled, and fluid can flow only one direction through each check valve.

As shown in FIG. 2, the motor drive assembly 140 includes a controller 141, a pump motor 142, and a torque transfer mechanism 148. The torque transfer mechanism 148 can also be referred to as a drive transfer mechanism, a torque coupler, a torque coupler, a pump torque transfer coupler, a transmission portion of a torque coupler, a torque transmission mechanism, or a second torque transfer mechanism. The controller 141 (also referred to as a processor) is operably coupled to the pump motor 142 and configured to control operation of the pump motor 142 (e.g., via sending signals thereto) to control movement (e.g., rotational movement) of the torque transfer mechanism 148, which is mechanically engaged with and/or coupled to the pump motor 142. The controller 141 can be configured to monitor and/or control data processing, power usage, and/or pumping functions. The pump motor 142 can be any suitable motor configured to convert electrical energy into a mechanical rotation in a controlled manner (e.g., under the control of the controller 141). The motor drive assembly 140 can also include a display 143, a user interface 144, and a power storage component 145 (also referred to as a power source or an internal power storage component). The display 143 can display information about the pumping operation, such as an amount of fluid delivered during a session and/or a pressure of fluid within a passageway of the fluid delivery assembly 130 and/or delivered from the fluid delivery assembly 130. The display 143 can display user settings, assembly information such as battery levels, performance data such as infusion speed, and/or other information related to system performance or fluid delivery characteristics. In some implementations, the display 143 can include backlights or other visual aids. The user interface 144 can allow the user to control fluid flow (e.g., initiation and ceasing of fluid infusion and for parameter adjustment such as flow rate). The power storage component 145 can include, for example, a battery (e.g., a rechargeable battery).

In some embodiments, the user can set the amount of fluid to be delivered (e.g., via interaction with the user interface 144) as a predetermined infusion volume, and does not need to continually engage with the system 100 for the system 100 to continue delivering fluid (e.g., the user can set the drive assembly 140 and fluid delivery assembly 130 down and walk away during infusion). In some embodiments, the user interface 144 can include a button or trigger that is pressure responsive such that greater depression causes the infusion rate to increase (e.g., due to a signal being sent from the user interface 144 to the controller 141 and the controller 141 signaling the pump motor 142 to increase operational speed). In some embodiments, the infusion rate can be preset and does not change regardless of the quantity of pressure applied to the user interface 144 button or trigger.

The torque transfer mechanism 148 of the motor drive assembly 140 can be configured to mechanically engage with the torque transfer mechanism 160 of the fluid delivery assembly 130 (e.g., when the fluid delivery assembly 130 is coupled to the motor drive assembly 140) to control movement of the torque transfer mechanism 160 (and, thus, the operation of the fluid pump 131) under the control of the pump motor 142. In some embodiments, the torque transfer mechanism 148 of the motor drive assembly 140 can include, for example, one or more drive shafts, one or more torque plates, one or more gears, a reciprocating magnet, and/or any other components suitable for transmitting torque via rotation. In some embodiments, the output of the pump motor 142 is coupled to (e.g., engaged with) a shaft, and the shaft is coupled to (e.g., engaged with) the torque transfer mechanism 148 of the motor drive assembly 140. Thus, in some implementations, a first end of the shaft is coupled to (e.g., engaged with) the pump motor 142 and a second end of the shaft is coupled to (e.g., engaged with) the torque transfer mechanism 148 of the motor drive assembly 140. In some embodiments, the torque transfer mechanism 148 includes a shaft engaged with the pump motor 142 (e.g., coupling a torque plate of the torque transfer mechanism 148 to the pump motor 142 via the shaft). In some embodiments, the torque transfer mechanism 148 of the motor drive assembly 140 can include or be coupled to one or more strain gauges, a torsion load cell, and/or other force sensing mechanisms (e.g., disposed on one or more shafts such as the one or more drive shafts) such that the controller 141 can identify increases in resistance to rotation.

The torque transfer mechanism 148 of the motor drive assembly 140 and the torque transfer mechanism 160 of the fluid delivery assembly 130 can form a torque transfer pair or torque coupler in which each is configured to mate with the other such that rotation of the torque transfer mechanism 148 of the motor drive assembly 140 causes corresponding rotation of the torque transfer mechanism 160 of the fluid delivery assembly 130. For example, the torque transfer mechanism 160 can be a receiving portion of a torque coupler and the torque transfer mechanism 148 can be a transmission portion of a torque coupler. In some embodiments, the torque transfer mechanism 148 forms a portion of an outer surface of the motor drive assembly 140 and the torque transfer mechanism 160 forms a portion of an outer surface of the fluid delivery assembly 130. In some embodiments, the torque transfer mechanism 148 of the motor drive assembly 140 can include male projection portions configured to be received by female receiving portions defined by the torque transfer mechanism 160 of the fluid delivery assembly 130 such that rotation of the torque transfer mechanism 148 of the motor drive assembly 140 causes rotation of the torque transfer mechanism 160 of the fluid delivery assembly 130.

In some embodiments, the torque transfer mechanism 148 of the motor drive assembly 140 includes one or more pins (e.g., two, four, six, ten, twelve, twenty pins) and the torque transfer mechanism 160 of the fluid delivery assembly 130 defines at least a corresponding number of receiving holes (e.g., a corresponding number or more than a corresponding number) configured to receive the pins of the motor drive assembly 140. Upon coupling of the fluid delivery assembly 130 and the motor drive assembly 140, the pins of the torque transfer mechanism 148 can be received in the receiving holes of the torque transfer mechanism 160 such that rotation of the torque transfer mechanism 148 of the motor drive assembly 140 causes rotation of the torque transfer mechanism 160 due to the pins applying rotational force to portions of the torque transfer mechanism 160 defining the receiving holes. In some embodiments, the arrangement or pattern of receiving holes (e.g., relative to a central axis of the torque transfer mechanism 160) is the same as the arrangement or pattern of pins (e.g., relative to a central axis of the torque transfer mechanism 148). In some embodiments, the arrangement or pattern of receiving holes (e.g., relative to a central axis of the torque transfer mechanism 160) can be a mirror image of the arrangement or pattern of pins (e.g., relative to a central axis of the torque transfer mechanism 148) such that, when the torque transfer mechanism 148 and the torque transfer mechanism 160 are aligned and facing each other, each pin can be aligned with a respective receiving hole.

In some embodiments, the torque transfer mechanism 148 includes a transmission torque plate and the torque transfer mechanism 160 includes a receiving torque plate. The transmission torque plate of the torque transfer mechanism 148 can be coupled to the set of pins such that the pins project perpendicularly from a surface of the transmission torque plate. The transmission torque plate can be coaxially aligned with a shaft coupling the transmission torque plate to the pump motor 142. The receiving torque plate can define the receiving holes configured (e.g., shaped and sized) to receive the pins. The receiving torque plate can be aligned coaxially with the transmission torque plate (e.g., can rotate about a common axis) when the pins are received within the receiving holes, and the outward facing surfaces of the receiving torque plate and the transmission torque plate can be disposed in parallel planes and/or can be disposed in abutting contact with each other.

In some implementations, the pins of the torque transfer mechanism 148 can include springs (also referred to as pin springs or pin engagement springs) such that the pins are spring-loaded and each pin is biased toward an extended configuration and is able to be urged to a contracted configuration via application of a force to a free end of each pin against the expanding force applied by the spring. For example, a spring can be disposed opposite a free end of each pin (e.g., within a recess defined by the torque transfer mechanism 148 and aligned with a pin) and can be configured to expand to urge the pin toward an extended configuration in which the free end of the pin is a greater distance from a surface of the torque transfer mechanism 148 from which the pin projects. When the fluid delivery assembly 130 is coupled to the motor drive assembly 140, if the spring-loaded pins and receiving holes are not aligned such that the spring-loaded pins are immediately received within the receiving holes, the spring-loaded pins can be depressed against the force of the respective springs from the extended configuration to a contracted configuration in which the free end of the pin is closer to the surface of the torque transfer mechanism 148 than in the extended configuration (e.g., disposed within a respective recess of the torque transfer mechanism 148 such that the free end of each pin is flush with the surface of the torque transfer mechanism 148 or projecting from the surface of the torque transfer mechanism 148 less far than in the extended configuration) by an outward-facing surface of the torque transfer mechanism 160 of the fluid delivery assembly 130 defining the open ends of the receiving holes.

When the pump motor 142 operates to rotate the torque transfer mechanism 148 of the motor drive assembly 140 (e.g., via rotation of a shaft coupling the two components or included in the torque transfer mechanism 148), the torque transfer mechanism 148 of the motor drive assembly 140 will rotate relative to the torque transfer mechanism 160 of the fluid delivery assembly 130 until the spring-loaded pins align with the receiving holes, at which time the spring-loaded pins will automatically transition from the contracted configuration to the extended configuration due to no longer being retained in the contracted configuration by the outward-facing surface of the torque transfer mechanism 160, and will extend into the receiving holes of the torque transfer mechanism 160 of the fluid delivery assembly 130.

Once the spring-loaded pins are disposed in the receiving holes of the fluid delivery assembly 130, any rotational output of the pump motor 142 will be transferred into the shaft, through the torque transfer mechanism 148 of the motor drive assembly 140, to the torque transfer mechanism 160 of the fluid delivery assembly 130, and to the pump 131. Thus, the fluid delivery assembly 130 can be coupled to the motor drive assembly 140 and secured in an operating position to the motor drive assembly 140 (e.g., via the retention mechanism(s) 147 and 137 described in more detail below) without the torque transfer mechanism 160 of the fluid delivery assembly 130 being in operational alignment for torque transfer with the torque transfer mechanism 148 of the motor drive assembly 140, making the coupling easier and faster for a user than if the pins and receiving holes of the torque transfer mechanism 160 and the torque transfer mechanism 148 needed to be aligned for the coupling of the fluid delivery assembly 130 to the motor drive assembly 140. As a result, a user (e.g., a clinician) can couple the fluid delivery assembly 130 to the motor drive assembly 140 via a single motion of the fluid delivery assembly 130 relative to the motor drive assembly 140 (e.g., via a translational movement of the fluid delivery assembly 130 relative to the motor drive assembly 140), rather than needing to take a separate action to properly align the torque transfer mechanism 148 with the torque transfer mechanism 160, which may be required if the pins are fixed in an extended configuration. For example, the coupling of the fluid delivery assembly 130 to the motor drive assembly 140 can be performed via a user (e.g., a clinician) applying a force via a single motion of one or both hands of the user to the fluid delivery assembly 130 to couple the torque receiving mechanism 160 to the torque transmission mechanism 148 and to couple the fluid delivery assembly 130 to the motor drive assembly 140.

As described in more detail below, the fluid delivery assembly 130 can latch to (e.g., automatically when urged into contact) the motor drive assembly 140 (e.g., via retention mechanism(s) 137 and retention mechanism(s) 147) regardless of whether the torque transfer mechanism 148 and the torque transfer mechanism 160 are properly aligned for torque transfer (e.g., regardless of whether the pins of the torque transfer mechanism 148 are aligned with and received within the receiving holes or are compressed by the torque transfer mechanism 160).

Once the spring-loaded pins have expanded to the extended configuration and are disposed within the receiving holes of the torque transfer mechanism 160 of the fluid delivery assembly 130, the spring-loaded pins are locked in place relative to the torque transfer mechanism 160 of the fluid delivery assembly 130 and cannot be removed from the torque transfer mechanism 160 of the fluid delivery assembly 130 by any rotational movement generated by the pump motor 142. When a user removes the fluid delivery assembly 130 from the motor drive assembly 140 (e.g., by releasing one or more latches of retention mechanism(s) 137 described below), the torque transfer mechanism 160 of the fluid delivery assembly 130 can be slid off of the spring-loaded pins when the fluid delivery assembly 130 is translated in a horizontal motion away from the motor drive assembly 140 (e.g., along an axis parallel to a central axis of a pin of the torque transfer mechanism 148 of the motor drive assembly 140).

The inclusion of the pins in the torque transfer mechanism 148 of the motor drive assembly 140 rather than the torque transfer mechanism 160 of the fluid delivery assembly 130 allows for easier cleanability of the reusable portion of the system 100 (e.g., the motor drive assembly 140). All exposed surfaces of the spring-loaded pins can be efficiently cleaned (e.g., via wiping) if necessary, as there are no blind holes on the motor drive assembly 140. Blind receiving holes can be difficult to clean properly, and including the blind receiving holes on the disposable fluid delivery assembly 130 obviates the need to clean these features. In some embodiments, however, rather than the torque transfer mechanism 148 of the motor drive assembly 140 including the pins, the torque transfer mechanism 160 of the fluid delivery assembly 130 can include the pins and the torque transfer mechanism 148 of the motor drive assembly 140 can define the corresponding receiving holes.

In some embodiments, each of the torque transfer mechanism 148 and the torque transfer mechanism 160 can be formed to include a planar outer surface configured to mate with (e.g., face and/or contact) the planar outer surface of the other when the fluid delivery assembly 130 is coupled to the motor drive assembly 140. The planar outer surfaces can be disposed in parallel planes and/or can abut in a single plane disposed perpendicular to the pins when the fluid delivery assembly 130 is coupled to the motor drive assembly 140. Each planar outer surface can be, for example, circular. The pins can project perpendicularly from the planar outer surface of the torque transfer mechanism 148 of the motor drive assembly 140 and can be configured to contact the planar outer surface of the torque transfer mechanism 160 of the fluid delivery assembly 130. The planar outer surface of the torque transfer mechanism 160 of the fluid delivery assembly 130 can define the access openings to the receiving holes.

In some embodiments, the pins of the torque transfer mechanism 148 and a portion of the torque transfer mechanism 160 defining the receiving holes and/or configured to contact the pins when received within the receiving holes can be conductive (e.g., formed of one or more metals and/or other materials which conduct electricity). For example, the portion(s) of the torque transfer mechanism 160 defining each of the receiving holes can be formed of a conductive material. In some embodiments, portions of the torque transfer mechanism 148 and/or the torque transfer mechanism 160 surrounding and/or coupled to the conductive portions can be formed of a non-conductive material (e.g., plastic). The conductive pins and conductive portion of the torque transfer mechanism 160 can be disposed in contact when the torque transfer mechanism 148 is coupled to the torque transfer mechanism 160 in a configuration for torque transfer (e.g., when the pins are received within the receiving holes), and data and/or power can be transmitted (e.g., via one or more channels) between the motor drive assembly 140 and the fluid delivery assembly 130 via the pins and conductive portions of the torque transfer mechanism 160.

In some embodiments, additionally or alternatively, data and power can be transmitted between the motor drive assembly 140 and the fluid delivery assembly 130 via electrical connections (e.g., pogo pins) distinct from (e.g., electrically isolated from) the torque transfer mechanism 148 and the torque transfer mechanism 160. For example, the fluid delivery assembly 130 can include one or more electrical connections 171A and the motor drive assembly 140 can include one or more electrical connections 171B configured to mate with the one or more electrical connections 171A. The electrical connections 171A and 171B, and any of the electrical connections or contacts described herein, can include, for example, pogo pins and a plate, a pin configured to be received within a receptacle, and/or two metal plates configured to directly contact each other with or without a spring force. In some embodiments, all of the electrical connections of the motor drive assembly 140 and of the fluid delivery assembly 130 (e.g., all of the pogo pins) are electrically connected to one another so that data can be transmitted via a single channel. In some embodiments, each of the motor drive assembly 140 and the fluid delivery assembly 130 include at least one electrical connection (e.g., pogo pins) that is electrically isolated from one or more other electrical connections of the same assembly so that multiple independent electrical connections can be formed between the fluid delivery assembly 130 and the motor drive assembly 140 via the paired independent electrical connections (e.g., via pogo pins) when the fluid delivery assembly 130 is coupled to the motor drive assembly 140.

As shown in FIG. 2, in some embodiments, the fluid delivery assembly 130 can include a recirculation valve 180 and a torque transfer mechanism 172 mechanically coupled to the recirculation valve 180. The recirculation valve 180 is configured to selective redirect fluid away from flowing through fluid line 133B (e.g., to the patient P) during priming of the fluid delivery assembly 130 and/or if air is detected within the fluid delivery assembly 130 to reduce the risk of air traveling to the patient P and entering a vascular system of the patient P.

As shown in FIG. 2, the recirculation valve 180 can be fluidically coupled to and disposed downstream of the pump 131. The recirculation valve 180 can be selectively fluidically coupled to a recirculation chamber 104 and to the fluid line 133B. The recirculation valve 180 can be transitioned, in response to movement of the torque transfer mechanism 172, between a first configuration in which fluid is allowed to flow from the pump 131 to the fluid line 133B (e.g., to a patient) and a fluid path 133C to the recirculation chamber 104 is occluded, which may be the normal or initial configuration of the recirculation valve 180, and a second configuration in which fluid expelled from the pump 131 is directed to the recirculation chamber 104 and the outlet to the fluid line 133B is occluded. In some embodiments, the recirculation valve 180 can include a circular stop-cock-like valve, the rotation of which is controlled by the torque transfer mechanism 172 and the torque transfer mechanism 152.

In some embodiments, the recirculation valve 180 can include a clamping device configured to selectively occlude the recirculation fluid line 133C (e.g., recirculation tubing). The clamping device can be dimensioned such that it can transition between a first position in which the clamping device occludes the recirculation fluid line 133C and allows unimpeded flow through the patient tubing and a second configuration in which the clamping device does not occlude the recirculation fluid line 133C and occludes the fluid line 133B to the patient (e.g., the patient tubing). The clamping device can be configured to pinch or collapse the tubing between a cam of the clamping device and another hard surface (e.g., a pinching surface) of the clamping device. The position of the clamping device can be controlled by the torque transfer mechanism 172 and the torque transfer mechanism 152 such that the recirculation motor 151 can transition the clamping device between the first position and the second position under the control of the controller 141.

In some embodiments, the portions of the recirculation fluid line 133C and the fluid line 133B configured to be contacted and occluded by the cam can be disposed at a ninety degree angle relative to each other, can be disposed parallel to each other, or can be disposed at any suitable other angle relative to each other. In some embodiments, the clamping device can optionally be an over-center clamping device and the cam can be an over-center cam.

In some embodiments, the recirculation valve 180 can include an off-center cam configured to selectively occlude either the fluid line toward the patient or the fluid line toward the recirculation chamber 104, the position of the off-center cam controlled by the torque transfer mechanism 172 and the torque transfer mechanism 152. In some embodiments, rather than including a recirculation valve 180, the torque transfer mechanism 152, and the torque transfer mechanism 172, the motor drive assembly 140 can include an off-center clamping device coupled to the recirculation motor 151. When the fluid delivery assembly 130 is coupled (e.g., latched) to the motor drive assembly 140, the off-center clamping device can be positioned such that a portion of the recirculation fluid line 133C is on one side of the off-center clamp and the fluid line 133B (e.g., patient tubing) is on a second side of the off-center clamp. The off-center clamp can include an off-center cam that can be transitioned by the recirculation motor 151 between a first position in which the fluid line 133B is occluded and the recirculation fluid line 133C is open and a second position in which the recirculation fluid line 133C is occluded and the fluid line 133B is open. In some embodiments, the off-center clamping device can include pinching surfaces disposed on the motor drive assembly 140 such that the portions of the recirculation fluid line 133C and the fluid line 133B can each be received between a pinching surface and the off-center cam. In some embodiments, the pinching surfaces can be included in the fluid delivery assembly 130.

The recirculation chamber 104 can be disposed downstream of the fluid source 102 and upstream of the pump 131. As shown in FIG. 2, the recirculation chamber 104 and the fluid source 102 can optionally be arranged such that all fluid flowing from the fluid source 102 to the pump 131 travels through the recirculation chamber 104. The recirculation chamber 104 can have at least two inlets and at least one outlet. For example, the recirculation chamber 104 can include a first inlet couplable to the fluid source 102 (e.g., via a fluid line) such that fluid can flow from the fluid source 102 and into an interior of the recirculation chamber 104. The recirculation chamber 104 can include a second inlet couplable to the recirculation valve 180 (e.g., via the fluid line 133C) and configured to receive return flow (e.g., air, a mix of liquid fluid and air, or liquid fluid only) from the recirculation valve 180 such that the return flow can flow into the interior of the recirculation chamber 104 via the second inlet. The recirculation chamber 104 can include an outlet couplable to the fluid delivery assembly 130 such that fluid (e.g., infusate) can flow from the interior of the recirculation chamber 104 to the pump 131 of the fluid delivery assembly 130 via the outlet (e.g., via a fluid line such as tubing).

The motor drive assembly 140 can include a recirculation motor 151 and a torque transfer mechanism 152 coupled to the recirculation motor 151. The controller 141 is operably coupled to the recirculation motor 151 and configured to control operation of the recirculation motor 151 (e.g., via sending signals thereto) to control movement (e.g., rotational movement) of the torque transfer mechanism 152, which is mechanically engaged with and/or coupled to the recirculation motor 151. The torque transfer mechanism 172 of the fluid delivery assembly 130 and the torque transfer mechanism 152 of the motor drive assembly 140 can be configured to be coupled (e.g., mate) such that rotation of the torque transfer mechanism 152 of the motor drive assembly 140 by the recirculation motor 151 causes corresponding rotation of the torque transfer mechanism 172 of the fluid delivery assembly 130. The rotation of the torque transfer mechanism 172 can cause the recirculation valve 180 to transition between the first configuration and the second configuration of the recirculation valve 180. Thus, the controller 141 can be configured to transition the recirculation valve 180 between the first configuration and the second configuration via controlling operation of the recirculation motor 151 when the fluid delivery assembly 130 is coupled to the motor drive assembly 140.

In some embodiments, the torque transfer mechanism 152 of the motor drive assembly 140 and the torque transfer mechanism 172 of the fluid delivery assembly 130 can be the same as or similar in structure and/or function to the torque transfer mechanism 160 of the motor drive assembly 140 and the torque transfer mechanism 148 of the fluid delivery assembly 130, respectively. For example, the torque transfer mechanism 172 of the fluid delivery assembly 130 and the torque transfer mechanism 152 of the motor drive assembly 140 can form a torque transfer pair in which each is configured to mate with the other such that rotation of the torque transfer mechanism 152 of the motor drive assembly 140 causes corresponding rotation of the torque transfer mechanism 172 of the fluid delivery assembly 130. For example, the torque transfer mechanism 172 can be a receiving portion of a torque coupler and the torque transfer mechanism 152 can be a transmission portion of a torque coupler. In some embodiments, the torque transfer mechanism 152 forms a portion of an outer surface of the motor drive assembly 140 and the torque transfer mechanism 172 forms a portion of an outer surface of the fluid delivery assembly 130. In some embodiments, the torque transfer mechanism 152 of the motor drive assembly 140 can include male projection portions (e.g., pins or spring-loaded pins) configured to be received by female receiving portions (e.g., receiving holes) defined by the torque transfer mechanism 172 of the fluid delivery assembly 130 such that rotation of the torque transfer mechanism 152 of the motor drive assembly 140 causes rotation of the torque transfer mechanism 172 of the fluid delivery assembly 130. In some embodiments, the torque transfer mechanism 152 of the motor drive assembly 140 can be the same as the torque transfer mechanism 148 of the motor drive assembly 140 and the torque transfer mechanism 172 of the fluid delivery assembly 130 can be the same as the torque transfer mechanism 160 of the fluid delivery assembly 130. In some embodiments, the torque transfer mechanism 152 can have a smaller diameter and/or include fewer pins than the torque transfer mechanism 148 and the torque transfer mechanism 172 can have a smaller diameter and fewer receiving holes than the torque transfer mechanism 160 since a smaller amount of torque can be transmitted through the torque transfer mechanism 152 to transition the configuration the valve 180 than is transmitted through the torque transfer mechanism 148 for operation of the pump 131.

In some embodiments, the motor drive assembly 140 can include one or more air sensors 154. The one or more air sensors 154 can be disposed on an exterior surface of the motor drive assembly 140 (e.g., on or within an opening of a housing of the drive assembly 140). Each of the one or more air sensors 154 can be configured to align with a respective air detection portion 174 of a fluid passageway of the fluid delivery assembly 130 such that the one or more air sensors 154 can detect the presence of air (e.g., air bubbles or air portions) within the air detection portion(s) 174 of the fluid passageway. The air detection portion(s) 174 can be disposed upstream of the pump 131 and downstream of the fluid source 102 and the recirculation chamber 104. The air detection portion(s) 174 can be formed of a portion of a fluid tube (e.g., flexible fluid tubing). The one or more air sensors 154 can be operably coupled to the controller 141 such that, upon detection of air within the air detection portion(s) 174 of the fluid passageway, the one or more air sensors 154 can communicate an indication of the presence of air within the air detection portion(s) 174 (e.g., via sending one or more signals) to the controller 141. In response to the controller 141 receiving an indication (e.g., one or more signals) from the one or more air sensors 154 that the presence of air is detected in the air detection portion(s) 174, the controller 141 can adjust and/or stop the operation of the pump motor 142 and/or adjust the configuration of the recirculation valve 180 to direct the air (e.g., fluid including the air) to the recirculation chamber 104 rather than the patient P. Once the one or more air sensors 154 stop detecting the presence of air in the air detection portion(s) 174 and/or after a predetermined duration of time has passed since the presence of air was detected or the recirculation valve 180 was transitioned to the recirculating position, the controller 141 can adjust the configuration of the recirculation valve 180 to direct fluid to the patient P.

In some embodiments, the one or more air sensors 154 can include an ultrasound sensor. In some embodiments, the one or more air sensors 154 can be a C-shaped ultrasound sensor that can deliver an ultrasound wave through a fluid-filled tube (e.g., the air detection portion(s) 174 of the fluid passageway), and detect the presence of air or water in the tube. In some embodiments, each C-shaped air sensor 154 can extend into a receiving recess (e.g., a hole or gap) defined in a wall portion of a housing of the fluid delivery assembly 130 and can interact with an air detection portion 174 (e.g., an exposed section of a fluid tube of the fluid delivery assembly 130) disposed within the receiving recess. The alignment and proper fit of the one or more air sensors 154 and air detection portion(s) 174 (e.g., the associated fluid tube portions) of the fluid delivery assembly 130 can be assured by the coupling (e.g., interaction and engagement) of the retention mechanism(s) 137/147 (e.g., latch(es)) and the alignment feature(s) 153/173 described in more detail below.

In some embodiments, the motor drive assembly 140 can include one or more pressure sensors 156. In some embodiments, the one or more pressure sensors 156 can provide information regarding the status of the proximal (towards the fluid source) and distal (towards the patient) fluid pathways. For example, a distinct increase in pressure in the distal tubing may indicate an occlusion in the fluid pathway towards the patient. The one or more pressure sensors 156 can provide one or more signals to the controller 141 indicating an increase in pressure in the distal tubing such that the controller 141 can stop infusion and alarm the user about a potential issue. The one or more pressure sensors 156 can also be used to determine if a vacuum/negative pressure occurs in the proximal tubing. This could be indicative of an air filter ball occluding the tubing, clamps being left on the tubing, or an empty fluid bag. In response to receiving an indication of negative pressure in the proximal tubing (e.g., via signal from the one or more pressure sensors 156), the controller 141 can stop infusion and present an error message to the user about the potential issue.

In some embodiments, the one or more pressure sensors 156 can be disposed on an exterior surface of the motor drive assembly 140 (e.g., on or within an opening of a housing of the drive assembly 140). Each of the one or more pressure sensors 156 can be configured to align with a respective pressure detection portion 176 (also referred to as a pressure sensing portion) of a fluid passageway of the fluid delivery assembly 130 such that the one or more pressure sensors 156 can detect a pressure of fluid within the pressure detection portion(s) 176 of the fluid passageway. As shown in FIG. 2, the pressure detection portion(s) 176 can be disposed downstream of the pump 131 and upstream of the valve 180. The one or more pressure sensors 156 can be operably coupled to the controller 141 such that the one or more pressure sensors 156 can communicate an indication of a pressure of fluid within the pressure detection portion(s) 176 (e.g., via sending one or more signals) to the controller 141. In response to the controller 141 receiving an indication (e.g., one or more signals) from the one or more pressure sensors 156 that the pressure of the fluid within the pressure detection portion(s) 176 are outside of a threshold range (e.g., below or above a predetermined pressure range or threshold), the controller 141 can adjust and/or stop the operation of the pump motor 142 and/or adjust the configuration of the recirculation valve 180 to direct the fluid to the recirculation chamber 104 rather than the patient P.

In some embodiments, the pressure detection portion(s) 176 can include a flexible section of tubing or fluid pathway which can interface with the one or more pressure sensors 156 of the motor drive assembly 140. In some embodiments, the pressure detection portion(s) 176 can include a pressure transducer configured to communicate pressure values via a data signal to a receiver (e.g., of the one or more pressure sensors 156) in the motor drive assembly 140.

In some embodiments, the pressure sensor(s) 156 and/or other pressure sensors can be included in the fluid delivery assembly 130. The pressure sensor(s) 156 and/or other pressure sensor(s) of the fluid delivery assembly 130 can include or be a pressure transducer disposed inside the fluid path and in direct contact with infused fluid or blood within the fluid delivery assembly 130. The pressure sensor 156 can perform pressure measurements and transmit associated data to the controller 141 of the motor drive assembly 140 via a removable electrical connection between the fluid delivery assembly 130 and motor drive assembly 140 (e.g., via a data connection included in the electrical connections 171A and 171B). The pressure transducer can be disposable. In some embodiments, the fluid delivery assembly 130 can include only one pressure transducer disposed within the high pressure part of the fluid path (e.g., tubing) of the fluid delivery assembly 130 (e.g., between the pump 131 and the valve 180 or the patient P). In some embodiments, the fluid delivery assembly 130 can include at least one pressure transducer disposed within the high pressure part of the tubing (e.g., between the pump 131 and the valve 180 or the patient P) and at least one pressure transducer disposed within the low pressure part of the fluid path (e.g., tubing) of the fluid delivery assembly 130 (e.g., between the fluid source 102 and the pump 131).

In some embodiments, one or more of the pressure sensor(s) 156 of the motor drive assembly 140 can include jaws or plates and one or more of the pressure sensing portion(s) 176 of the fluid delivery assembly 130 can include a flexible section of tubing configured to swell and contract (e.g., increase or decrease in external diameter) based on a pressure of fluid within with flexible section of tubing. The jaws or plates can be configured to align with the flexible section of tubing such that the flexible section of tubing is disposed between and in contact with the jaws or plates when the fluid delivery assembly 130 is coupled to the motor drive assembly 140, and the proper alignment can be assured by the coupling of the retention mechanism(s) 137/147 (e.g., latch(es)) and the alignment feature(s) 153/173. The jaws or plates can be configured to be moved relative to each other in response to expansion and contraction of the flexible section of tubing. The pressure sensor(s) 156 or the controller 141 based on data collected by the pressure sensor(s) 156 can indirectly determine a pressure of fluid within the flexible section of tubing based on the relative positioning and/or displacement of the jaws or plates by the flexible section of tubing.

In some embodiments, one or more of the pressure sensing portion(s) 176 can include a flexible membrane disposed the fluid delivery assembly 130. The fluid delivery assembly 130 can include a small chamber in fluid communication with the fluid path of the fluid delivery assembly 130 (e.g., in fluid communication with a portion of the fluid path between the fluid pump 131 and the recirculation valve 180). A first side of the flexible membrane can be disposed in contact with fluid within the chamber (e.g., can form a boundary of the chamber) and a second side of the flexible membrane opposite the first side can be exposed to atmospheric pressure. The flexible membrane can deflect based on the pressure of the fluid within the chamber relative to atmospheric pressure. For example, when the pressure of the fluid in the chamber is higher than atmospheric pressure, the flexible membrane can expand and distend to increase the size of the chamber (e.g., distend away from the fluid delivery assembly 130), and when the pressure of the fluid in the chamber decreases toward atmospheric pressure, the flexible membrane can retract to a neutral position. If a low pressure condition within the chamber occurs such that the pressure of fluid within the chamber is lower than atmospheric pressure, the flexible membrane can retract to decrease the size of the chamber (e.g., retract into the fluid delivery assembly 130). A pressure sensor 156 of the motor drive assembly 140 can be configured to align with the flexible membrane such that the pressure sensor 156 can detect and/or measure the deflection of the flexible membrane relative to the neutral position of the flexible membrane, and the proper alignment and gap distance between the pressure sensor 156 and the flexible membrane can be assured by the coupling of the retention mechanism(s) 137/147 (e.g., latch(es)) and the alignment feature(s) 153/ 173. The pressure sensor 156 and/or the controller 141 can infer the fluid pressure of the fluid in fluid communication with the chamber based on the deflection of the flexible membrane detected and/or measured by the pressure sensor 156.

In some embodiments, the pressure detection portion(s) 176 can include a rigid portion of tubing including a trapped section of air configured to change in volume or size based on a pressure of fluid within the tubing. The size of the trapped section of air can correlate to the pressure of the fluid within the tubing, and the size of the trapped section of air can be detected by the one or more pressure sensors 156. For example, in some embodiments, one or more of the pressure sensing portion(s) 176 can include a closed or dead-end small diameter tube disposed in fluid communication with the fluid path of the fluid delivery assembly 130 (e.g., in fluid communication with a portion of the fluid path between the fluid pump 131 and the recirculation valve 180). In some embodiments, the dead-end tube can be fluidically coupled to the fluid path such that the closed end is vertically above the end in fluidic communication with the fluid path such that air within the dead-end tube rises upward to the dead-end. In some embodiments, the dead-end tube can be disposed in any orientation and air will not be able to escape from the dead-end tube and travel to the patient because the dead-end tube has a sufficiently small diameter that a small volume of air will remain trapped in the dead-end tube when the fluid delivery assembly 130 is primed with fluid. The trapped air will be compressed and reduced in size when the fluid disposed at the fluid communication end of the dead-end tube increases, and the trapper air will expand and increase in size when the fluid disposed at the fluid communication end of the dead-end tube decreases. When the trapped air is reduced in size, the liquid fluid column within the dead-end tube will expand (e.g., raise up if dead-end tube is vertically oriented). In some embodiments, when the fluid disposed at the fluid communication end of the dead-end tube is at atmospheric pressure, the dead-end tube can be 100% filled with air. In some embodiments, the diameter and length of the dead-end tube can be selected to tune the pressure sensitivity of the dead-end tube so that, for example, at the maximum desired fluid pressure within the fluid path of the fluid delivery assembly 130, the liquid fluid column within the dead-end tube will fill a first predetermined volume (e.g., about 80%) of the dead-end tube and at about half of the desired maximum pressure of the fluid path of the fluid delivery assembly 130, the liquid fluid column within the dead-end tube will fill a second predetermined volume (e.g., about 40%) of the dead-end tube.

A pressure sensor 156 of the motor drive assembly 140 can be configured to align with the dead-end tube to measure the height of the liquid fluid column. The proper alignment and gap distance (if any) between the pressure sensor 156 and the dead-end tube can be assured by the coupling of the retention mechanism(s) 137/147 (e.g., latch(es)) and the alignment feature(s) 153/173. The pressure sensor 156 and/or the controller 141 can determine the fluid pressure of the fluid in fluid communication with the dead-end tube indirectly based on the height of the liquid fluid column. The pressure sensor 156 can include or be an optical sensor, a capacitance sensor, and/or a proximity sensor.

In some embodiments, a pressure of fluid delivered by the fluid delivery assembly 130 can be indirectly determined based on an electrical load required to drive the pump motor 142 to cause delivery of the fluid. For example, in some embodiments, the reservoir(s) of the pump 131 include one, two or more syringes having a constant diameter. The load applied by the pump motor 142 to the syringe plunger associated with each syringe (e.g., via the torque transfer mechanism 148 and the torque transfer mechanism 160) is proportional to the electrical load. Thus, the current and/or voltage applied to the pump motor 142 can be used to determine the fluid pressure of the fluid delivered from the pump 131. In some embodiments, the voltage of the pump motor 142 can be controlled (e.g., held constant) and the voltage can be correlated to the fluid pressure. In some embodiments, the motor can be controlled by varying an input voltage. In some embodiments, the determination of fluid pressure can include varying between current and voltage control. In some embodiments, a control algorithm used (e.g., by the controller 141) to control the operation of the pump motor 142 (e.g., motor movement or rotation) can also be used to infer the fluid pressure. In some embodiments, the pressure measurement may be taken (e.g., the data used to determine the fluid pressure can be collected) at discrete points in the middle of a syringe stroke to avoid detecting the high loads required for the syringe plungers to change direction at the ends of the stroke.

As shown in FIG. 2, the fluid delivery assembly 130 can include one or more retention mechanisms or features 137 and the motor drive assembly 140 can include one or more complementary retention mechanisms or features 147. Each retention mechanism 137 of the fluid delivery assembly 130 can be configured to mate or engage with a retention mechanism 147 of the motor drive assembly 140 to ensure that the fluid delivery assembly 130 and the motor drive assembly 140 are maintained in a coupled and proper orientation relative to each other until the fluid delivery procedure has ended (e.g., to prevent accidental decoupling). The retention mechanism 137 of the fluid delivery assembly 130 and the retention mechanism 147 of the motor drive assembly 140 can include, for example, a mechanical latch and complementary detent, one or more magnetic connections, or any other suitable coupling mechanism(s). In some implementations, the retention mechanism(s) 137 of the fluid delivery assembly 130 can include one or more latch mechanisms and the motor drive assembly 140 can include one or more complementary receiving portions (e.g., detents or grooves) configured to be selectively and releasably engaged with the retention mechanism(s) 137 of the motor drive assembly 140. The latch mechanisms can be configured to hold (e.g., rigidly retain) the fluid delivery assembly 130 to the motor drive assembly 140.

In some implementations, the latch mechanism can include a spring and a latch release such that the latch mechanism can be spring-loaded. For example, when the fluid delivery assembly 130 is coupled to (e.g., pressed into or otherwise engaged with) the motor drive assembly 140, a spring loaded latching mechanism can be depressed from a first position to a second position. For example, the movement of the fluid delivery assembly 130 toward the motor drive assembly 140 can cause a housing of the motor drive assembly 140 to contact the latch mechanisms of the fluid delivery assembly 130 and urge them outward from a first position to a second position against a spring force until the fluid delivery assembly 130 is fully seated relative to the motor drive assembly 140. When the fluid delivery assembly 130 is fully seated relative to the motor drive assembly 140, the latch mechanism can automatically spring back into place into the first position (e.g., and into engagement with a complementary retention mechanism 147 such as a detent or groove of the housing of the motor drive assembly 140), locking the fluid delivery assembly 130 and motor drive assembly 140 together (e.g., so that the housings of each are not movable relative to each other). In some embodiments, as discussed above, such a latching movement can occur regardless of the orientation of the torque transfer mechanism 148 relative to the torque transfer mechanism 160 (e.g., regardless of whether the pins of the torque transfer mechanism 148 are aligned with and received within the receiving holes or are compressed by the torque transfer mechanism 160). The latching mechanism can remain locked relative to the retention mechanism 147 until a user (e.g., a clinician) engages (e.g., presses) the latch release, which disengages the spring and allows the latching mechanism to transition from the first position to the second position, allowing the fluid delivery assembly 130 to be separated from the motor drive assembly 140 when desired.

In some implementations, the force required to engage the retention mechanism(s) 137 with the retention mechanism(s) 147 (i.e., to lock the fluid delivery assembly 130 to the motor drive assembly 140) is sufficiently low (e.g., ranging from about 1 to about 20 pounds of force applied to the housing or the retention mechanism(s) 137 of the fluid delivery assembly 130) such that a user can easily activate the retention mechanism(s) 137 (e.g., the latching mechanism(s)) with a single-handed motion. The retention mechanism(s) 137 (e.g., the latching mechanism(s)) are designed to be cleanable by wiping with a disinfectant cloth or other typical cleaning material used in hospitals. In some embodiments, the retention mechanism(s) 137 of the fluid delivery assembly 130 can be female portions and the mating retention mechanism(s) 147 of the motor drive assembly 140 can be male portions such that the retention mechanism(s) 147 of the reusable motor drive assembly 140 can be easier to clean between uses (e.g., due to lacking blind holes and difficult to clean recesses). In some implementations, the retention mechanism(s) 147 of the motor drive assembly 140 can include a latch mechanism, such as the latch mechanism described above, and the retention mechanism(s) 137 of the fluid delivery assembly 130 can include a complementary receiving portion such as a detent or groove.

In some embodiments, the retention mechanism(s) 137 and/or the retention mechanism(s) 147 can include or also function as alignment features to ensure proper alignment between the fluid delivery assembly 130 and the drive assembly 140 for a fluid delivery procedure. In some embodiments, as shown in FIG. 2, the system 100 can include additional alignment features configured to encourage, urge, and/or maintain proper alignment between the fluid delivery assembly 130 and the motor drive assembly 140. The fluid delivery assembly 130 can include one or more alignment features 173 and the motor drive assembly 140 can include one or more complementary alignment features 153. The one or more alignment features 173 and the one or more complementary alignment features 153 can include, for example, posts and receiving holes for the posts, projections and one or more receiving grooves for the projections, projections which trap a portion of the other assembly between the projections, or any other suitable features which guide the fluid delivery assembly 130 into proper alignment with the motor drive assembly 140 and/or prevent rotation of the fluid delivery assembly 130 relative to the drive assembly 140 when the drive transfer mechanism 148 is providing torque to the drive mechanism 160. In some implementations, the one or more alignment features 153 of the motor drive assembly 140 protrude from a housing of the motor drive assembly 140 and interact with an outer surface of the fluid delivery assembly 130 (e.g., the one or more alignment features 173 can form receiving holes, channels, or detents in the outer surface of the fluid delivery assembly 130). In some implementations, the one or more alignment features 173 of the fluid delivery assembly 130 protrude from a housing of the fluid delivery assembly 130 and interact with an outer surface of the motor drive assembly 140 (e.g., the one or more alignment features 153 can form receiving holes, channels, or detents in the outer surface of the motor drive assembly 140).

In some implementations, one or more of the one or more alignment features 173 and one or more of the one or more alignment features 153 protrude from a housing of the fluid delivery assembly 130 and the motor drive assembly 140, respectively, while others of the one or more alignment features 173 and/or the one or more alignment features 153 form receiving holes, channels, or detents. In some implementations, the one or more alignment features 153 and/or the one or more alignment features 173 are shaped to include a gradual lead-in (e.g., are tapered to decrease in cross-sectional area farther from a housing surface from which they project) such that if the user has not perfectly aligned the motor drive assembly 140 and fluid delivery assembly 130 as the fluid delivery assembly 130 is moved toward the motor drive assembly 140, the one or more alignment features 153 and/or the one or more alignment features 173 will function as a guide and aid in the alignment of the motor drive assembly 140 and the fluid delivery assembly 130. Additionally, the one or more alignment features 153 and/or the one or more alignment features 173 can function to prevent coupling of the motor drive assembly 140 and the fluid delivery assembly 130 in a misaligned relative orientation.

In some embodiments, the fluid delivery assembly 130 can store data (e.g., on a memory of the fluid delivery assembly 130) and the data can be communicated to the motor drive assembly 140 (e.g., sent by the fluid delivery assembly 130 and/or read by the motor drive assembly 140) upon coupling of the fluid delivery assembly 130 to the motor drive assembly 140 and/or during use of the system 100 (e.g., during a pumping operation). The memory of the fluid delivery assembly 130 can be removably coupled to the motor drive assembly 140 (e.g., to the controller 141) via an electrical connection (e.g., via pogo pins or a similar removable electronic connection) such as the electrical connections 171A/171B. The data stored can include, but is not limited to, the presence or absence of a fluid warmer assembly 132 within or coupled to the fluid delivery assembly 130, a maximum flow rate of the fluid delivery assembly 130, a serial number of the fluid delivery assembly 130, an amount of infusate delivered since the fluid delivery assembly 130 was coupled to the motor drive assembly 140, and/or other similar data.

Figure 3:
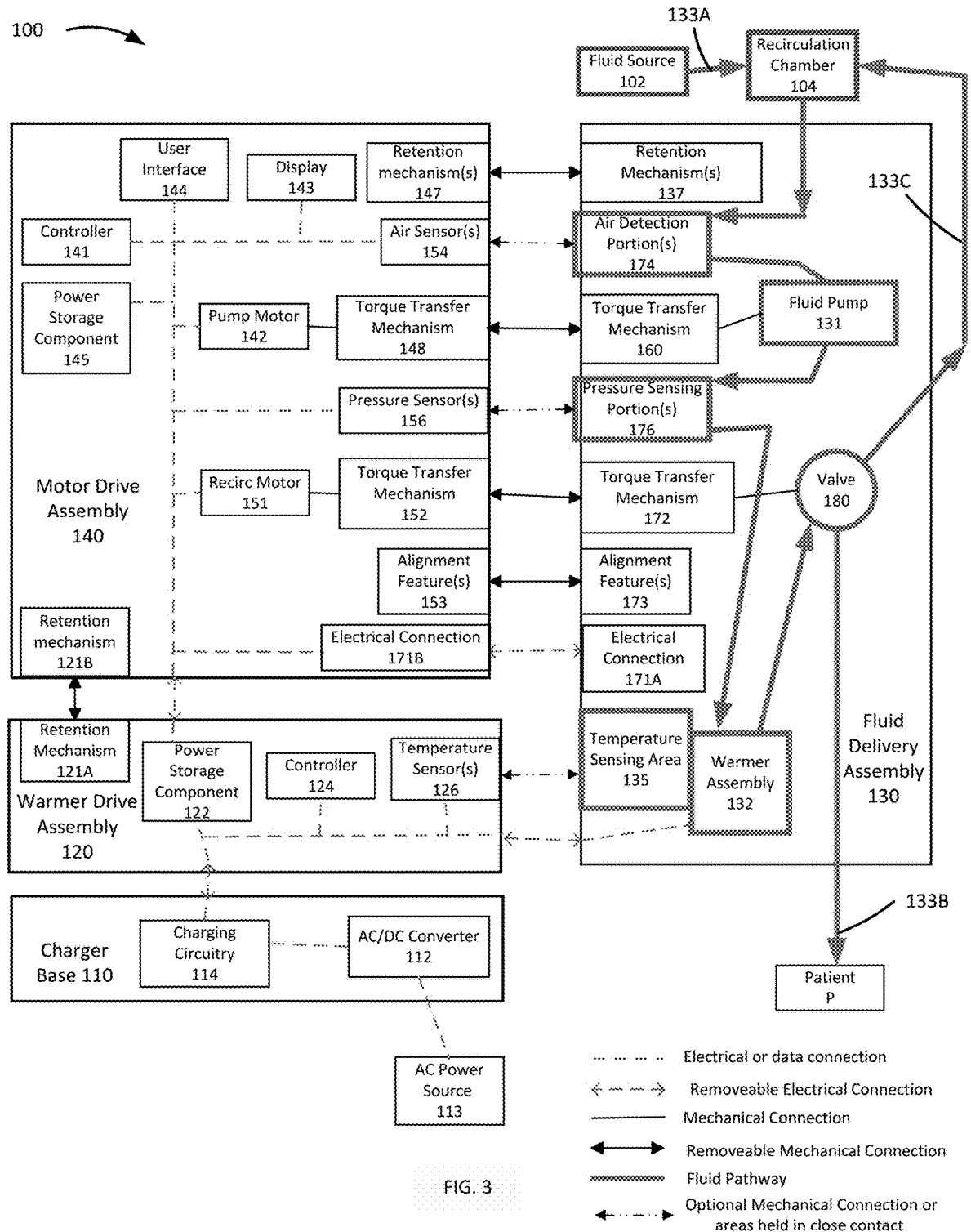
FIG. 3 is a schematic illustration of a variation of the system 100 including the warmer drive assembly 120 and the warmer assembly 132 shown in FIG. 1, with other components and subcomponents shown in more detail, according to an embodiment.

The charger base 110 can include any suitable electronic components suitable for providing operational and/or charging power to the drive assembly 140 and/or the warmer drive assembly 120, such as, for example, an alternating current to direct current (AC/DC) converter 112 and charging circuitry 114 as shown in FIGS. 2 and 3. In some embodiments, the charging circuitry 114 can include one or more power storage components, such as a battery and/or a capacitor, and/or one or more electrical controllers.

The charger base 110 can also include electrical contacts and/or an electrical connection such as an elongated wire or plug configured to electrically couple the power source included in the charger base 110 with the drive assembly 140 and/or the warmer assembly 132 to provide power from the power source in the charger base 110 to the drive assembly 140 and/or the warmer 132 (e.g., during and/or prior to use of the system 100). For example, in some embodiments, electrical current for charging power storage devices (e.g., batteries) can be transmitted from the charging circuitry 114 of the charger base 110 to the power storage component 145 of the motor drive assembly 140 and/or the power storage component 122 of the warmer drive assembly 120 via removable electrical connections. In some embodiments, the charger base 110 can be removably coupled to (e.g., engaged with) the warmer drive assembly 120, which can be removably coupled to (e.g., engaged with) the motor drive assembly 140. Charging and/or operating power can be provided from the charger base 110 to the power storage component 145 of the motor drive assembly 140 via the warmer drive assembly 120 (e.g., via the power storage component 122 of the warmer drive assembly 120). In some embodiments, the charger base 110 can be coupled directly to (e.g., engaged with) the motor drive assembly 140.

In some embodiments, the charger base 110 can include a large box and can include a clamp to hold the charger base 110 upright when connected to an IV pole. In some embodiments, the AC/DC converter 112 can be configured and sized to transmit up to 3600 W to allow for powering the warmer assembly 132 directly during rapid flow through the warmer assembly 132 (e.g., flow rates >1000 ml/min). The AC/DC converter 112 can also allow for rapid charging of the power storage component 145, the power storage component 122, a power storage component included in the charging circuitry 114, and/or any other power storage components of the system 100. In some embodiments, a smaller charger base 110 can be used (e.g., when space and/or cost is limited). In some embodiments, the AC/DC converter 112 can be configured and sized to deliver 350 W, which would allow for warming infusate at 2-6C at approximately 150 ml/min up to 38° C. Such an AC/DC converter 112 can also allow for charging of the power storage component 145, the power storage component 122, a power storage component included in the charging circuitry 114, and/or any other power storage components of the system 100 while charging and/or operating power is not needed for fluid warming by the warmer assembly 132. In some embodiments, the charger base 110 can be configured such that the warmer drive assembly 120 and/or the motor drive assembly 140 can be set down on top of the charger base (e.g., received within a recess of the charger base 110). In some embodiments, the warmer drive assembly 120 and/or the motor drive assembly 140 can be engaged with the charger base 110 via complementary alignment features and/or removable electrical connections. In some embodiments, the engagement between the warmer drive assembly 120, the motor drive assembly 140, and/or the charger base 110 can be gravity assisted. Thus, if the warmer drive assembly 120 and the motor drive assembly 140 need to travel with a patient, a clinician can quickly remove those assemblies from the charger base 110 by lifting up on the motor drive assembly 140.

In some embodiments, a simple charger can be used instead of the charger base 110. The simple charger can be much smaller than the charger base and may not include a clamp for connection to an IV pole. In some embodiments, the charger can connect to the motor drive assembly 140 via a plug rather than forming a mechanical base configured to receive and/or support the motor drive assembly 140. The smaller charger can contain a smaller AC/DC converter 112, which can transmit, for example, 10 W. Thus, use of the smaller charger may result in longer charge times than the use of the charger base 110, and may not allow for enough electrical power to rapidly warm infusate in the warmer assembly 132 without supplementing the electrical power with power from a power storage component (e.g., battery). However, the small size of this charger can allow for more compact storage in areas where storage space is extremely limited, such as ambulances or other field-based treatment areas.

FIG. 3 is a schematic illustration of a variation of the system 100 including the warmer drive assembly 120 and the warmer assembly 132 shown in FIG. 1, with other components and subcomponents shown in more detail, according to an embodiment. As shown in FIG. 3, the warmer drive assembly 120 can include a power storage component 122 (e.g., a battery), a controller 124, and one or more temperature sensors 126.

The one or more temperature sensors 126 can be configured to identify a temperature of fluid traveling through one or more portions of a fluid passageway of the fluid delivery assembly 130 (e.g., a temperature sensing area 135 of the fluid delivery assembly 130) when the warmer drive assembly 120 is mechanically coupled to the warmer assembly 132. The one or more portions of the fluid passageway can be included in or coupled to the warmer assembly 132 (e.g., upstream, downstream, or within the warmer assembly 132), and can be a portion of a fluid tube (e.g., a flexible fluid tube) or a fluid channel (e.g., a rigid fluid channel defined by a housing).

In some embodiments, as described above, the one or more temperature sensors 126 can be configured to measure the infusate temperature in the warmer assembly 132, which may be located in the fluid delivery assembly 130. In some embodiments, the one or more temperature sensors 126 can include a thermocouple, a thermistor, and/or another temperature measuring device, which are configured to measure the temperature of fluid within the temperature sensing area 135 of the fluid delivery assembly 130 when the fluid delivery assembly 130 is coupled to the warmer drive assembly 120. Alternatively, in some embodiments, the one or more temperature sensors 126 can include a controller configured to be releasably operatively coupled to and receive signals from a thermocouple, a thermistor, and/or another temperature measuring device, which can be included, for example, in the fluid delivery assembly 130 (e.g., as part of or coupled to the warmer assembly 132) to measure a temperature of fluid in the temperature sensing area 135 of the fluid delivery assembly 130. The controller of the one or more temperature sensors 126 can interpret the received signals and provide infusate temperature information based on the received signals to the controller 124. Alternatively, in some embodiments, the one or more temperature sensors 126 includes an infrared sensor configured to detect the temperature of a portion of the fluid delivery assembly 130 which is contact with the fluid (e.g., warmed fluid). For example, the infrared sensor can interface with a portion of the fluid delivery assembly 130 in contact with the fluid and disposed within the temperature sensing area 135 in the fluid delivery assembly 130.

The temperature sensing area 135 can include a portion of the warmer assembly 132 and/or an area near the warmer assembly 132 which allows for detection of fluid temperature and is in communication with the one or more temperature sensors 126. In some embodiments, the temperature sensing area 135 includes a thermocouple, thermistor, or other temperature measuring device which is disposed within a fluid path (e.g., a fluid channel or tube) an in direct contact with the infused fluid. The thermocouple, thermistor, or other temperature measuring device can be configured to communicate electronically with a temperature sensor 126 of the warmer drive assembly 120 (e.g., via a removable data connection such as electrical contacts). In some embodiments, the temperature sensor 126 can include temperature sensing hardware configured to determine temperature characteristics of the fluid in the fluid path in contact with the temperature measuring device based on the data provided by the temperature measuring device to the temperature sensor 126. Thus, the temperature of the fluid in the fluid path can be directly measured.

In some embodiments, the temperature sensing area 135 includes a thermocouple, thermistor, or similar temperature sensing device which is disposed directly adjacent to the fluid path, but not in contact with the fluid path or infusate. The temperature measuring device can provide data to the temperature sensor 126 for processing similarly as described above with respect to the temperature measuring device disposed in contact with fluid in the fluid path. In some embodiments, for example, the temperature sensing area 135 of the fluid delivery assembly 130 can include a portion of the fluid delivery assembly 130 in direct contact with fluid within the fluid path (e.g., within the warmer assembly 132). The temperature sensing area 135 can be formed of a material having a very small thermal mass and high thermal conductivity such that the temperature sensing area 135 approximates the fluid temperature and changes temperature rapidly in response to the fluid in contact with the temperature sensing area 135 changing temperature. In some embodiments, the temperature sensing area 135 includes a small and thin metal plate. The one or more temperature sensors 126 of the warmer drive assembly 120 can couple to and measure the temperature of the temperature sensing area 135 when the warmer assembly 132 is coupled to the warmer drive assembly 120. The temperature sensor 126 can include, for example, a thermocouple, thermistor, infrared (IR) sensor, and/or a similar device and temperature sensing hardware directly coupled thereto.

In some embodiments, rather than the temperature sensor 126 of the warmer drive assembly 120 directly reading the temperature of the thin portion of material of the temperature sensing area 135, a thermocouple, thermistor, infrared (IR) sensor or other device suitable for sensing temperature can be included in the fluid delivery assembly 130 and disposed in contact with or close proximity to the thin portion of material in contact with infusate. Such a temperature sensing device within the fluid delivery assembly 130 can communicate with the controller 124 and/or the one or more temperature sensors 126 via reversible electrical connections (e.g., pogo pins).

In some embodiments, as described herein, a thermocouple or thermistor can be disposed directly in the fluid channel in contact with fluid and electrical insulation may be included to keep the electricity being used to create heat in the heating element from shorting into the thermocouple or thermistor. In some embodiments, the temperature sensing area 135 can be disposed at the exit of the warmer assembly 132 (e.g., where a maximum temperature of the infused fluid can be measured). In some embodiments, the fluid delivery assembly 130 can include additional temperature sensing areas 135, such as at the fluid inlet to the warmer assembly 132 and/or at various locations through the warmer assembly 132.

The controller 124 can be an electronic controller configured to receive data from the pump motor 142 (e.g., when the warmer drive assembly 120 is operatively coupled to the motor drive assembly 140), to receive data from the one or more temperature sensors 126, and/or to receive data from the power storage component 122. Based on the received data, the controller 124 can control the warmer assembly 132 to cause the warmer assembly 132 to maintain an output fluid temperature at a target temperature or within a target range. For example, the output fluid temperature can be about 38° C. In some embodiments, the controller 124 can be configured to determine an appropriate amount of power to provide to the warmer assembly 132 such that the warmer assembly 132 maintains an output fluid temperature at the target temperature or within the target range.

The power storage component 122 can be configured to provide enough power to the warmer assembly 132 to warm infusate to the target temperature or to the target temperature range. In some embodiments, the power storage component 122 can be configured to provide enough power to warm infusate from an initial temperature in a range from about 2° C. to about 6° C. to a target temperature of about 38° C. In some embodiments, the power storage component 122 can have a sufficiently large power capacity (e.g., a battery that is sufficiently large) such that the power storage component 122 can provide sufficient power to the warmer assembly 132 to warm several liters of infusate. In some embodiments, the power storage component 122 can have a smaller power capacity (e.g., include a smaller battery) such that the power storage component 122 is configured to provide sufficient power to the warmer assembly 132 to warm a smaller volume of infusate.

In use, the fluid delivery assembly 130 can be coupled to the motor drive assembly 140 such that, via one motion, the torque transfer mechanism 148 is operably coupled to the torque transfer mechanism 160, the torque transfer mechanism 152 is operably coupled to the torque transfer mechanism 172, the one or more pressure sensors 156 are operably coupled to the one or more pressure sensing portions 176, the one or more air sensors 154 are operably coupled to the one or more air detection portions 174, the retention mechanism(s) 147 are operably coupled to the retention mechanism(s) 137, the alignment feature(s) 153 are operably coupled to the alignment feature(s) 173, and/or the electrical connection 171B is operably coupled to the electrical connection 171A. Additionally, if the motor drive assembly 140 is coupled to the warmer drive assembly 120 and the fluid delivery assembly 130 includes the warmer assembly 132, the warmer drive assembly 120 can also be operably coupled to the fluid delivery assembly 130 via the one motion for simultaneous coupling of the one or more temperature sensors 126 with the temperature sensing area 135 and/or data connections between the warmer assembly 132 and the warmer drive assembly 120 at the same time as the couplings between mating components of the motor drive assembly 140 and the fluid delivery assembly 130.

The fluid line 133A can be fluidically coupled to a fluid source 102 (e.g., via a fluid connector such as an IV tubing spike) and can be fluidically coupled to one or more blood filters and/or chambers disposed in line with the fluid source 102 and the fluid line 133A. The fluid source 102 can include, for example, a bag of IV fluid, a bag of whole blood, a bag of packed red blood cells, a bag of plasma, and/or any other appropriate medical fluid (e.g., any medical fluid used for resuscitation). The fluid line 133B can be fluidically coupled to a patient (e.g., a patient's vasculature) via, for example, a luer lock connector attached to a patient's IV access. The motor drive assembly 140 can then initiate operation of the motor 142 (under control of the user via the user interface 144) such that the fluid pump 131 operates to dispense fluid via the fluid line 133B. In some embodiments, some or all of the components of the system 100 can be included in a kit, such as a kit including a box or bag and including any suitable number of fluid (e.g., blood or saline) bags and the components or a subset of the components of the system 100.

In some embodiments, the fluid delivery assembly 130 can include a fluid delivery assembly housing and the motor drive assembly 140 can include a motor drive assembly housing. The fluid delivery assembly housing can define an interior space within which the fluid pump 131 and the recirculation valve 180 can be disposed. The torque transfer mechanism 160 and the torque transfer mechanism 172 can be disposed on an outer surface of and/or within the fluid delivery assembly housing. In some embodiments, the fluid delivery assembly housing can enclose the fluid pump 131, a portion of the torque transfer mechanism 160, and a portion of the torque transfer mechanism 172, and the fluid delivery assembly housing can define an opening for engagement between the torque transfer mechanism 160 and the torque transfer mechanism 148 and an opening for engagement between the torque transfer mechanism 172 and the torque transfer mechanism 152. The fluid delivery assembly housing can define openings through which the inlet fluid line 133A, a recirculation fluid line 133C, and the outlet fluid line 133B can pass. The warmer assembly 132 can be disposed within the fluid delivery assembly housing or can be coupled thereto (e.g., and disposed within a warmer assembly housing).

The motor drive assembly housing can define an interior space within which the controller 141, the pump motor 142, the power storage component 145, and the recirculation motor 151 can be disposed. The torque transfer mechanism 148 and the torque transfer mechanism 152 can each be disposed on an outer surface of and/or within the motor drive assembly housing. In some embodiments, the motor drive assembly housing can enclose the controller 141, the power storage component 145, the pump motor 142, the recirculation motor 151, at least a portion of the torque transfer mechanism 148, and at least a portion of the torque transfer mechanism 152. The motor drive assembly housing can define an opening through which the torque transfer mechanism 148 can engage with the torque transfer mechanism 160.

The retention mechanism(s) 137 and the one or more alignment features 173 can be disposed on or coupled to an outer surface of the fluid delivery assembly housing and the retention mechanism(s) 147 and the one or more alignment features 153 can be disposed on or coupled to an outer surface of the motor drive assembly housing. Additionally, the air detection portion(s) 174 and the pressure sensing portion(s) 176 can be disposed on, coupled to, or accessible via corresponding openings defined by the fluid delivery assembly housing. Similarly, the one or more air sensors 154 and the one or more pressure sensors 156 can be disposed on, coupled to, or accessible via corresponding openings defined by the motor drive assembly housing.

In some embodiments, the fluid delivery assembly housing and the motor drive assembly housing can be shaped and sized such that, when the motor drive assembly 140 and the fluid delivery assembly 130 are properly coupled for a pumping operation (e.g., the torque transfer mechanism 160 is engaged with the torque transfer mechanism 148, the torque transfer mechanism 172 is engaged with the torque transfer mechanism 152, and any sensors, electrical contacts, alignment feature(s), and/or retention mechanism(s) are properly engaged), a surface of the fluid delivery assembly housing abuts a surface of the motor drive assembly housing (e.g., the surfaces through which the torque transfer mechanism 160 and the torque transfer mechanism 148 engage).

In some embodiments, the charger base 110 can include a charger base housing having an upper portion configured to mate with (e.g., receive) a lower portion of the housing of the warmer drive assembly 120 and/or a lower portion of the housing of the motor drive assembly 140 (e.g., within a recess defined in an upper surface of the housing of the charger base 110). The warmer drive assembly 120 can include a housing having an upper portion configured to mate with (e.g., receive) a lower portion of the housing of the motor drive assembly 140 (e.g., within a recess defined in an upper surface of the housing of the warmer drive assembly 120). Thus, the motor drive assembly 140 can be configured to be coupled to an opposite side of the warmer drive assembly 120 than the charger base 110. As shown in FIG. 3, in some embodiments, the warmer drive assembly 120 can be secured to the motor drive assembly 140 via a retention mechanism 121A configured to releasably mate with a retention mechanism 121B of the motor drive assembly 140. The retention mechanisms 121A and 121B can include any suitable retention mechanisms, such as any of the retention mechanisms described herein, such as one or more releasable latches.

FIGS. 4-23 are views of various implementations of a system 200 and components thereof. The system 200 can be the same as or similar in structure and/or function to any of the systems described herein, such as the system 100 described above. For example, the system 200 can include a fluid delivery assembly 230 and a motor drive assembly 240 that are the same as or similar in structure and/or function to the fluid delivery assembly 130 and the motor drive assembly 140, respectively. Additionally, the system 200 can include a charger base 210, a warmer drive assembly 220, and/or a warmer assembly 232 that can be the same as or similar in structure and/or function to the charger base 110, the warmer drive assembly 120, and the warmer assembly 132, respectively.

More specifically, similar to the fluid delivery assembly 130, the fluid delivery assembly 230 can include a fluid pump 231 and a torque transfer mechanism 260. The fluid delivery assembly 230 can also include a recirculation valve 280 and a torque transfer mechanism 272. The fluid pump 231 can be the same as or similar to the fluid pump 131 and the recirculation valve 280 can be the same as or similar to the recirculation valve 180. The torque transfer mechanism 260 and the torque transfer mechanism 272 can be the same as or similar to the torque transfer mechanism 160 and the torque transfer mechanism 172, respectively. For example, the torque transfer mechanism 260 includes a plate 260A defining a set of receiving holes 260B and the torque transfer mechanism 272 includes a plate 272A defining a set of receiving holes 272B.

The fluid delivery assembly 230 includes a housing 238 and a pair of retention mechanisms 237 formed as latches. The fluid delivery assembly 230 also includes a data connection 239A and pressure sensors 256. The fluid delivery assembly 230 also includes alignment features 273 (e.g., recesses) defined by an outer surface of the housing 238. The fluid delivery assembly 230 also includes air detection portions 274 (shown, e.g., in FIG. 8) that include portions of fluid tubing in fluid communication with the pump 231. The warmer assembly 232 can be included in the fluid delivery assembly 230 and can include a data connection 239B, a temperature sensor 235A, and an electrical connection 239C. The recirculation valve 280 includes a recirculation chamber 280A and a stopcock 280B (also referred to as a stopcock plug) disposed within the recirculation chamber 280A. The recirculation valve 280 also includes an inlet 282A, a first outlet 282B, a second outlet 282C, each configured to be in selective fluid communication with an interior of the recirculation chamber 280A depending on the position of the stopcock 280B within the recirculation chamber 280A.

Similar to the motor drive assembly 140, the motor drive assembly 240 can include a controller (not shown), a user interface 244, a display 243, a pump motor (not shown), and a torque transfer mechanism 248. Additionally, the motor drive assembly 240 can include a recirculation motor (not shown) and a torque transfer mechanism 252. The pump motor 242 and the recirculation motor can be the same as or similar to the controller 141 and the recirculation motor 151, respectively. The torque transfer mechanism 248 and the torque transfer mechanism 252 can be the same as or similar to the torque transfer mechanism 148 and the torque transfer mechanism 152, respectively. For example, the torque transfer mechanism 248 includes a plate 248A defining a set of pins 248B and the torque transfer mechanism 252 includes a plate 252A defining a set of pins 252B, and the torque transfer mechanism 248 and the torque transfer mechanism 252 are configured to operatively mate with the torque transfer mechanism 260 and the torque transfer mechanism 272 of the fluid delivery assembly 230, respectively.

The motor drive assembly 240 includes a housing 249, a handle 249A (e.g., disposed on an upper surface of the housing), and electrical connections 249B. The motor drive assembly 240 also includes a pair of retention mechanisms 247 disposed on opposite sides of the housing 249 and including a latch retention portion 247A and a latch release 247B. Each of the latch retention portions 247A are configured to releasably engage with a latch 237 of the fluid delivery assembly 230 and the engagement is configured to be released via depression of the latch release 247B. The motor drive assembly 240 also includes alignment features 253 extending from an outer surface of the housing 249 and configured to engage with alignment features 273 defined by the outer surface of the housing 238 of the fluid delivery assembly 230.

Similar to the charger base 110, the charger base 210 can include, for example, an AC/DC converter and charging circuitry (not shown). Additionally, the charger base 210 can include a housing 218 and an optional display 216 configured to show a status of the charger base 210 (e.g., an operation status, a charge level of an internal power storage device of the charger base). Similar to the warmer drive assembly 120, the warmer drive assembly 220 can include a housing 215, warmer electrical connections 211, a data connection 213, and a temperature sensor 226.

Figure 4:
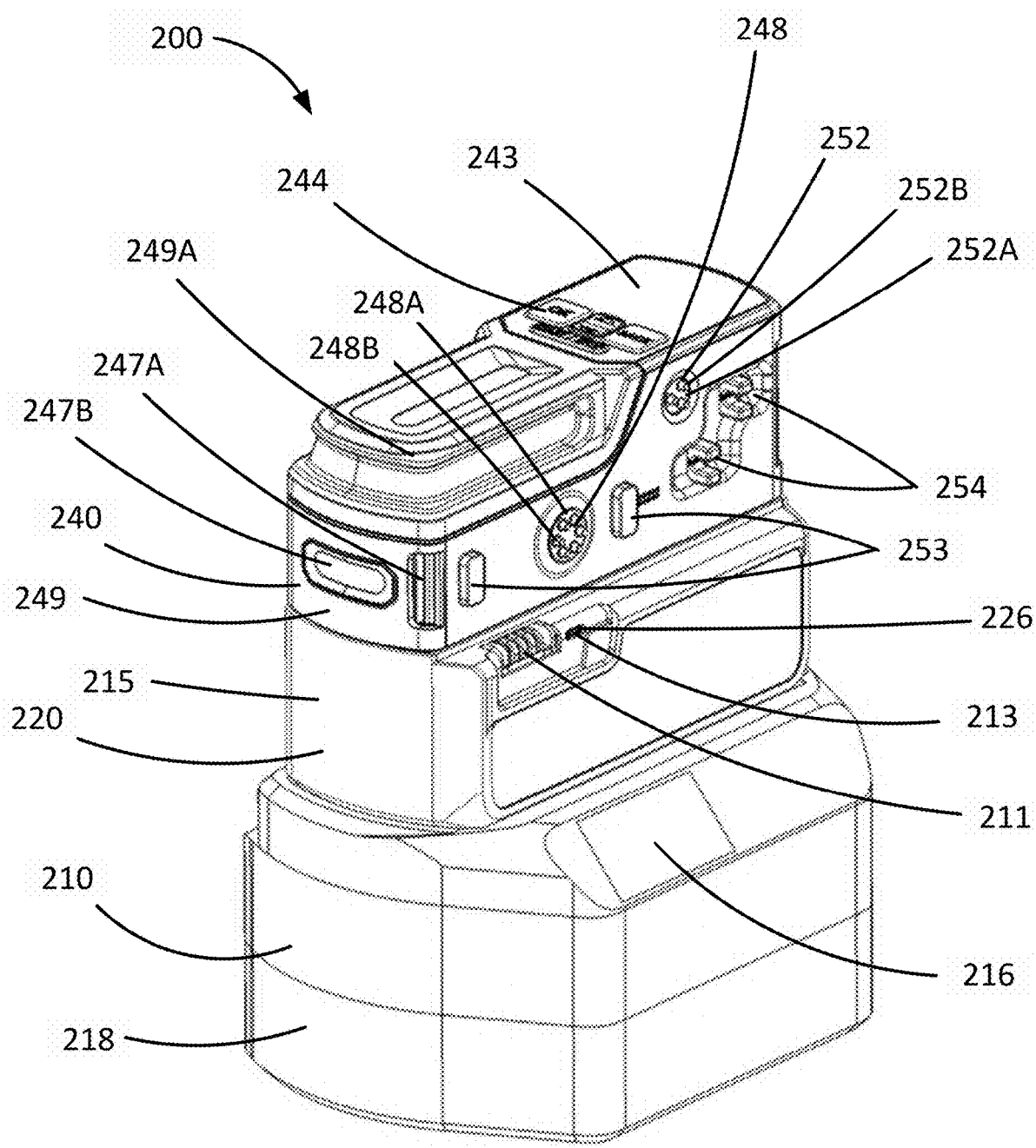

FIG. 4 is a perspective view of a configuration of the system 200 in which the motor drive assembly 240 is coupled to the warmer drive assembly 220 and the warmer drive assembly 220 is coupled to the charger base 210. In some implementations, the configuration shown in FIG. 4 can be considered to be a reusable assembly that is configured to be coupled to a disposable or consumable assembly (e.g., the fluid delivery assembly 230). As shown, an upper portion of the housing 218 of the charger base 210 can be configured to receive a lower portion of the housing 215 of the warmer drive assembly 220 (e.g., within a recess defined in an upper surface of the housing 218). An upper portion of the housing 215 of the warmer drive assembly 220 can be configured to receive a lower portion of the housing 249 of the motor drive assembly 240 (e.g., within a recess defined in an upper surface of the housing 215). Thus, the motor drive assembly 240 can be configured to be coupled to an opposite side of the warmer drive assembly 220 than the charger base 210. In some embodiments, the housing 249 of the motor drive assembly 240 can have a same or similarly shaped and sized lower portion as the housing 215 of the warmer drive assembly 220 such that the motor drive assembly 240 can be directly coupled to the upper surface of the charger base 210 as an alternative to being coupled to the charger base 210 via the warmer drive assembly 220 (e.g., if warming of fluid is not needed or if only the motor drive assembly 240 needs to be charged).

The system 200 can be operated in the configuration shown in FIG. 4 to charge power storage components of the motor drive assembly 240 and/or the warmer drive assembly 220 and/or to control the dispensing and/or warming of fluid via the fluid delivery assembly 230 upon coupling of the fluid delivery assembly 230 to the motor drive assembly 240 and/or the warmer drive assembly 220.

Figure 5:
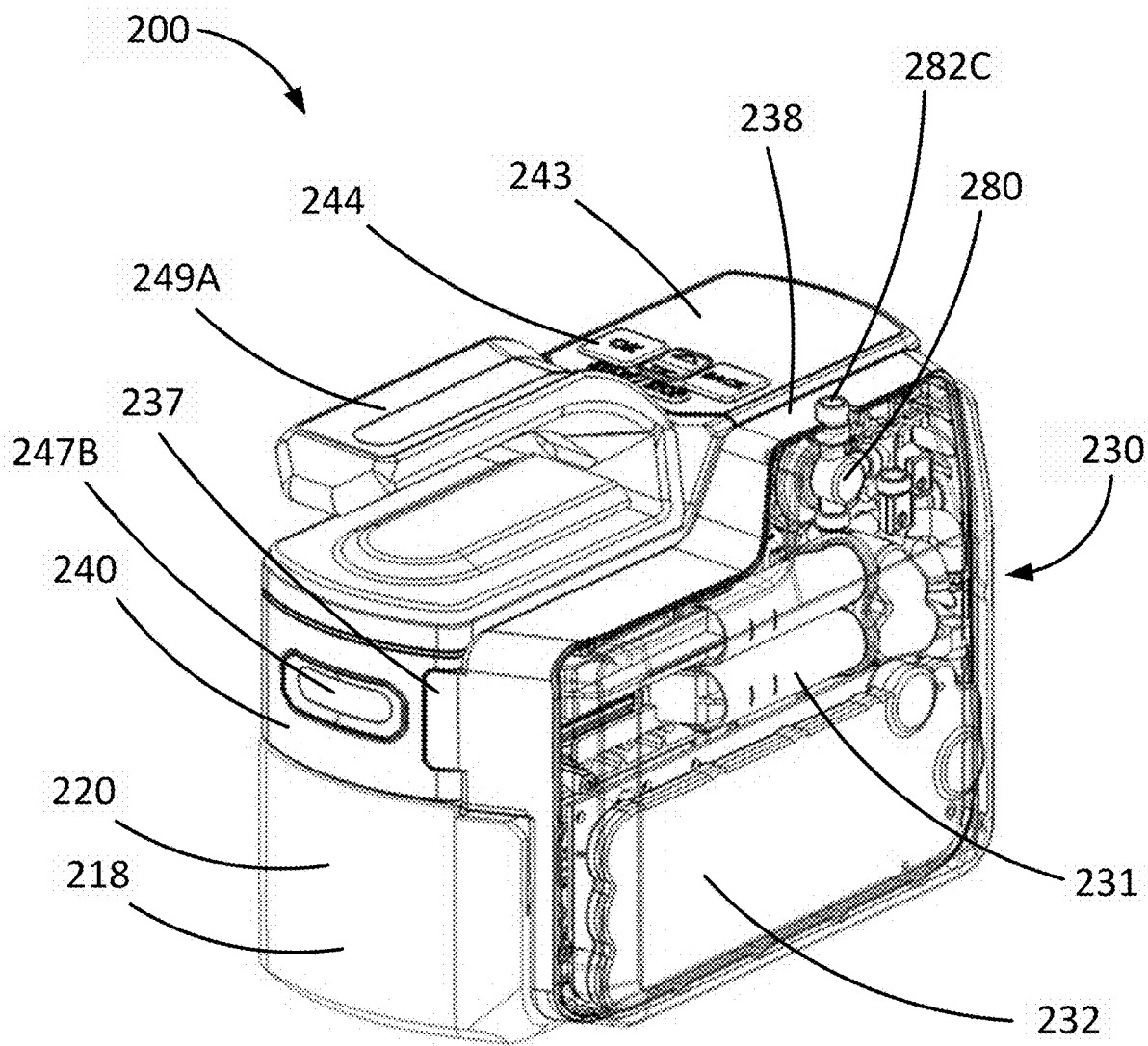

As shown in FIG. 5, the motor drive assembly 240 and the warmer drive assembly 220 can operate independently from the charger base 210. FIG. 5 is a perspective view of the motor drive assembly 240 coupled to the warmer drive assembly 220, and with both the motor drive assembly 240 and the warmer drive assembly 220 coupled to the fluid delivery assembly 230. In some embodiments, such as is shown in FIG. 5, the fluid delivery assembly 230 includes the warmer assembly 232. In some embodiments, the housing 238 of the fluid delivery assembly 230 can be at least partially transparent, as shown in FIG. 5, such that the internal components of the fluid delivery assembly 230 can be viewed during operation to ensure proper functioning.

Figure 6:
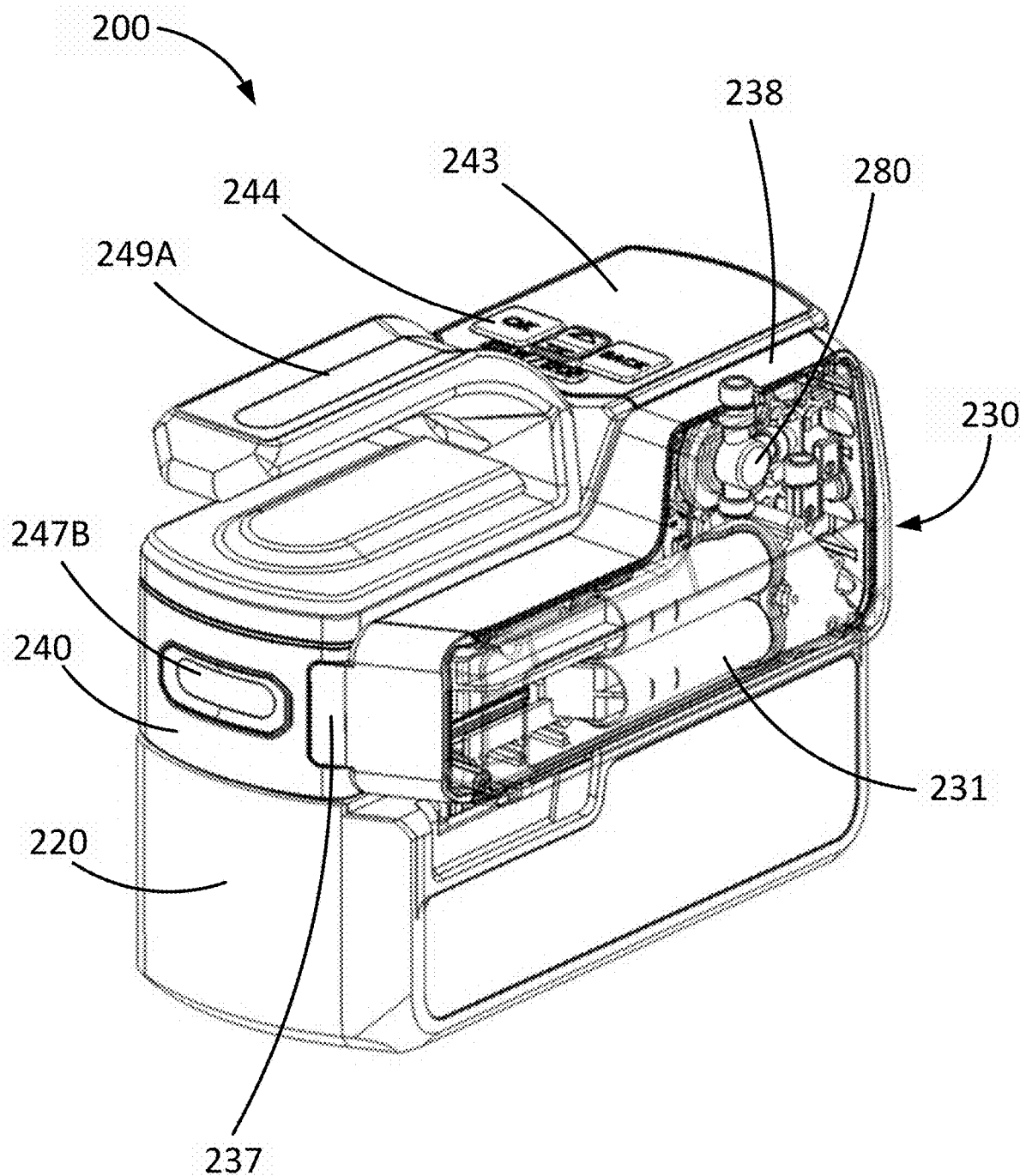

In some embodiments, the fluid delivery assembly 230 can not include the warmer assembly 232, but can still be operatively coupled to the motor drive assembly 240 while the motor drive assembly 240 is coupled to the warmer drive assembly 220. For example, FIG. 6 is a perspective view of the motor drive assembly 240 coupled to the warmer drive assembly 220 and to the fluid delivery assembly 230. In the embodiment shown in FIG. 6, the fluid delivery assembly 230 does not include the warmer assembly 232. Thus, the motor drive assembly 240 and the warmer drive assembly 220 can be operatively coupled and ready to receive and control a pumping operation of a fluid delivery assembly 230 regardless of whether or not the fluid delivery assembly 230 includes the warmer assembly 232.

Figure 7:
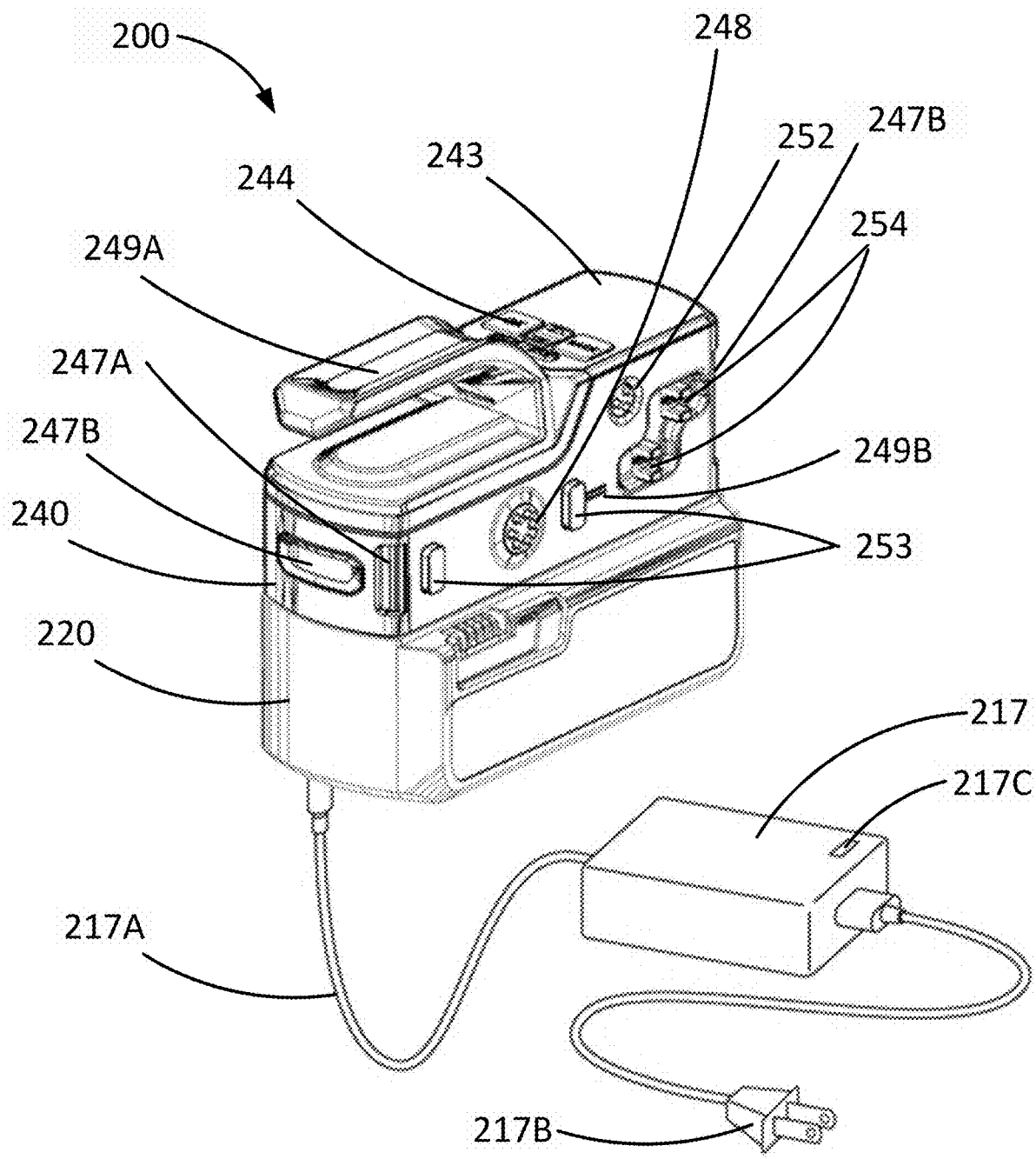

In some embodiments, rather than coupling the warmer drive assembly 220 or the motor drive assembly 240 to the charger base 210 for charging of internal power storage components of the warmer drive assembly 220 and/or the motor drive assembly 240, the warmer drive assembly 220 and/or the motor drive assembly 240 can be alternatively and/or additionally configured to be coupled to a smaller charger device via a cord coupled to an electrical connection port of the warmer drive assembly 220 and/or the motor drive assembly 240. For example, FIG. 7 is a perspective view of the motor drive assembly 240 coupled to the warmer drive assembly 220 and the warmer drive assembly 220 coupled to a charger device 217. The charger device 217 includes a DC charging cord 217A, an AC wall power plug 217B, and an indicator 217C configured to indicate a charging status of the charger device 217. The charger device 217 is configured to convert AC power to DC power (via an AC/DC converter included therein) and provide the DC power to the warmer drive assembly 220 and/or the motor drive assembly 240 to increase the power storage supply of an internal power storage component thereof and/or to provide operating power to one or both of the warmer drive assembly 220 and/or the 240.

Figure 8:
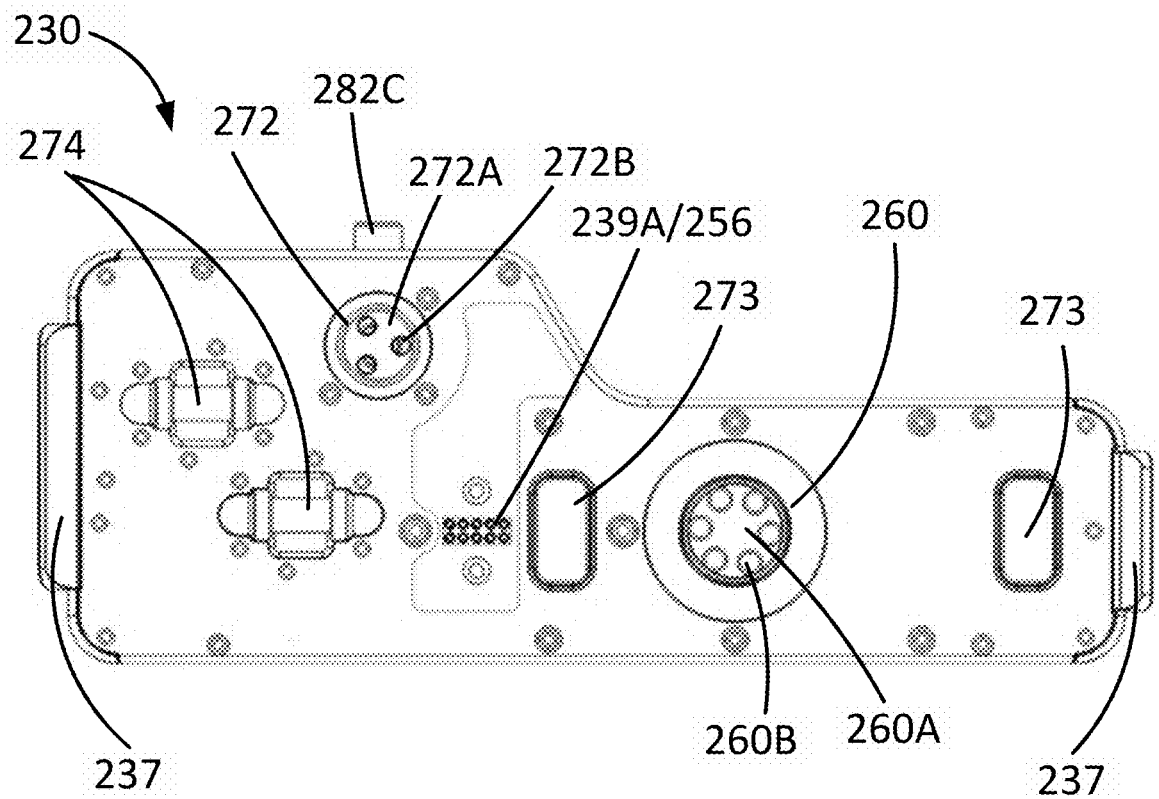
Figure 9:
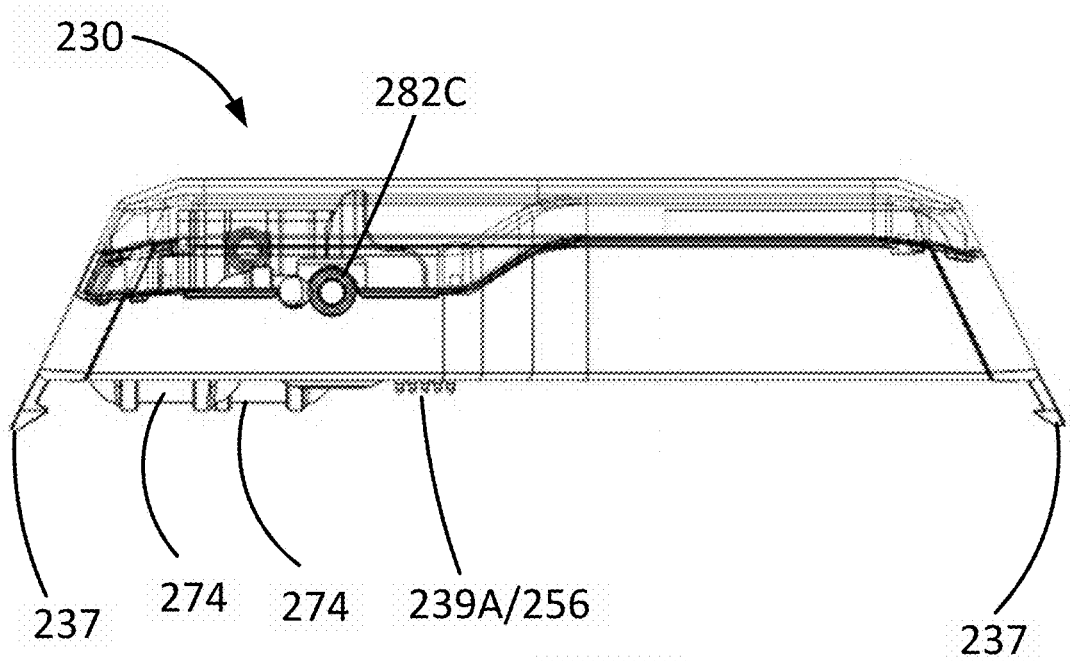

FIGS. 8 and 9 are a side view and a top view of an implementation of the fluid delivery assembly 230 not including the warmer 232. As shown in FIG. 8, all of the components of the fluid delivery assembly 230 configured to interface or operatively couple with a component of the motor drive assembly 240 can be disposed on or accessible via the same side of the fluid delivery assembly 230. Thus, the associated components can be configured to interface or mate simultaneously when the fluid delivery assembly 230 is coupled to the motor drive assembly 240.

Figure 10:
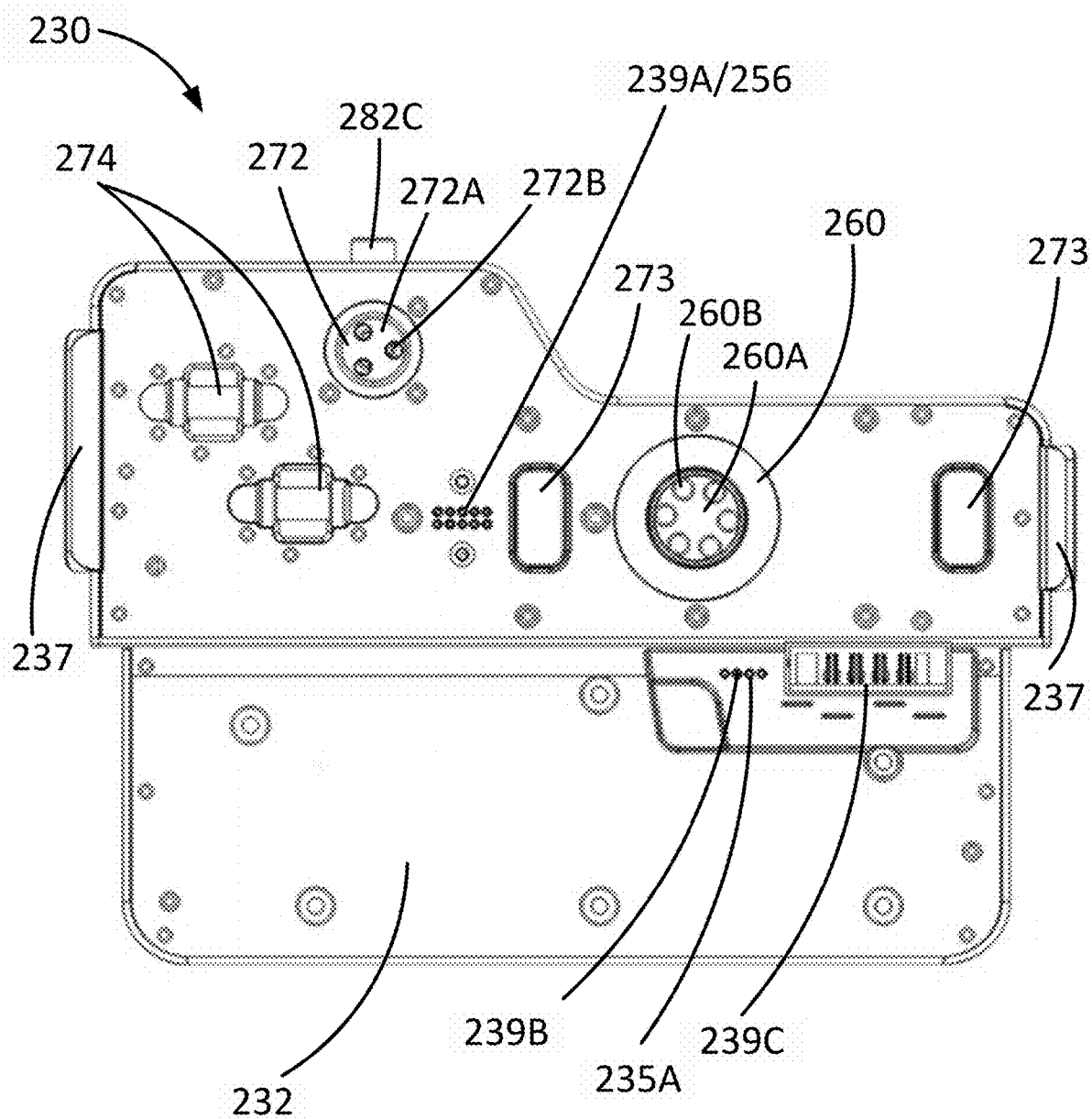

FIG. 10 is a side view of the fluid delivery assembly 230 including the warmer 232. As shown in FIG. 10, all of the components of the fluid delivery assembly 230, including components of the warmer 232, configured to interface or operatively couple with a component of the motor drive assembly 240 or the warmer drive assembly 220 can be disposed on or accessible via the same side of the fluid delivery assembly 230. Thus, the associated components can be configured to interface or mate simultaneously when the fluid delivery assembly 230 is coupled to the motor drive assembly 240 and the warmer drive assembly 220.

Figure 11:
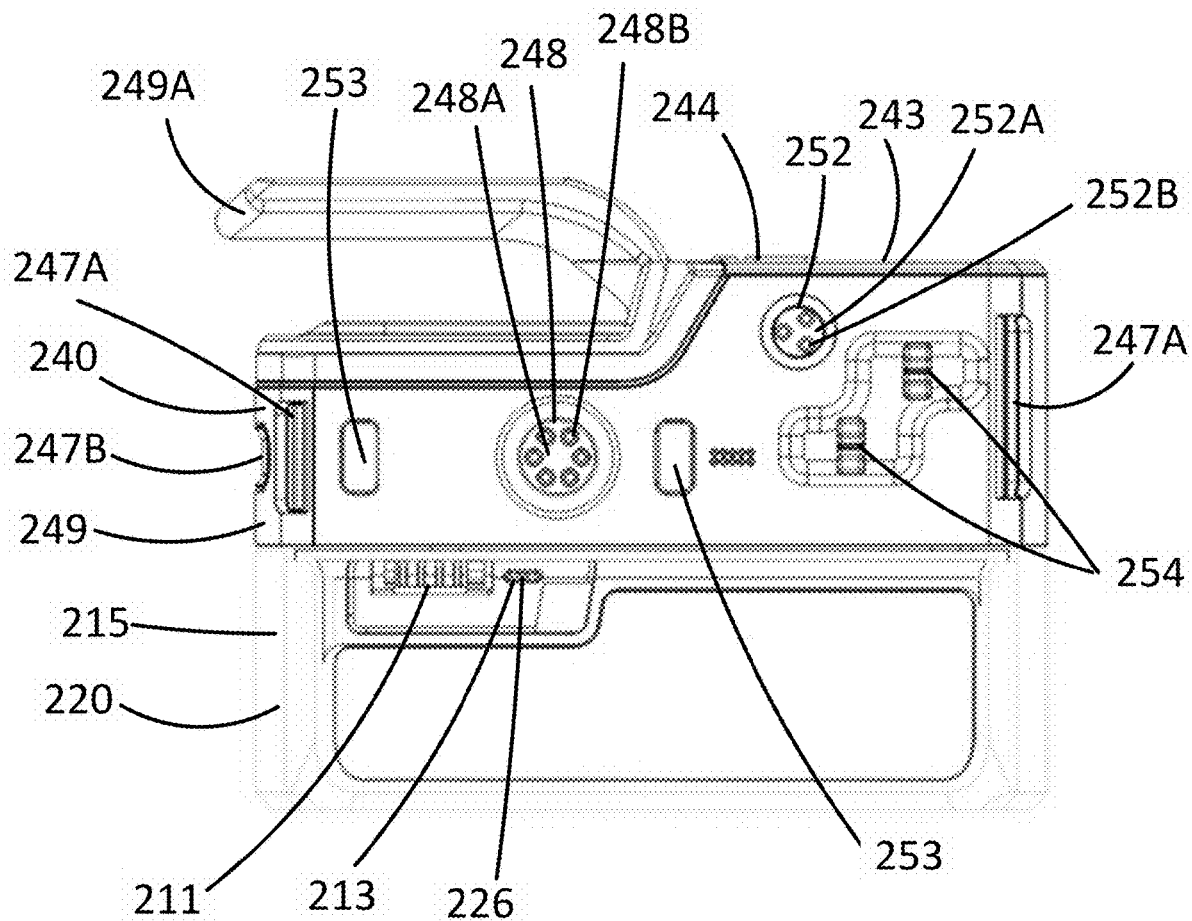

FIG. 11 is a side view of the motor drive assembly 240 coupled to the warmer drive assembly 220. As shown in FIG. 11, all of the components of the motor drive assembly 240 configured to interface or operatively couple with a component of the fluid delivery assembly 230 can be disposed on or accessible via the same side of the motor drive assembly 240. Similarly, as also shown in FIG. 11, all components of the warmer drive assembly 220 configured to interface with or operatively coupled with a component of the fluid delivery assembly 230 (e.g., the warmer 232) can be disposed on the same side of the warmer drive assembly 220 that is also facing the same direction as the side of the motor drive assembly 240 configured to interface with the fluid delivery assembly 230.

Figure 12:
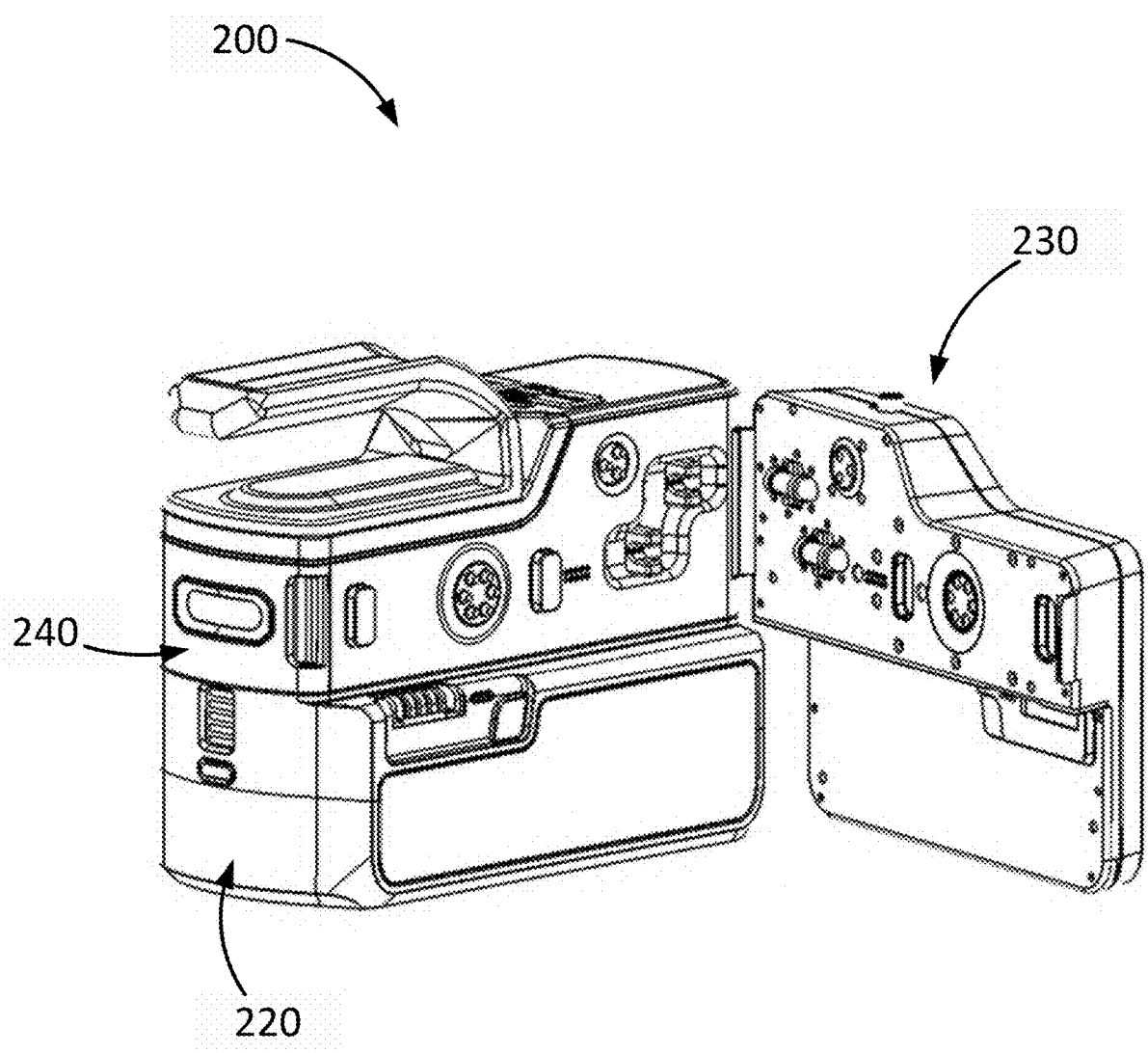

FIG. 12 is a perspective view of the system 200 in a configuration in which the motor drive assembly 240 is coupled to the warmer drive assembly 220, and neither are coupled to the fluid delivery assembly 230. The fluid delivery assembly 230 is shown disposed at an angle relative to the motor drive assembly 240 and the warmer drive assembly 220, with components configured to interface or couple disposed a similar distance from an axis of rotation about which the fluid delivery assembly 230 is rotated relative to the motor drive assembly 240 and the warmer drive assembly 220.

Figure 13:
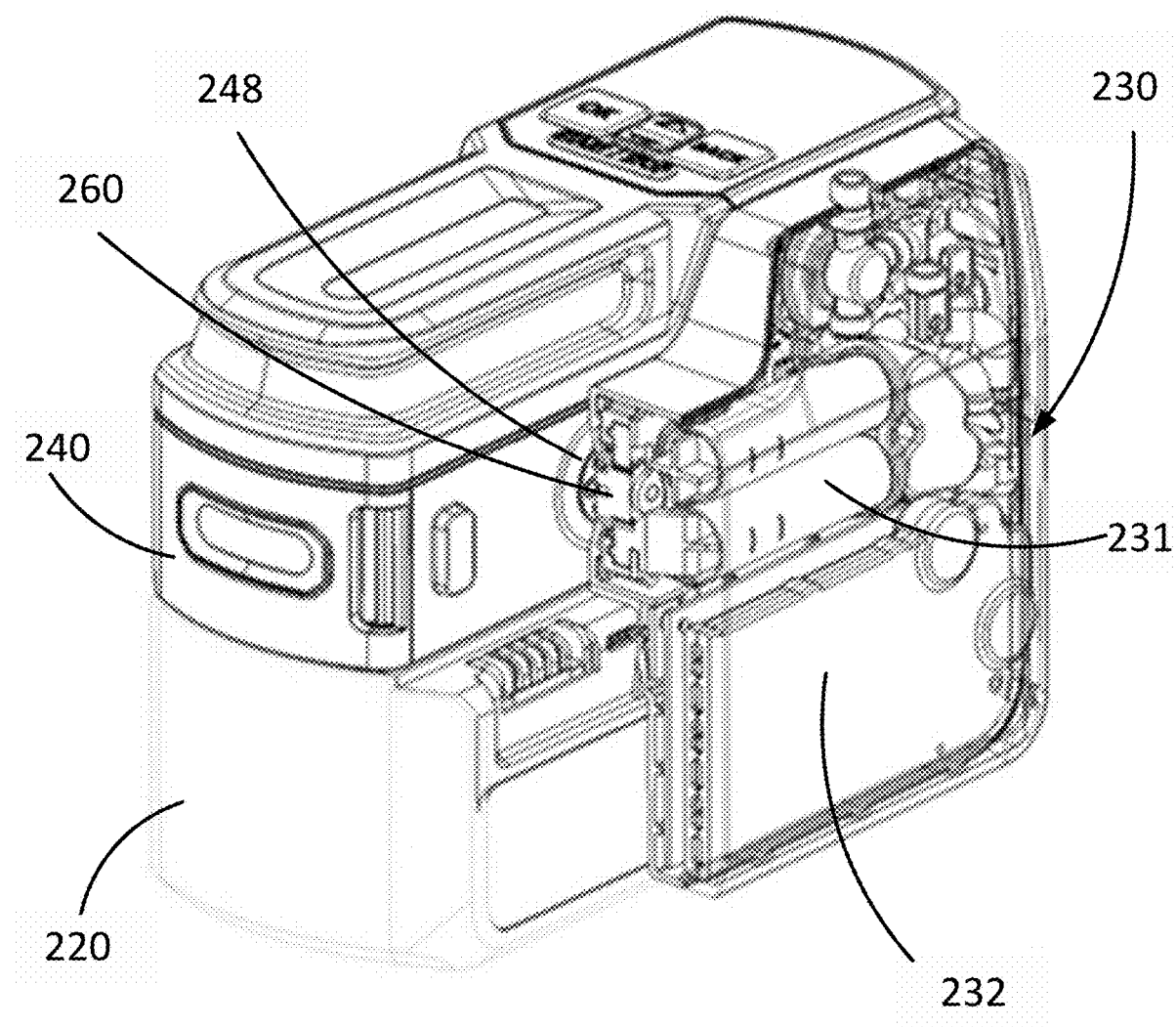

FIG. 13 is a perspective view of the system 200 in a configuration including the warmer drive assembly 220, the motor drive assembly 240, and the fluid delivery assembly 230 including the warmer assembly 232, with the fluid delivery assembly 230 only partially shown so that a cross-section through the torque transfer mechanism 260, the fluid pump 231, and the warmer assembly 232 is visible.

Figure 14:
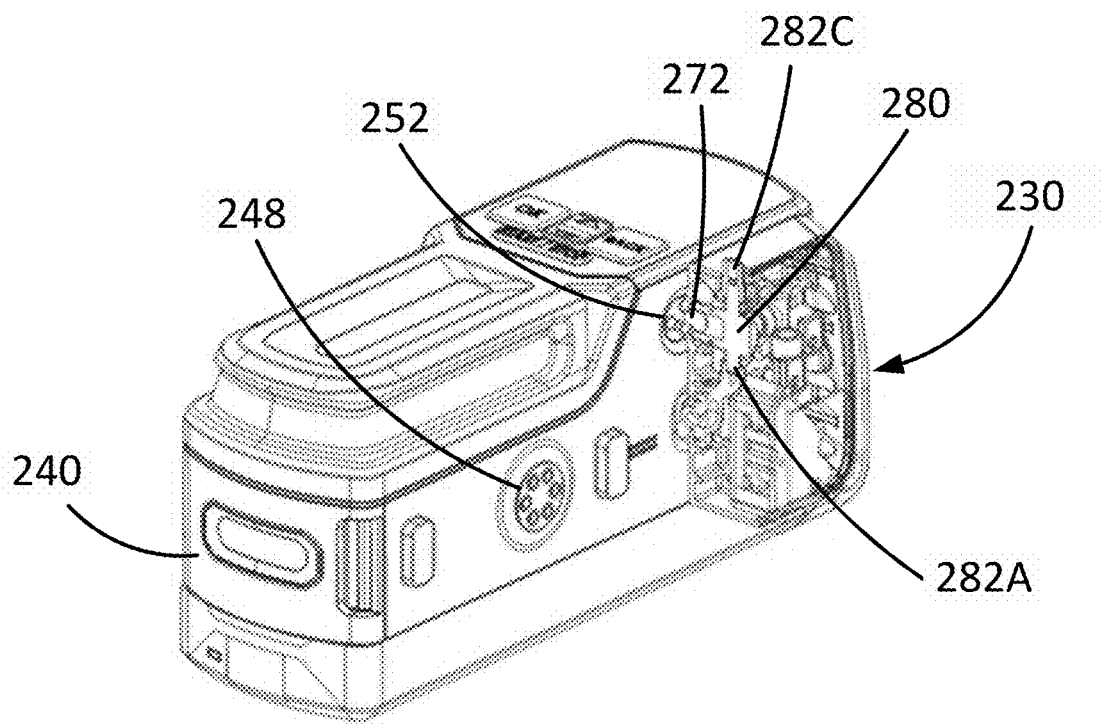

FIG. 14 is a perspective view of the system 200 in a configuration including the motor drive assembly 240 and the fluid delivery assembly 230 not including the warmer assembly 232, with the fluid delivery assembly 230 only partially shown so that a cross-section through the torque transfer mechanism 272 and the recirculation valve 280 is visible.

Figure 15:
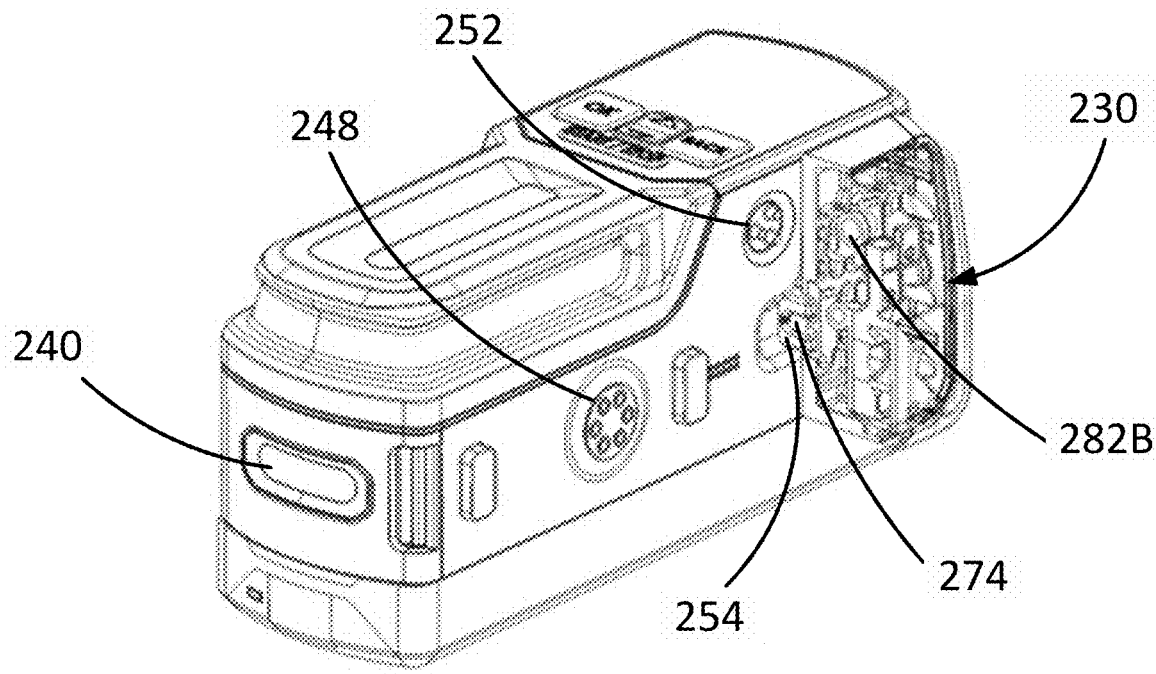

FIG. 15 is a perspective view of the system 200 in a configuration including the motor drive assembly 240 and the fluid delivery assembly 230 not including the warmer assembly 232, with the fluid delivery assembly 230 only partially shown so that a cross-section through an air detection portion 274 of the fluid delivery assembly 230 mated with an air sensor 254 of the motor drive assembly 140 is visible.

In some embodiments, similarly as described above with respect to the system 100, the pins 248B of the torque transfer mechanism 248 can include springs 248C such that the pins 248B are spring-loaded and each pin 248B is biased toward an extended configuration and is able to be urged to a contracted configuration via application of a force to a free end of each pin 248B against the expanding force applied by the spring 248C. For example, FIGS. 16A and 16B are schematic illustrations of a front view and a cross-sectional view taken along line A-A in FIG. 16A of the torque transfer mechanism 248 and the torque transfer mechanism 260 in a misaligned configuration. When the fluid delivery assembly 230 is coupled to the motor drive assembly 240, if the spring-loaded pins 248B and receiving holes 260B are misaligned such that the spring-loaded pins 248B are not immediately received within the receiving holes 260B (as shown in FIG. 16A), the spring-loaded pins 248B can be depressed against the force of the respective springs 248C from the extended configuration to the contracted configuration by an outward-facing surface of the torque transfer mechanism 260 of the fluid delivery assembly 230 defining the open ends of the receiving holes 260B (as shown in FIG. 16B).

FIGS. 17A and 17B are schematic illustrations of a front view and a cross-sectional view taken along line B-B in FIG. 17A of the torque transfer mechanism 248 and the torque transfer mechanism 260 in an aligned configuration. When the pump motor 242 operates to rotate the torque transfer mechanism 248 of the motor drive assembly 240 (e.g., via rotation of a shaft coupling the two components or included in the torque transfer mechanism 248), the torque transfer mechanism 248 of the motor drive assembly 240 will rotate relative to the torque transfer mechanism 260 of the fluid delivery assembly 230 until the spring-loaded pins 248B align with the receiving holes 260B, at which time the spring-loaded pins 248B will automatically transition from the contracted configuration to the extended configuration due to no longer being retained in the contracted configuration by the outward-facing surface of the torque transfer mechanism 260, and will extend into the receiving holes 260B of the torque transfer mechanism 260 of the fluid delivery assembly 230, as shown in FIGS. 17A and 17B. Once the spring-loaded pins 248B are disposed in the receiving holes 260B of the fluid delivery assembly 230, any rotational output of the pump motor 242 will be transferred into the shaft, through the torque transfer mechanism 248 of the motor drive assembly 240, to the torque transfer mechanism 260 of the fluid delivery assembly 230, and to the pump 231. Thus, the fluid delivery assembly 230 can be coupled to the motor drive assembly 240 and secured in an operating position to the motor drive assembly 240 (e.g., via the retention mechanism(s) 247 and 237 described in more detail below) without the torque transfer mechanism 260 of the fluid delivery assembly 230 being in operational alignment for torque transfer with the torque transfer mechanism 248 of the motor drive assembly 240, making the coupling easier and faster for a user than if the pins and receiving holes of the torque transfer mechanism 260 and the torque transfer mechanism 248 needed to be aligned for the coupling of the fluid delivery assembly 230 to the motor drive assembly 240. As a result, a user (e.g., a clinician) can couple the fluid delivery assembly 230 to the motor drive assembly 240 via a single motion of the fluid delivery assembly 230 relative to the motor drive assembly 240 (e.g., via a translational movement of the fluid delivery assembly 230 relative to the motor drive assembly 240).

Once the spring-loaded pins 248B have expanded to the extended configuration and are disposed within the receiving holes 260B of the torque transfer mechanism 260 of the fluid delivery assembly 230, the spring-loaded pins 248B are locked in place relative to the torque transfer mechanism 260 of the fluid delivery assembly 230 and cannot be removed from the torque transfer mechanism 260 of the fluid delivery assembly 230 by any rotational movement generated by the pump motor 242. When a user removes the fluid delivery assembly 230 from the motor drive assembly 240 (e.g., by releasing one or more latches of retention mechanism(s) 237), the torque transfer mechanism 260 of the fluid delivery assembly 230 can be slid off of the spring-loaded pins when the fluid delivery assembly 230 is translated in a horizontal motion away from the motor drive assembly 240 (e.g., along an axis parallel to a central axis of a pin of the torque transfer mechanism 248 of the motor drive assembly 240).

The torque transfer mechanism 252 and the torque transfer mechanism 272 can function the same or similarly as the torque transfer mechanism 248 and the torque transfer mechanism 260. For example, the torque transfer mechanism 252 can include a set of springs such that the set of pins 252B of the torque transfer mechanism 252 can be spring-loaded and function similarly as the spring-loaded pins 248B of the torque transfer mechanism 248 of the motor drive assembly 240.

Figure 18:
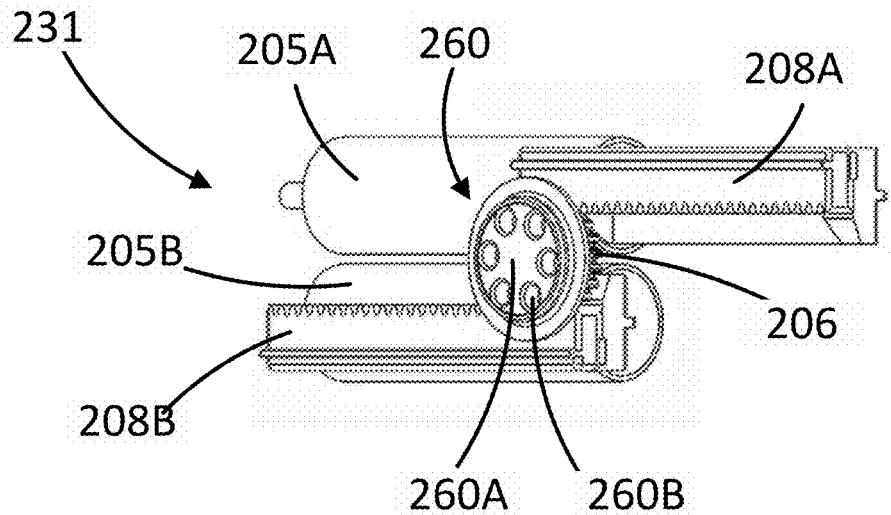
Figure 19:
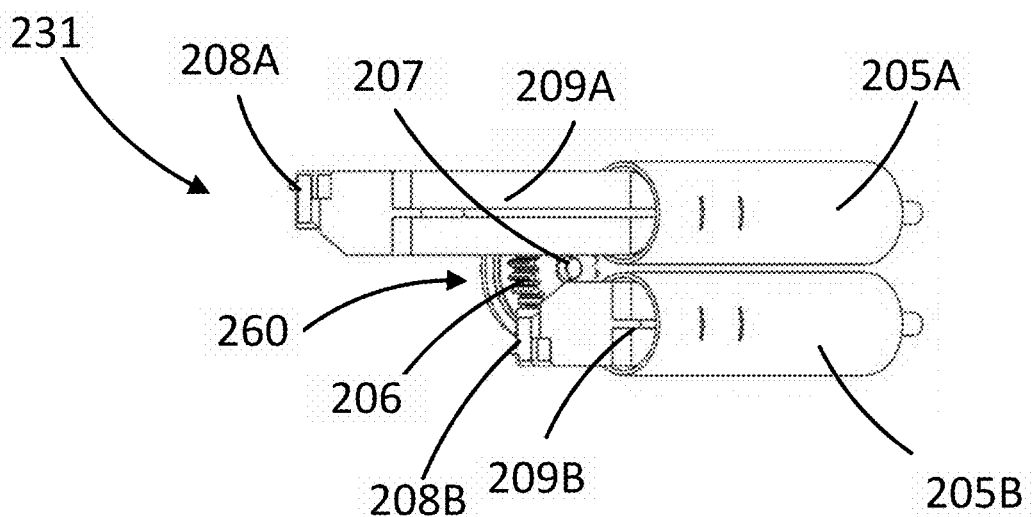

FIGS. 18 and 19 are perspective views of a front and back side of the fluid pump 231 coupled to the torque transfer mechanism 260. As shown, the fluid pump 231 can include a first syringe 205A, a second syringe 205B, each defining a reservoir, a pair of rack gears 208A, 208B, a pair of plungers 209A, 209B, a pinion gear 206, and a torque output shaft 207. The torque transfer mechanism 260 can be fixedly coupled to the pinion gear 206 via the torque output shaft 207. Teeth of the pinion gear 206 can be engaged with the teeth of the first rack gear 208A and the second rack gear 208B, which can be disposed on opposite sides of the pinion gear 206. The first rack gear 208A is fixedly coupled to the first plunger 209A such that longitudinal movement of the first rack gear 208A translates the first plunger 209A within the first syringe 205A. The second rack gear 208B is fixedly coupled to the second plunger 209B such that longitudinal movement of the rack gears 208B translates the second plunger 209B within the second syringe 205B. Thus, the torque transfer mechanism 260 and the warmer assembly 232 are arranged such that rotation of the torque transfer mechanism 260 causes rotation of the pinion gear 206, which causes translation of the first rack gear 208A and the second rack gear 208B in opposite directions, resulting in the plungers 209A, 209B to operate (i.e., translate) 1800 out of phase from each other within the first syringe 205A and the second syringe 205B to produce a substantially continuous flow of fluid from the fluid pump 231. One syringe can deliver fluid to the patient while the other syringe is being filled with fluid. Therefore, movement of the torque transfer mechanism 260 causes a pumping action (e.g., a drawing and/or an expelling movement) of the fluid pump 231. In some embodiments, the torque transfer mechanism 260 can control the fluid pump 231 to produce substantially continuous flow from the fluid pump 231. The flow may be substantially non-pulsatile (e.g., compared to flow from a single-syringe pump).

Figure 20:
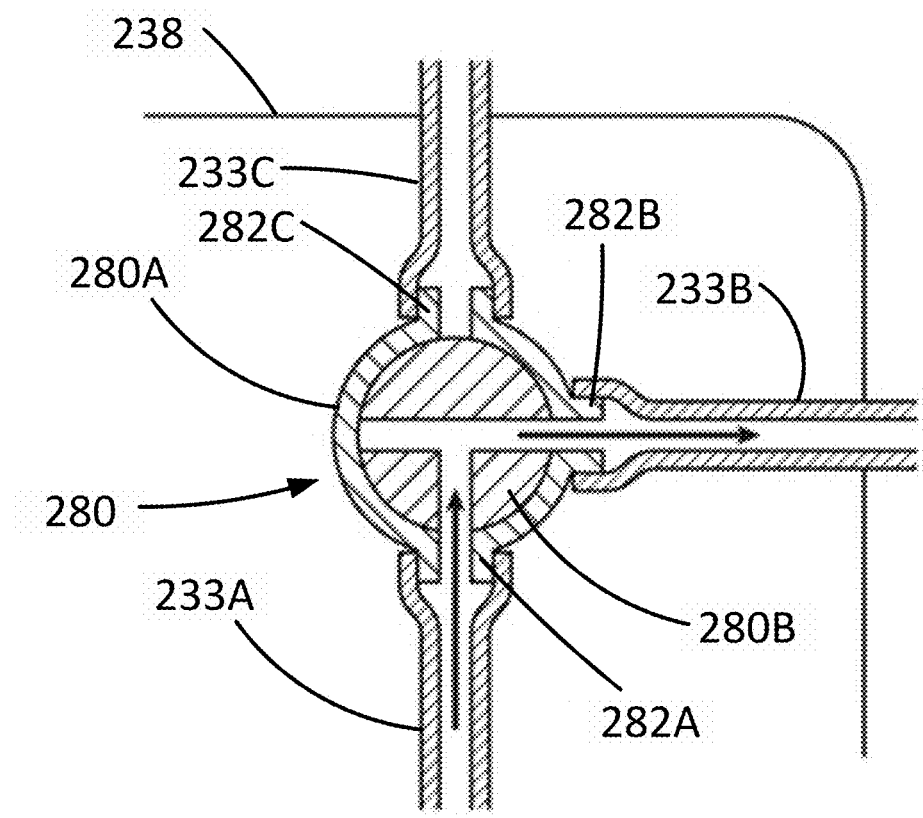
Figure 21:
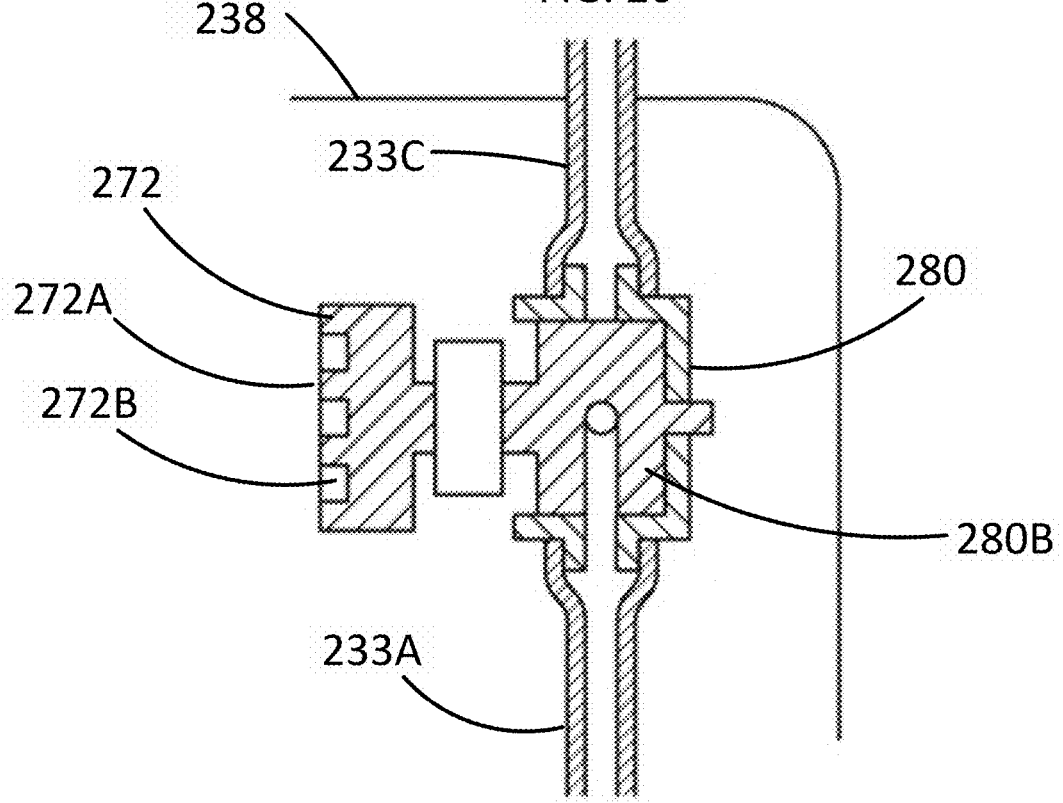
Figure 22:
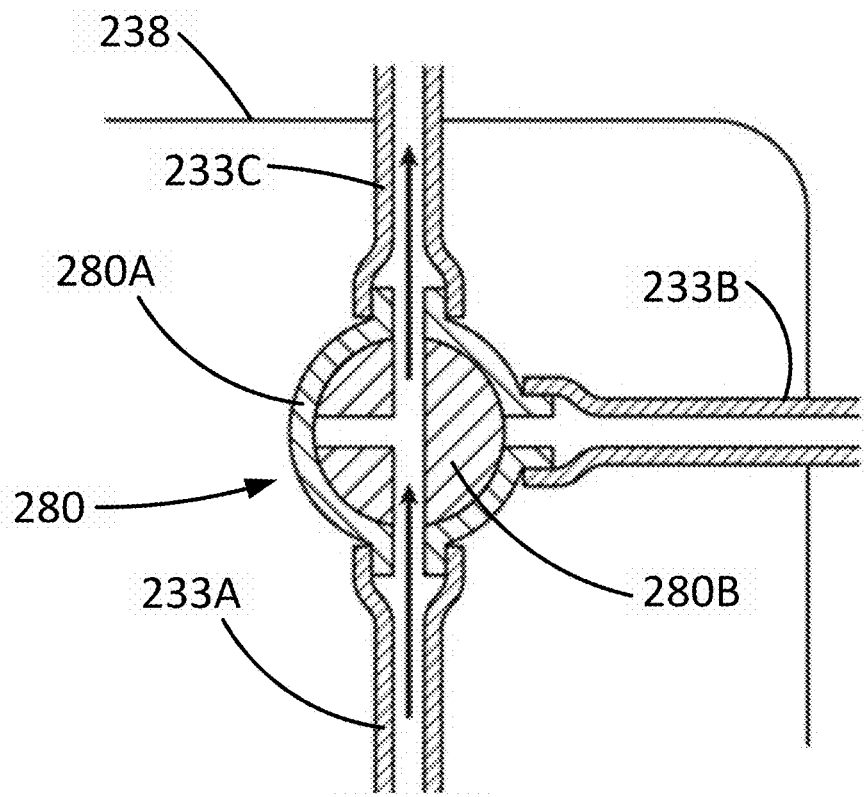
Figure 23:
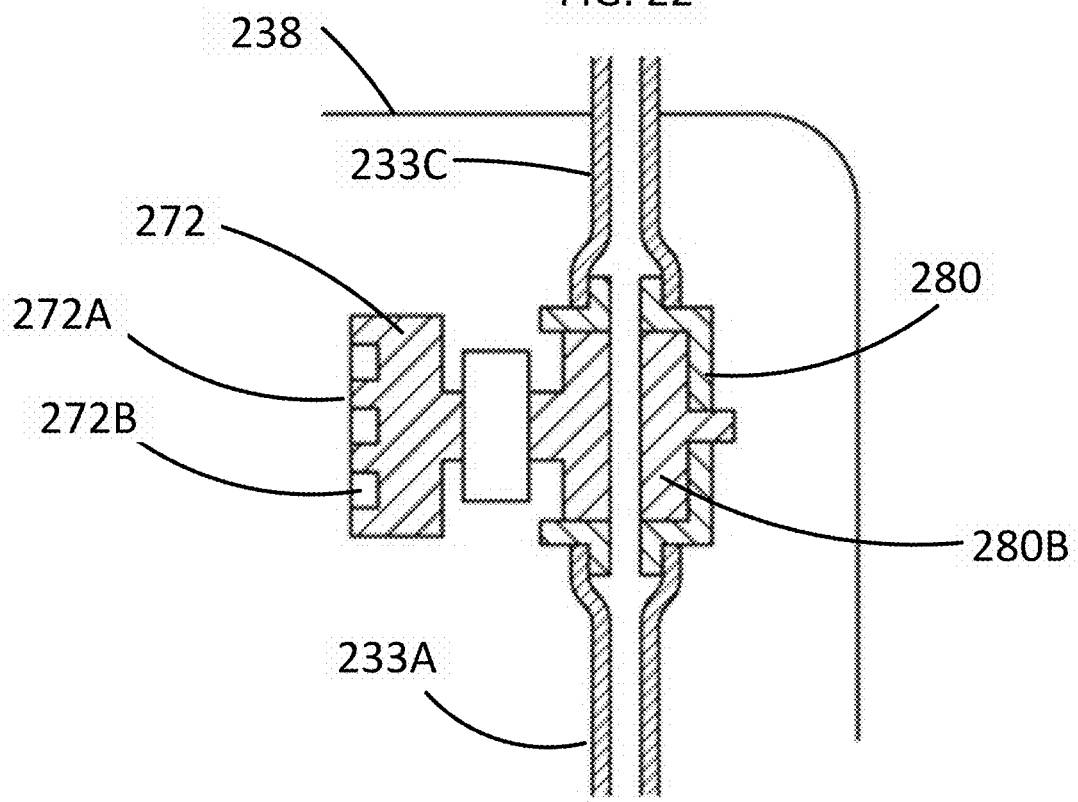

FIGS. 20 and 21 are schematic illustrations of a side view and a cross-sectional view, respectively, of a portion of the system 200 including the torque transfer mechanism 272 and the recirculation valve 280 in a first configuration in which recirculation tubing 233C of the system 200 is occluded and access to patient fluid tubing 233B is open for fluid travel. FIGS. 22 and 23 are schematic illustrations of a side view and a cross-sectional view, respectively, of a portion of the system 200 including the torque transfer mechanism 272 and the recirculation valve 280 in a second configuration in which access to the recirculation tubing 233C is open for fluid travel and access to patient fluid tubing 233B is occluded.

As shown in FIGS. 20-23, the inlet 282A of the recirculation valve 280 is coupled to inlet tubing 233A, the first outlet 282B of the recirculation valve 280 is coupled to patient fluid tubing 233B, and the second outlet 282C of the recirculation valve 280 is coupled to the recirculation tubing 233C. The recirculation valve 280 can be transitioned, in response to rotation of the torque transfer mechanism 272, between the first configuration in which fluid is allowed to flow from the pump 231 through the inlet tubing 233A, through the inlet 282A, and out the first outlet 282B to the fluid line 233B (e.g., to a patient) and the second outlet 282C is occluded and the second configuration in which fluid expelled from the pump 231 is allowed to flow through the inlet tubing 233A, through the inlet 282A, and out the second outlet 282C to the fluid line 233C and the first outlet 282B is occluded. The torque transfer mechanism 272 can be engaged with a pump motor of the motor drive assembly 240 via the torque transfer mechanism 252 such that the pump motor can operate to control rotation of the torque transfer mechanism 272 and movement of the recirculation chamber 280A between the first and second configurations (e.g., under the control of a controller of the motor drive assembly 240 in response to data provided by one or more air sensors of the motor drive assembly 240).

Figure 24:
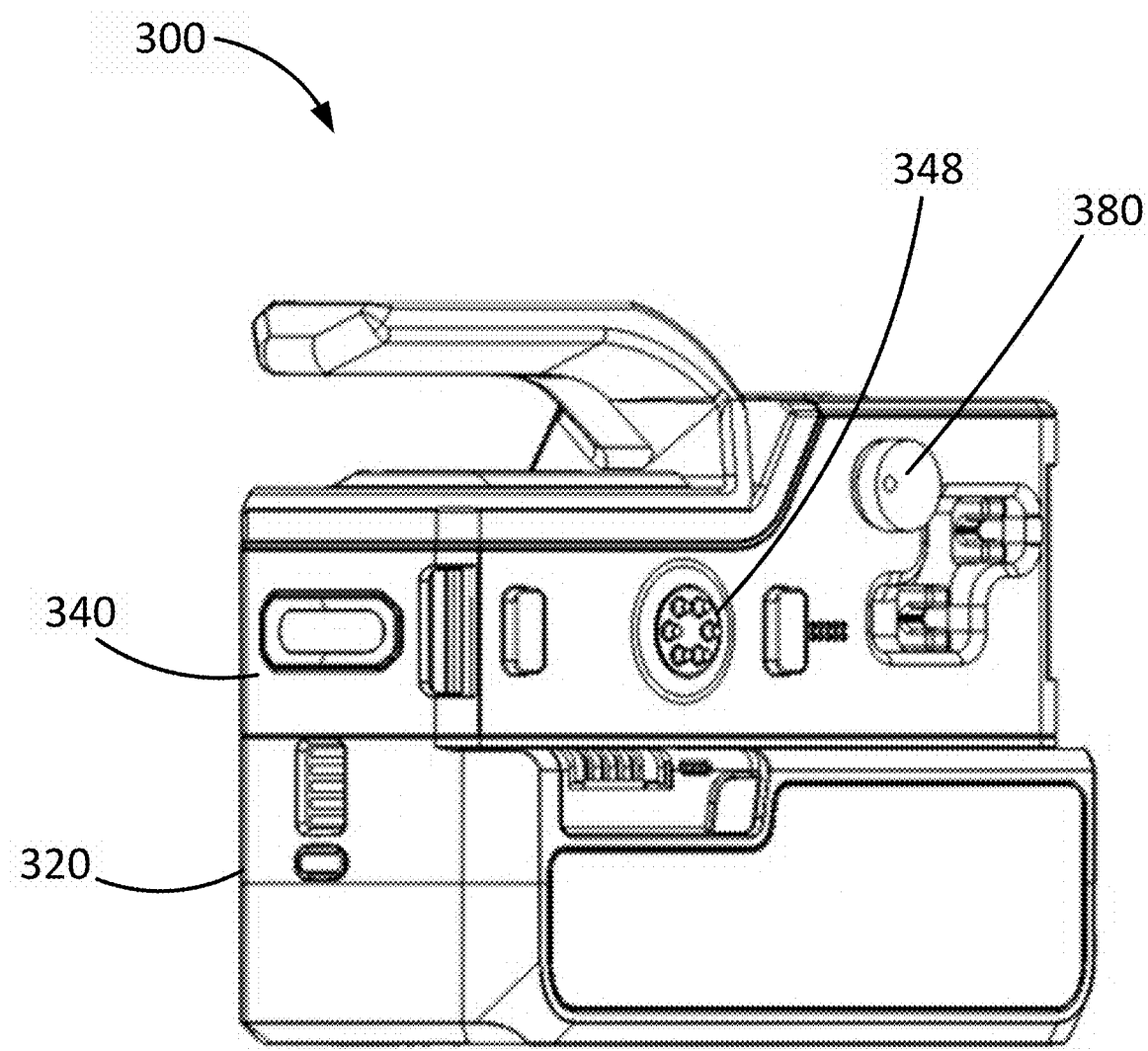
FIG. 24 is a schematic illustration of a perspective view of a system, according to an embodiment.

In some embodiments, rather than a system, such as the system 200, including a torque transfer mechanism 252, a torque transfer mechanism 272, and a recirculation valve 280 (e.g., a stopcock valve), a system, such as any of the systems described herein, can include a cam. For example, FIG. 24 is a schematic illustration of a perspective view of a system 300. The system 300 can be the same as or similar in structure and/or function to any of the systems described herein, such as the system 100 and/or the system 200. For example, the system 300 can include a warmer drive assembly 320 and a motor drive assembly 340 that can be the same as or similar in structure and/or function to any of the warmer drive assemblies and motor drive assemblies, respectively, described herein. For example, as shown in FIG. 24, the motor drive assembly 340 can include a torque transfer mechanism 348 that can be the same as or similar in structure and/or function to the torque transfer mechanism 148 and/or the torque transfer mechanism 248. The motor drive assembly 340 also includes a clamping device 380 (also referred to as a cam) configured to engage with tubing of a fluid delivery assembly (not shown in FIG. 24) couplable to the motor drive assembly 340. The fluid delivery assembly can be the same as or similar in structure and/or function to any of the fluid delivery assemblies described herein.

Figures 25, 26:
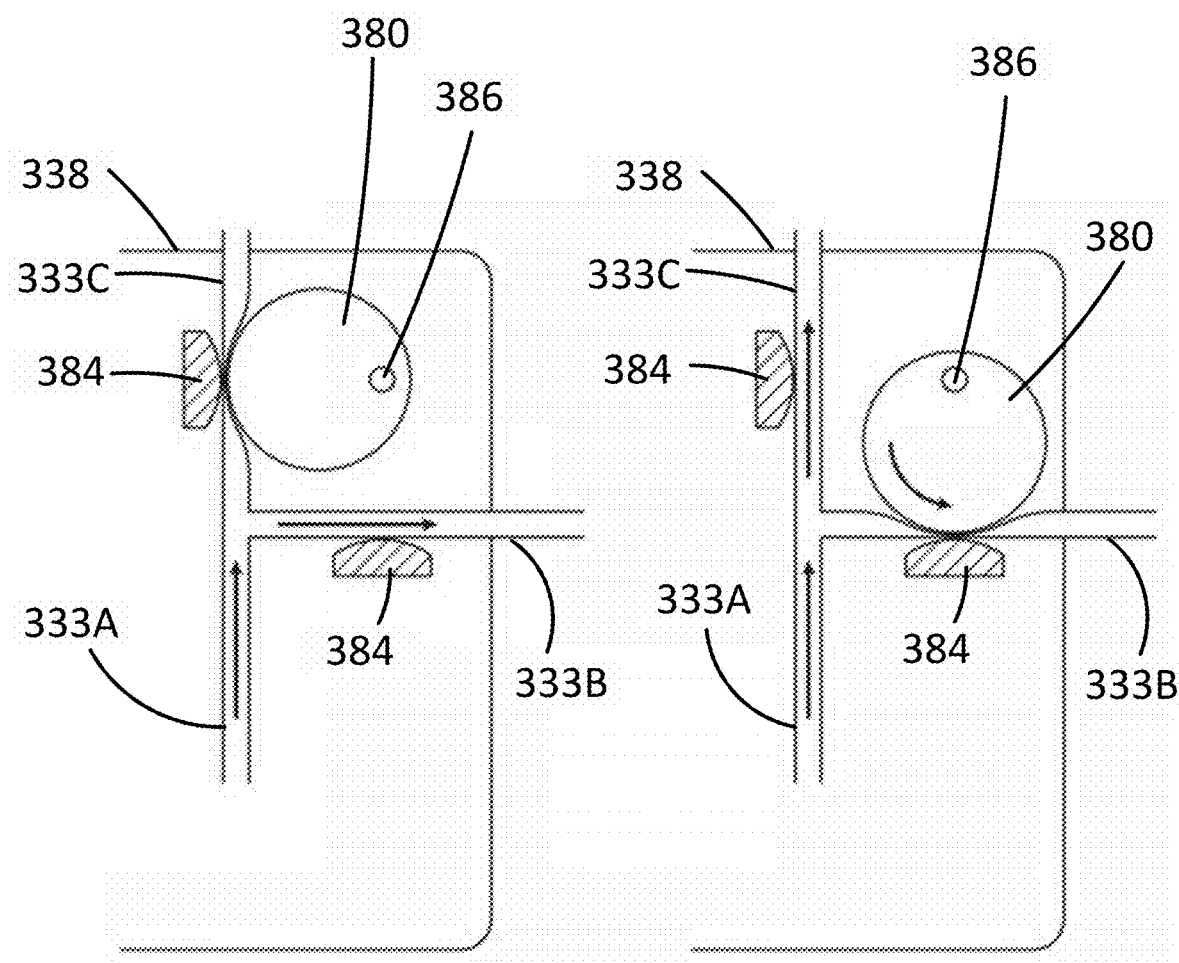
FIGS. 25 and 26 are schematic illustrations of a clamping device of the system of FIG. 24 in a first configuration and a second configuration, respectively, according to an embodiment.

FIGS. 25 and 26 are schematic illustrations of the clamping device 380 in a first configuration and a second configuration relative to the fluid delivery assembly. The fluid delivery assembly includes a housing 338, inlet tubing 333A, patient fluid tubing 333B, and recirculation tubing 333C. As shown in FIGS. 25 and 26, a pair of pinching surfaces 384 can be included in either the fluid delivery assembly or the motor drive assembly 340 and disposed relative to the patient fluid tubing 333B and the recirculation tubing 333C and relative to the clamping device 380 such that the clamping device 380 can clamp the patient fluid tubing 333B against the first pinching surface 384 and clamp the recirculation tubing 333C against the second pinching surface 384. In the first configuration of the clamping device 380, the clamping device 380 compresses the recirculation tubing 333C against the second pinching surface 384 to occlude the recirculation tubing 333C and fluid is allowed to flow from the inlet tubing 333A through the patient fluid tubing 333B. In the second configuration of the clamping device 380, the clamping device 380 compresses the patient fluid tubing 333B against the first pinching surface 384 to occlude the patient fluid tubing 333B and fluid is allowed to flow from the inlet tubing 333A through the recirculation tubing 333C. The clamping device 380 can transition between the first and second configuration via rotating about an axis through rotational shaft 386. The rotational shaft 386 can be engaged with a pump motor of the motor drive assembly 340 such that the pump motor can operate to control rotation of the rotational shaft 386 and movement of the clamping device 380 between the first and second configurations (e.g., under the control of a controller of the motor drive assembly 340 in response to data provided by one or more air sensors of the motor drive assembly 340). In some embodiments, the clamping device 380 can optionally be an over-center clamping device.

FIGS. 27-39 are various views of an implementation of a system 400 and components thereof. The system 400 can be the same or similar in structure and/or function to any of the systems described herein, such as the system 100 and/or the system 200 described above. For example, the system 400 can include a fluid delivery assembly 430 and a motor drive assembly 440 that are the same or similar in structure and/or function to the fluid delivery assembly 130 and the motor drive assembly 140, respectively. Additionally, the system 400 can include a charger base (not shown), a warmer drive assembly 420, and/or a warmer assembly 432 that can be the same as or similar in structure and/or function to the charger base, the warmer drive assembly 120, and the warmer assembly 132, respectively.

Similar to the fluid delivery assembly 130, the fluid delivery assembly 230, and the fluid delivery assembly 330, the fluid delivery assembly 430 can include a fluid pump 431 and a torque transfer mechanism 460. The fluid delivery assembly 430 can also include a clamping device 480 (e.g., an over-center clamping device) and a torque transfer mechanism 472. The fluid pump 431 can be the same as or similar to the fluid pump 131, for example, and the clamping device 480 can be the same as or similar to the clamping device 380 shown in FIGS. 25 and 26. The torque transfer mechanism 460 and the torque transfer mechanism 472 can be the same as or similar to the torque transfer mechanism 160 and the torque transfer mechanism 172, respectively. For example, the torque transfer mechanism 460 includes a plate 460A defining a set of receiving holes 460B and the torque transfer mechanism 472 includes a plate 472A defining a set of receiving holes 472B.

The fluid delivery assembly 430 includes a housing 438 and a pair of retention mechanisms 437 formed as latches. The fluid delivery assembly 430 also includes a pressure sensing flexible diaphragm 456D configured to mate with a pressure sensor 456 included in the drive assembly 440. The fluid delivery assembly 430 includes alignment features 473 (e.g., recesses) defined by an outer surface of the housing 438 and configured to receive alignment features 453 (e.g., complementary shaped projections) of the drive assembly 440. The fluid delivery assembly 430 also includes air detection portions 474 that include portions of fluid tubing in fluid communication with the pump 431. The air detection portions 474 are curved (e.g., U-shaped) and project away from the housing 438 between a first and second end of the air detection portions 474 such that each can be received within a complementary recess of air sensors 454 of the drive assembly 440. In some embodiments, rather than including distinct air detection portions 474 fluidically couplable to the inlet tubing 433A and the patient fluid tubing 433B described below, one or more air sensors 454 of the drive assembly 440 can be aligned with and configured to sense the presence of air within the inlet tubing 433A and/or the patient fluid tubing 433B directly, for example as described herein with respect to system 600.

The warmer assembly 432 (also referred to as a warmer) can be included in the fluid delivery assembly 430 and can include a fluid passageway defined by tubing or within a channel defined by the warmer assembly 432 such that fluid can be delivered to the fluid passageway by the pump 431 and can flow from the warmer assembly 432 to the patient via the fluid line 433B. The warmer assembly 432 can include an elongated heating element 436 that can be the same or similar in structure and/or function to any of the elongated heating elements described herein. The elongated heating element 436 can be disposed with in the fluid passageway of the warmer assembly 432 such that fluid can contact the elongated heating element 436 and heat can transfer from the elongated heating element 436 to the fluid while the fluid travels through the fluid passageway.

Figure 38:
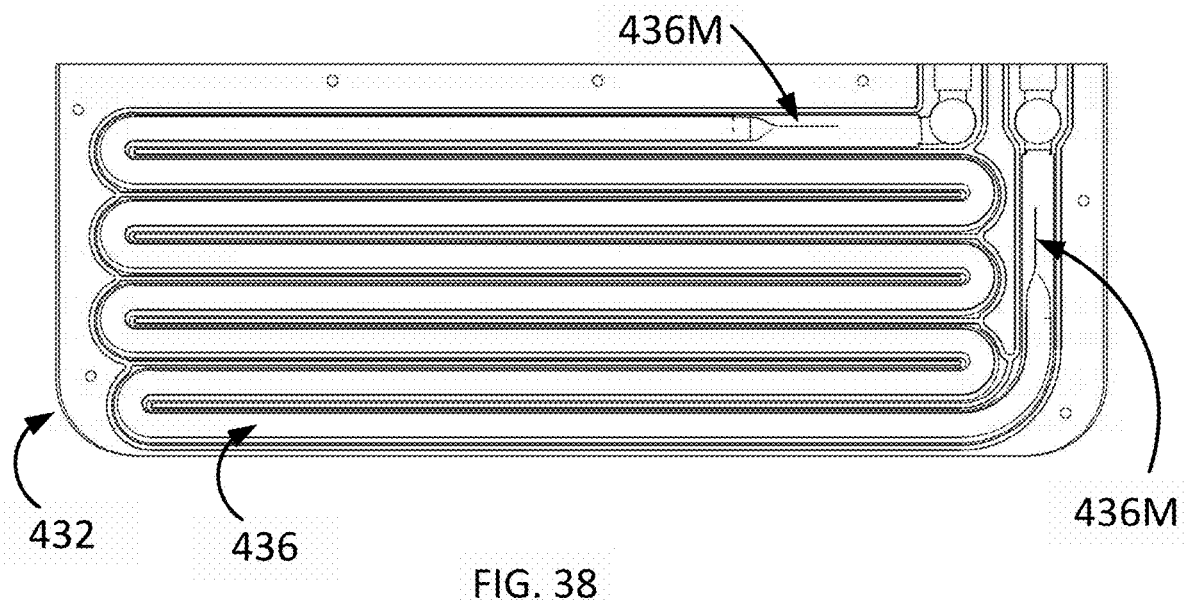
Figure 39:
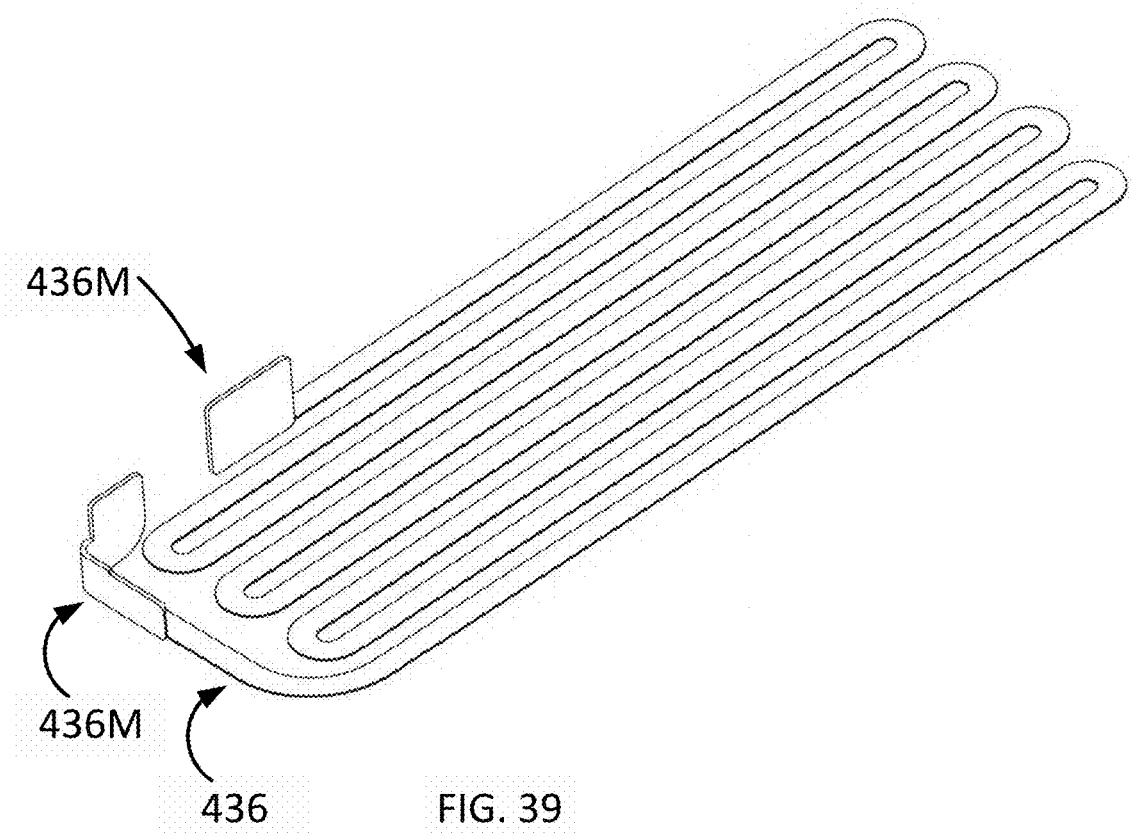

As shown in FIGS. 38 and 39, the elongated heating element 436 can be planar and formed as a flat ribbon. The elongated heating element 436 can be, for example, stamped out of sheet stock. In some embodiments, as shown in FIGS. 38 and 39, the elongated heating element 436 can include a set of elongated segments coupled to adjacent elongated segments by curved segments. Each of the elongated segments and the curved segments can include a first or upper surface that are all disposed in a first plane and a second or lower surface that are all disposed in a second plane parallel to the first plane. The elongated heating element 436 can have a consistent cross-section (e.g., in size and/or shape) along each elongated straight segment and/or curved segment.

Figure 31:
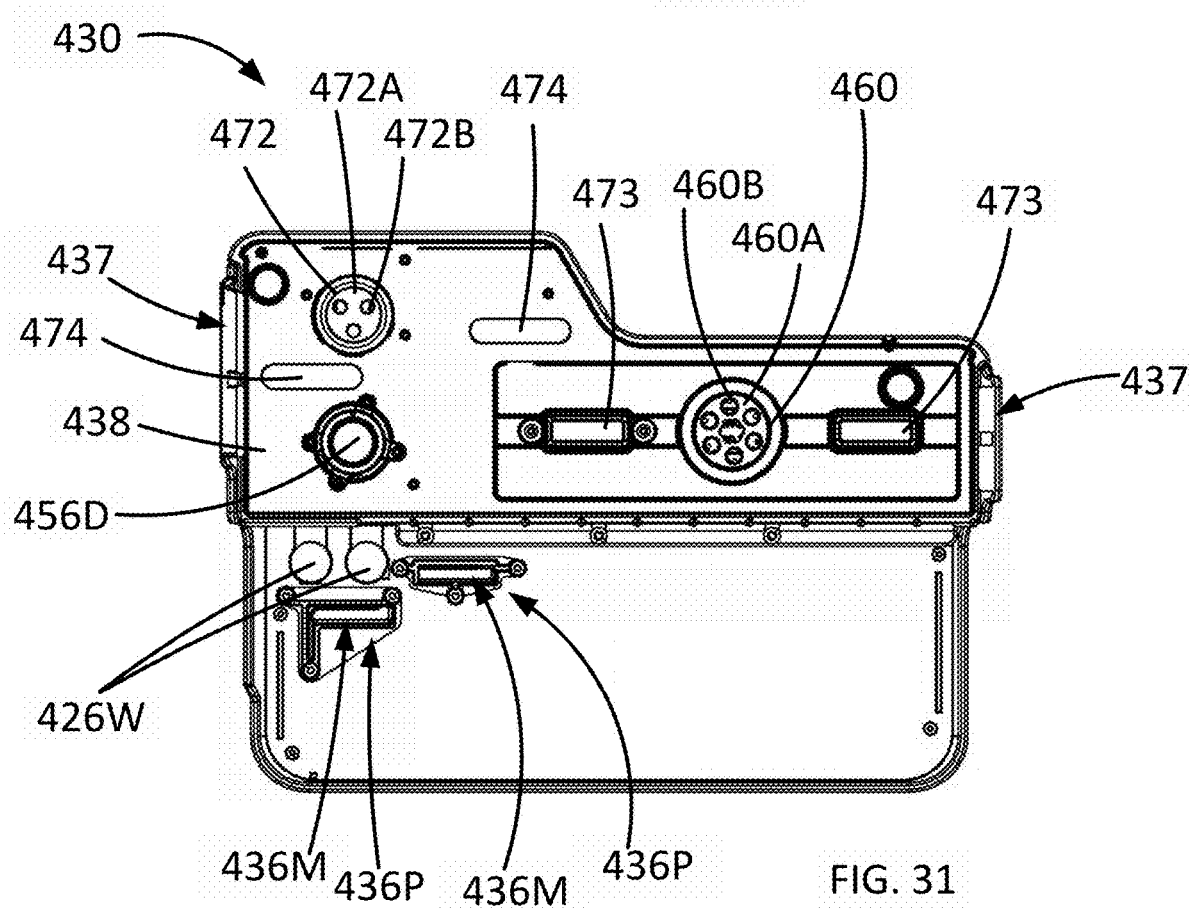

The elongated heating element 436 can include a first end and a second end, and each end can be conductively coupled (e.g., spot welded) to a respective conductive member 436M. Each conductive member 436M can be shaped and sized to extend through openings in the housing of the warmer assembly 432 and/or the housing 438 such that each can be electrically coupled to a warmer electrical connection 411 of the motor drive assembly 440 for the transfer of energy from an electrical connection 411 to the elongated heating element 436 to heat the elongated heating element 436 via a first conductive member 436M and so that another electrical connection 411 can function as a ground. As shown in FIG. 31, in some embodiments, each of the conductive members 436M can be disposed adjacent to and/or surrounded by a respective conductive (e.g., metal) plate 436P such that the warmer electrical connections 411 can be electrically coupled to the conductive members 436M via the conductive plates 436P.

The conductive members 436M can be formed, for example, as flags, and can extend (or have a portion that extends) away from the respective ends of the elongated heating element 436 (e.g., through openings in the housing of the warmer 432 and/or the housing 438) in a direction perpendicular to the plane including the upper surface and/or the plane including the lower surface of the elongated segments and curved segments. In some embodiments, the conductive members 436M can be, for example, spot-welded to the first end and the second end of the elongated heating element 436. In some embodiments, the first end and the second end of the elongated heating element 436 can have a greater thickness and/or extend beyond the first plane and/or the second plane defined by the upper and lower surfaces of the segments of the elongated heating element 436. In some embodiments, the conductive members 436M can have a thickness larger than the thickness of the elongated heating element 436.

In some embodiments, as shown in FIG. 38, the fluid passageway of the warmer 432 can include elongated segments and curved segments of the same shape as the elongated heating element 436 and configured to receive respective elongated and curved segments of the elongated heating element 436. The cross-section of the fluid passageway can be any suitable shape, such as circular or oblong. In some embodiments, the warmer 432 includes support projections (e.g., bosses) extending from a sidewall of the fluid passageway toward the elongated heating element 436 to maintain a position of the elongated heating element 436 within the fluid passageway. The warmer 432 can include pairs of coaxial support projections that extend from the sidewall to contact opposing surfaces of the elongated heating element 436, such as at locations along the curved segments and/or the elongated straight segments. In some embodiments, the cross-sectional shape and size of the fluid passageway can be consistent from end to end along each straight segment and/or curved segment, with the exception of the projecting supports.

The warmer assembly 432 also includes a pair of windows 426W disposed near the inlet and the outlet of the fluid passageway of the warmer assembly 432 and configured to be aligned with infrared non-contact temperature sensors 426 included in the drive assembly 440 such that the temperature sensors 426 can sense the temperature of the fluid within the fluid passageway at the locations associated with the windows 426W. In some embodiments, the windows 426W can be formed of thin polycarbonate.

Similar to the motor drive assembly 140, the motor drive assembly 240, and the motor drive assembly 340, the motor drive assembly 440 can include a controller (not shown), a user interface 444, a display 443, a pump motor (not shown), and a torque transfer mechanism 448. Additionally, the motor drive assembly 440 can include a recirculation motor (not shown) and a torque transfer mechanism 452. The pump motor and the recirculation motor can be the same as or similar to the pump motor 142 and the recirculation motor 151, respectively. The torque transfer mechanism 448 and the torque transfer mechanism 452 can be the same as or similar to the torque transfer mechanism 148 and the torque transfer mechanism 152, respectively. For example, the torque transfer mechanism 448 includes a plate 448A defining a set of pins 448B and the torque transfer mechanism 452 includes a plate 452A defining a set of pins 452B, and the torque transfer mechanism 448 and the torque transfer mechanism 452 are configured to operatively mate with the torque transfer mechanism 460 and the torque transfer mechanism 472 of the fluid delivery assembly 430, respectively.

The motor drive assembly 440 includes a housing 449, a handle 449A (e.g., disposed on an upper surface of the housing). The motor drive assembly 440 also includes a pair of retention mechanisms 447 disposed on opposite sides of the housing 449 and including a latch retention portion 447A and a latch release 447B. Each of the latch retention portions 447A are configured to releasably engage with a latch 437 of the fluid delivery assembly 430 and the engagement is configured to be released via depression of the latch release 447B. The motor drive assembly 440 also includes alignment features 453 extending from an outer surface of the housing 449 and configured to engage with alignment features 473 defined by the outer surface of the housing 438 of the fluid delivery assembly 430.

As described above, the drive assembly 440 includes air sensors 454 configured to mate with associated air detection portions 474 (e.g., a pre-pump air detection portion 474A upstream of the pump 431 and a post-pump air detection portion 474B downstream of the pump 431). As also described above, the drive assembly 440 includes the pressure sensor 456 configured to mate with the flexible diaphragm 456D to determine a pressure of fluid disposed near the flexible diaphragm 456D. The pressure sensor 456 can include a load cell configured to interface with the flexible diaphragm 456D.

Similar to the warmer drive assembly 120, the warmer drive assembly 420 can include a housing 415 and warmer electrical connections 411. The warmer drive assembly 420 can include a reusable battery that is configured to be separable from the motor drive assembly 440. The warmer electrical connections 411 can include any suitable connections described herein for providing power to the warmer 432. For example, in some embodiments, the warmer electrical connections 411 can be formed as prongs (e.g., a high voltage prong connector pair and a ground prong connector pair). In some embodiments, the warmer electrical connections 411 can be formed as blade connectors including copper blades.

Figure 27:
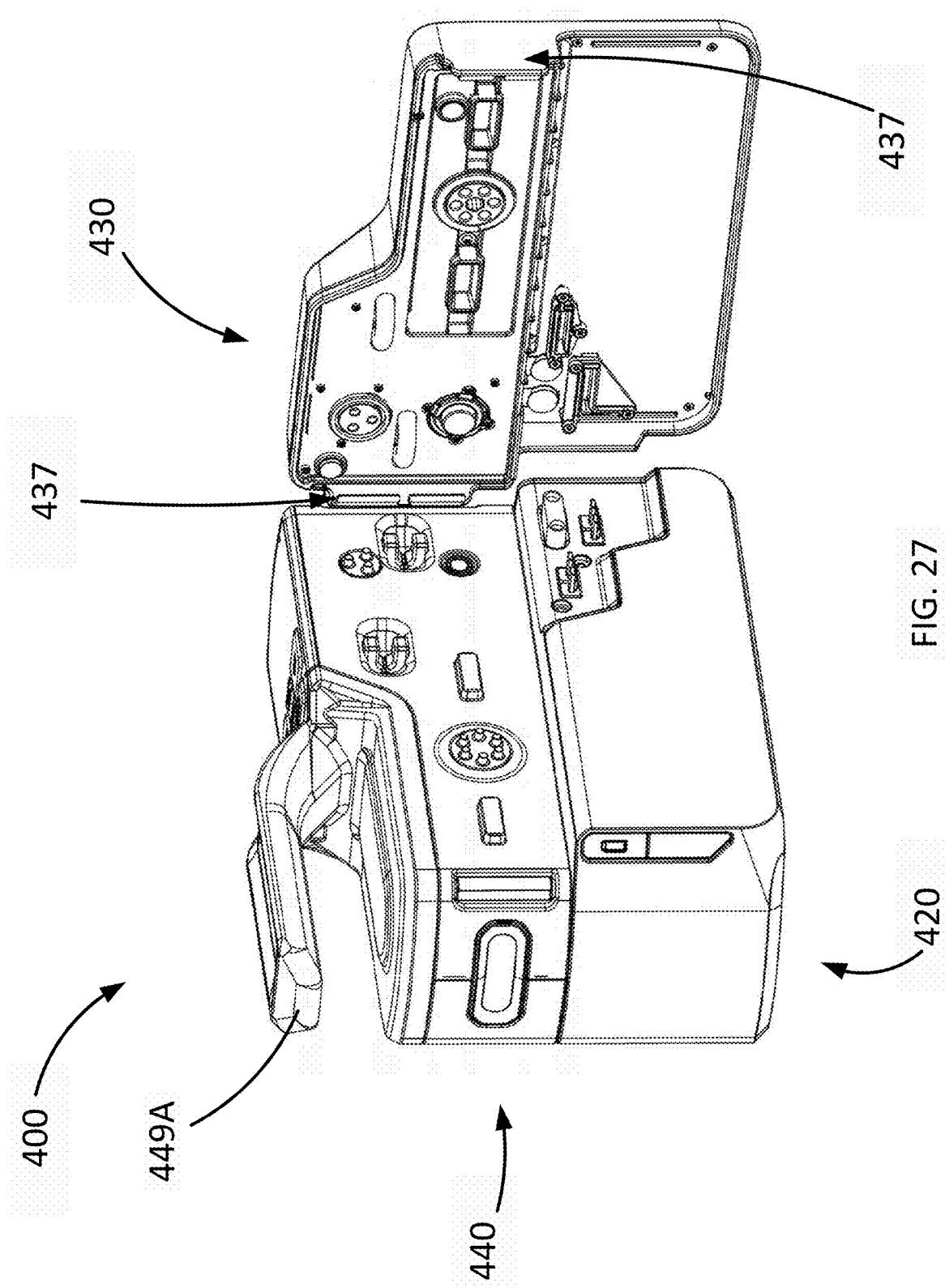
FIGS. 27-39 are various views of an implementation of a system 400 and components thereof, according to an embodiment.

FIG. 27 is a perspective view of the system 400 in a configuration in which the motor drive assembly 440 is coupled to the warmer drive assembly 420, and neither are coupled to the fluid delivery assembly 430. The fluid delivery assembly 430 is shown disposed at an angle relative to the motor drive assembly 440 and the warmer drive assembly 420, with components configured to interface or couple disposed a similar distance from an axis of rotation about which the fluid delivery assembly 430 is rotated relative to the motor drive assembly 440 and the warmer drive assembly 420.

Figure 28:
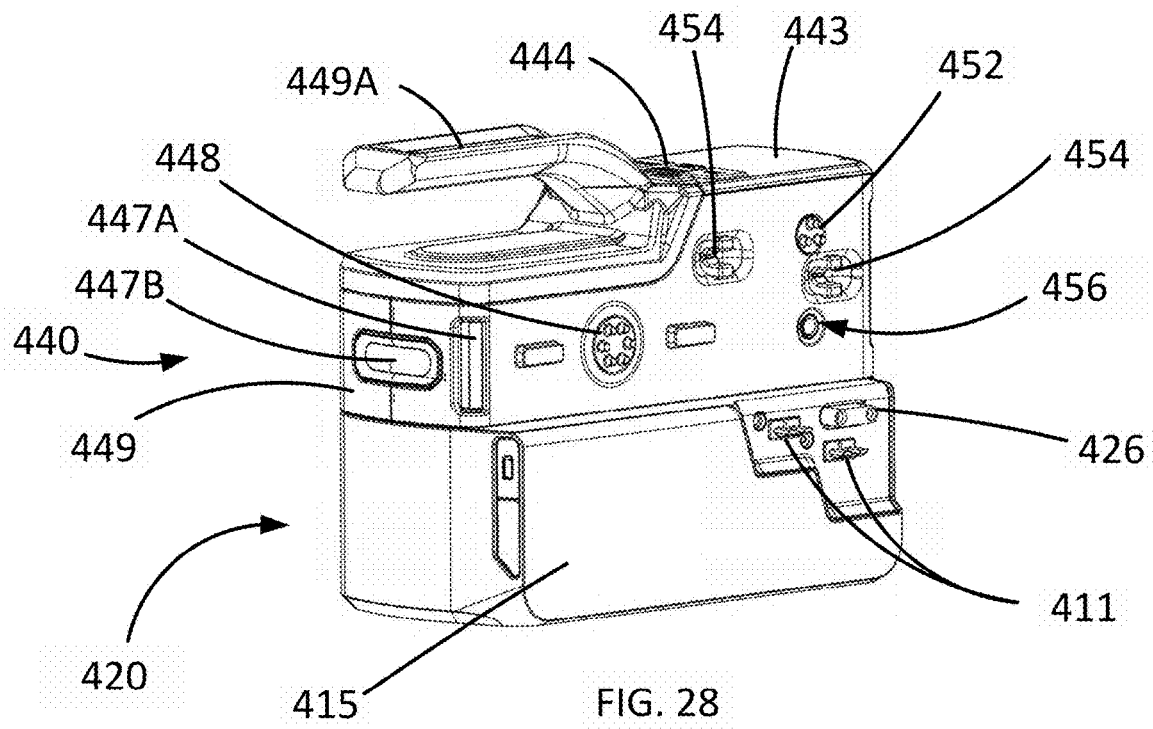
Figure 29:
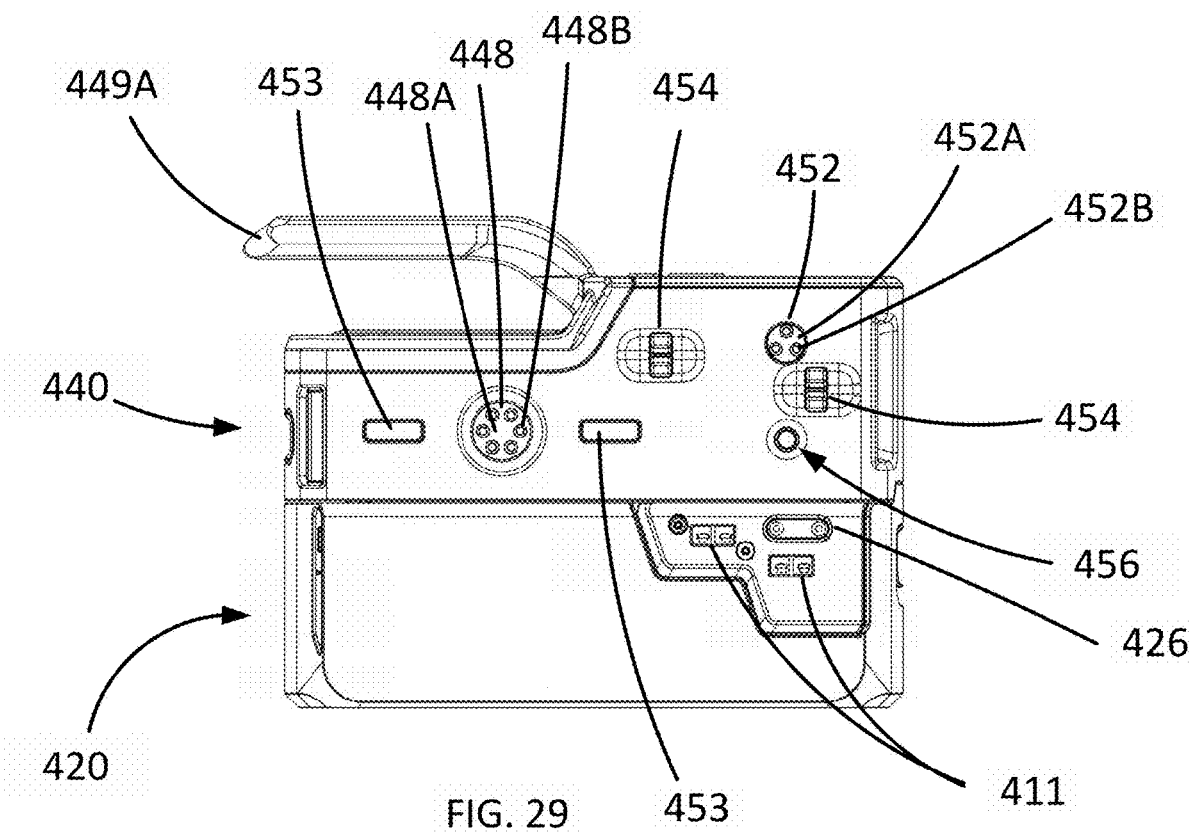

FIGS. 28 and 29 are a perspective view and a side view, respectively, of the motor drive assembly 440 coupled to the warmer drive assembly 420. As shown in FIG. 29, all of the components of the motor drive assembly 440 configured to interface or operatively couple with a component of the fluid delivery assembly 430 can be disposed on or accessible via the same side of the motor drive assembly 440. Similarly, as also shown in FIG. 29, all components of the warmer drive assembly 420 configured to interface with or operatively coupled with a component of the fluid delivery assembly 430 (e.g., the warmer 432) can be disposed on the same side of the warmer drive assembly 420 that is also facing the same direction as the side of the motor drive assembly 440 configured to interface with the fluid delivery assembly 430.

Figure 30:
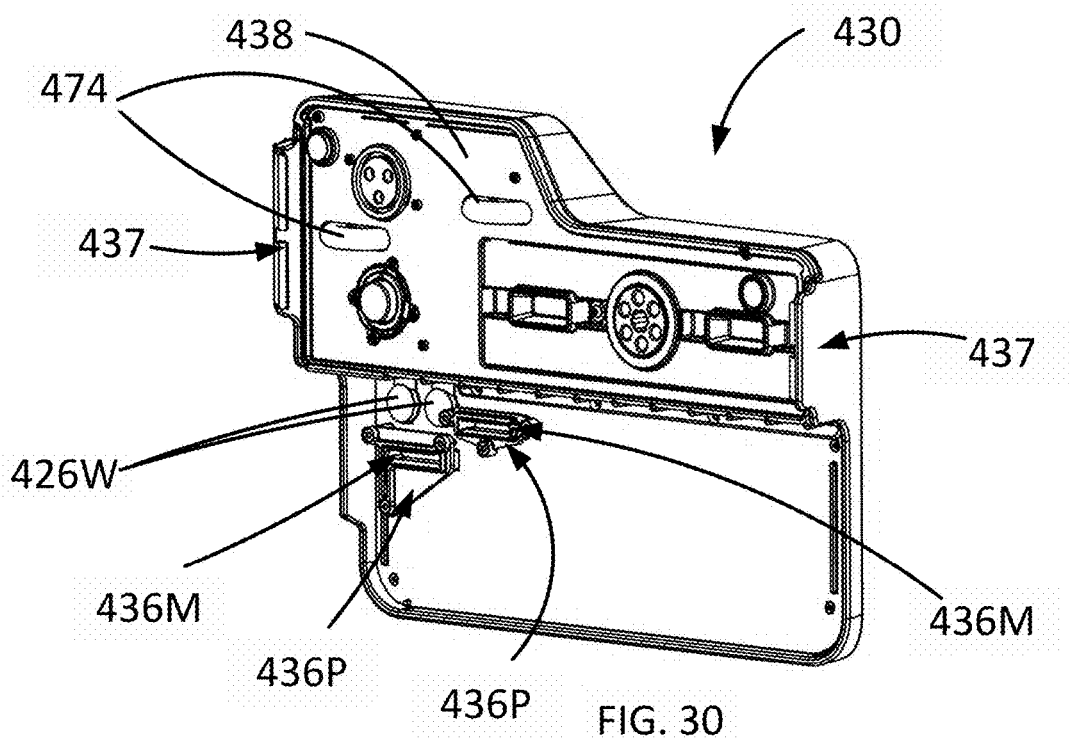
Figure 32:
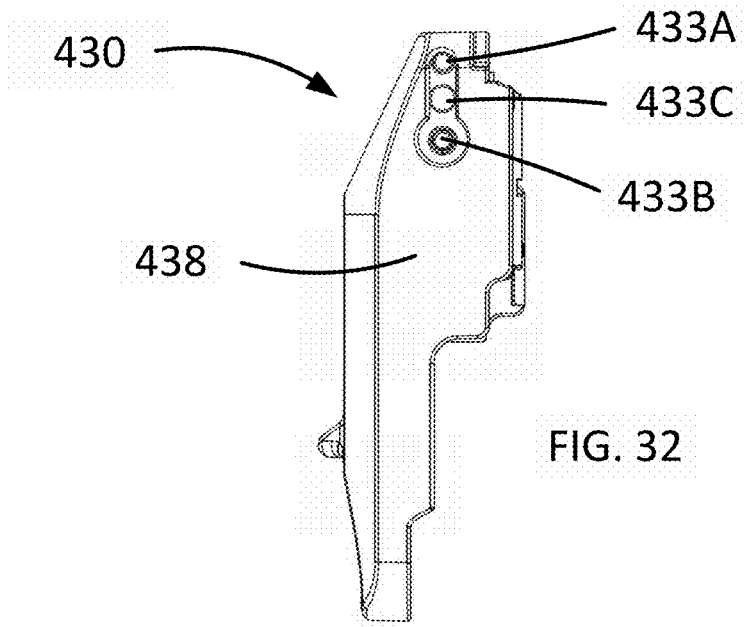

FIGS. 30, 31, and 32 are a perspective view, a back view, and a side view, respectively, of the fluid delivery assembly 430 including the warmer 432. As shown in FIG. 32, all of the components of the fluid delivery assembly 430, including components of the warmer 232, configured to interface or operatively couple with a component of the motor drive assembly 440 or the warmer drive assembly 440 can be disposed on or accessible via the same side of the fluid delivery assembly 430. Thus, the associated components can be configured to interface or mate simultaneously and/or serially when the fluid delivery assembly 430 is coupled to the motor drive assembly 440 and the warmer drive assembly 420. For example, in some embodiments, the fluid delivery assembly 430 can be configured to be coupled to the motor drive assembly 440 via a pivoting or rotational movement (e.g., a single pivot motion). A first end of the fluid delivery assembly 430 (e.g., the end to which the pressure sensor pressure sensor 456, post-pump air detection portion 474B, pre-pump air detection portion 474A, and/or torque transfer mechanism 472 are disposed closer) can be coupled to a first end of the motor drive assembly 440, and then the fluid delivery assembly 430 can be rotated relative to the motor drive assembly 440 until the second end of the fluid delivery assembly 430 is coupled to the second end of the motor drive assembly 440 (e.g., via a mating retention mechanism 437 and latch retention portion 447A that automatically securely mate due to the relative rotational contact). Such a rotational coupling movement may allow for greater mechanical force to be applied to properly operatively couple mating components of the fluid delivery assembly 430 and the motor drive assembly 440 (e.g., the air sensors 454 and the air detection portions 474, the pressure sensor 456 and the flexible diaphragm 456D), while still allowing for a secure coupling of the fluid delivery assembly 430 and the 440 via a single relative movement.

Additionally, as shown in FIG. 32, each of the inlet tubing 433A, the patient fluid tubing 433B, and the recirculation tubing 433C of the fluid delivery assembly 430 are configured to couple to extend through respective openings in the same side of the housing 438 of the fluid delivery assembly 430. Thus, the inlet tubing 433A, the patient fluid tubing 433B, and the recirculation tubing 433C can each extend from the same side of the housing 438 of the fluid delivery assembly 430, allowing for simplified fluid line management by a user. The openings can be configured such that the portions of the inlet tubing 433A, the patient fluid tubing 433B, and the recirculation tubing 433C passing through the openings and into the interior of the housing 438 are disposed in parallel. In some embodiments, the openings can be aligned and arranged relative to one another as shown in FIG. 32.

Figure 33:
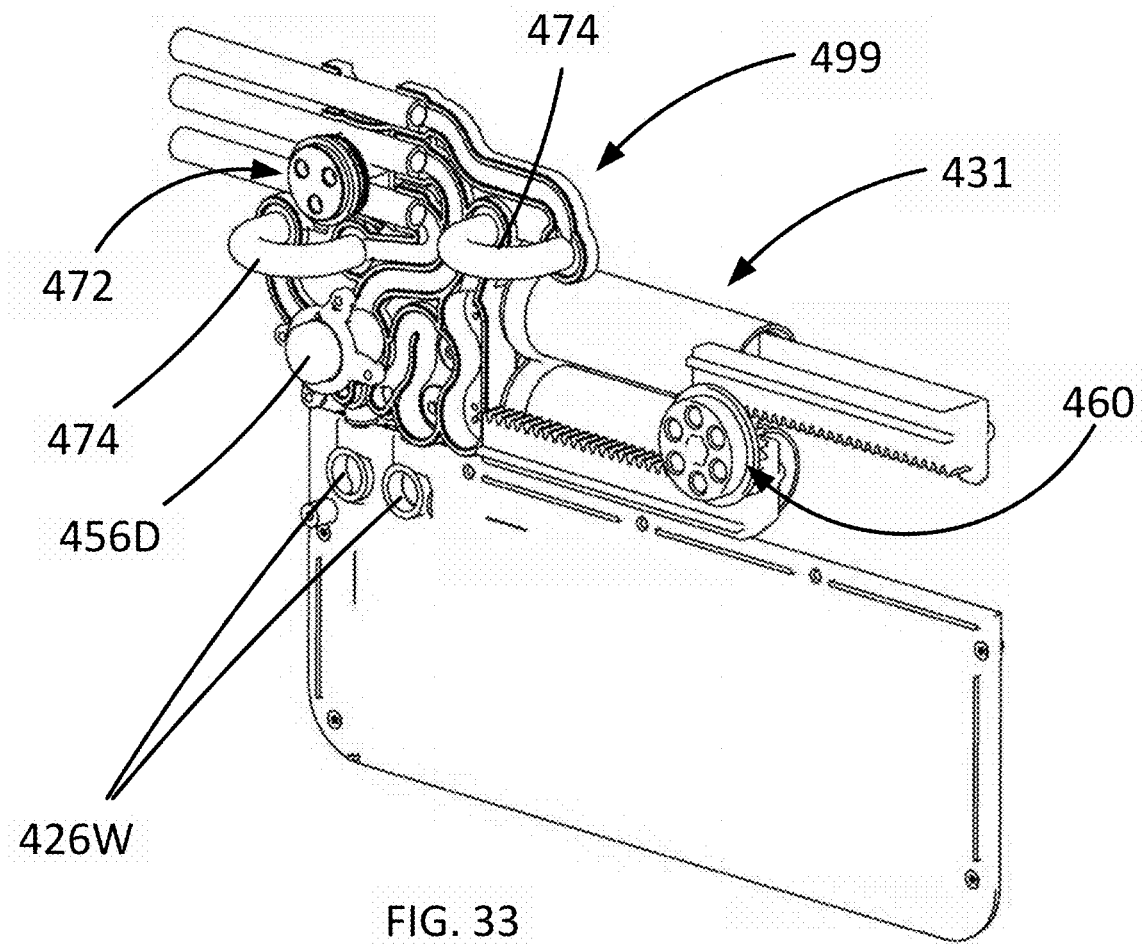
Figure 34:
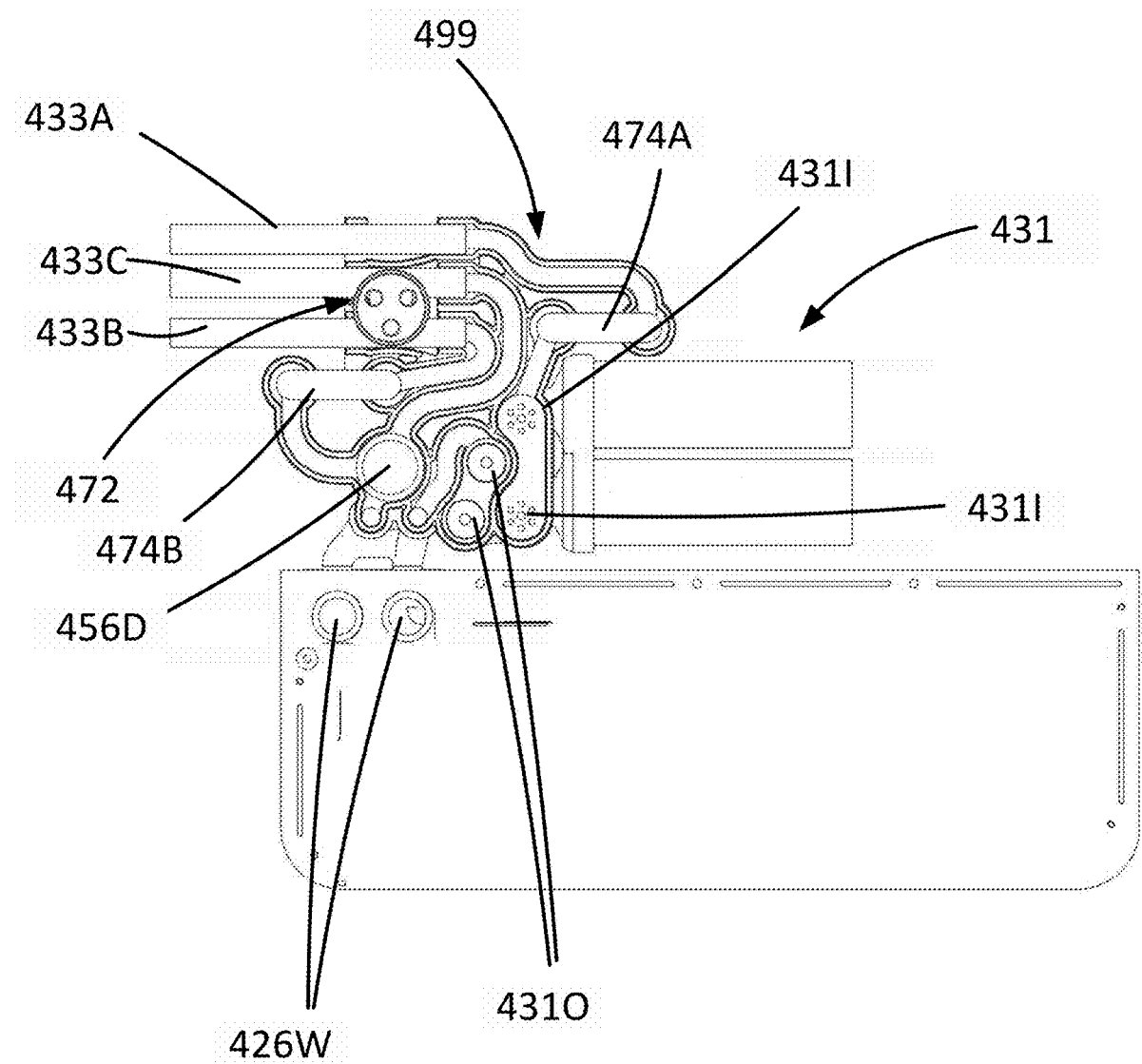
Figure 35:
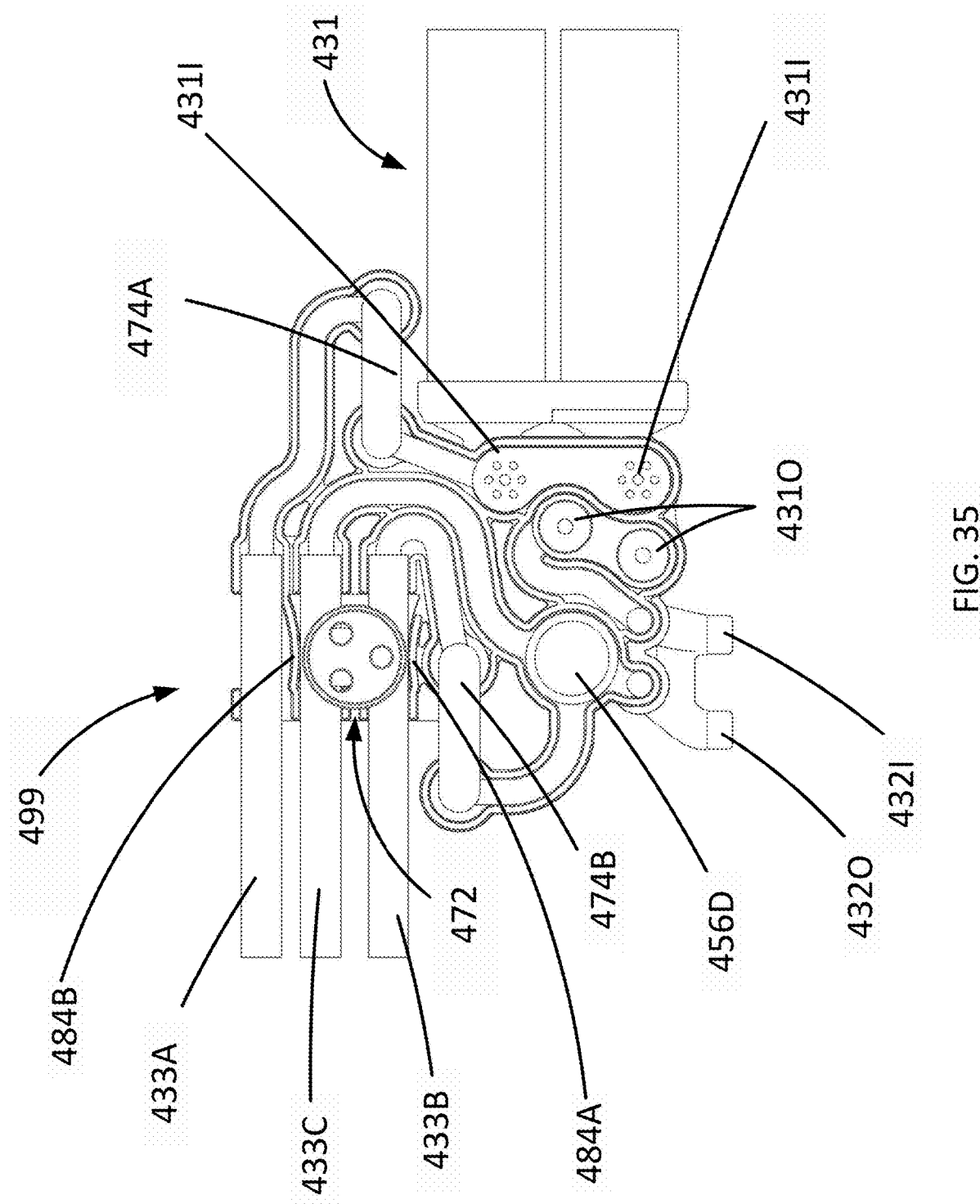

FIGS. 33 and 34 are a perspective view and a back view of internal components of the fluid delivery assembly 430. FIG. 35 is an enlarged view of portions of the FIG. 34. The torque transfer mechanism 448 and the torque transfer mechanism 460 can function the same or similarly as the torque transfer mechanism 248 and the torque transfer mechanism 260 describe above. For example, the torque transfer mechanism 448 can include a set of springs such that the set of pins 448B of the torque transfer mechanism 448 can be spring-loaded and function similarly as the spring-loaded pins 248B of the torque transfer mechanism 248 of the motor drive assembly 240. The torque transfer mechanism 452 and the torque transfer mechanism 472 can function the same or similarly as the torque transfer mechanism 252 and the torque transfer mechanism 272. For example, the torque transfer mechanism 452 can include a set of springs such that the set of pins 452B of the torque transfer mechanism 452 can be spring-loaded and function similarly as the spring-loaded pins 252B of the torque transfer mechanism 252 of the motor drive assembly 240.

As shown in FIGS. 33-36, the fluid delivery assembly 430 includes a fluid manifold 499 defining flow channels between various components of the fluid delivery assembly 430. The fluid manifold 499 can be, for example, a one or two piece injection molded component to which other components interface. The fluid manifold 499 can define ports configured to mate with each of the inlet tubing 433A, the patient fluid tubing 433B, and the recirculation tubing 433C. The fluid manifold 499 can define a flow channel fluidically coupling the inlet tubing 433A to the pre-pump air detection portion 474A, and a flow channel fluidically coupling the pre-pump air detection portion 474A to the pump 431 via the two sets of one or more fluid pump inlet openings 4311 (which can be defined through a wall of the fluid manifold 499). The fluid manifold 499 can define a flow channel fluidically coupling the outlets 4310 of the pump 431 (which can each optionally include one or more valves such as an umbrella valve to prevent fluid from being drawn into the pump 431 via the outlets 4310) to the inlet 432I of the warmer 432. The fluid manifold 499 can define a flow channel fluidically coupling the outlet 4320 of the warmer 432 to the post-pump air detection portion 474B and a flow channel fluidically coupling the outlet of the warmer 432 to the recirculation tubing 433C. The flexible diaphragm 456D can be disposed along the flow path downstream from the outlet of the warmer 432 (e.g., at an intersection or branching of the flow channels from the outlet of the warmer 432 to the post-pump air detection portion 474B and the recirculation tubing 433C). The fluid manifold 499 can define a flow channel from the post-pump air detection portion 474B to the patient fluid tubing 433B. In some embodiments, each of the flow channels defined by the fluid manifold 499 can be at least partially disposed in a common plane.

Figure 36:
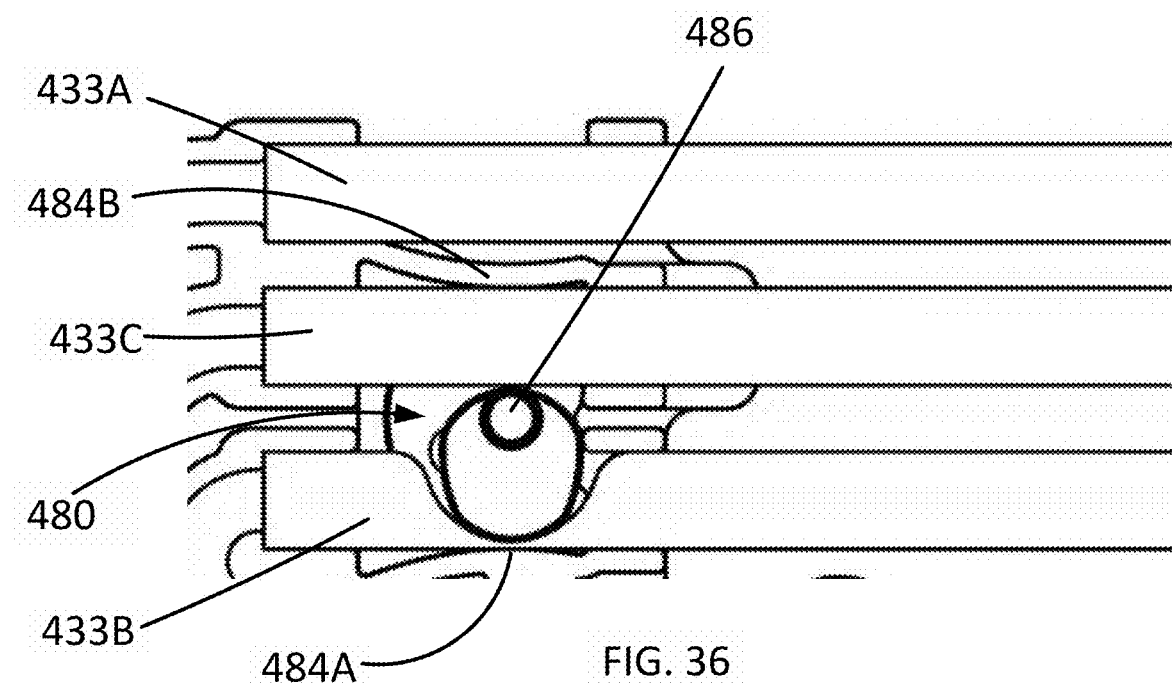
Figure 37:
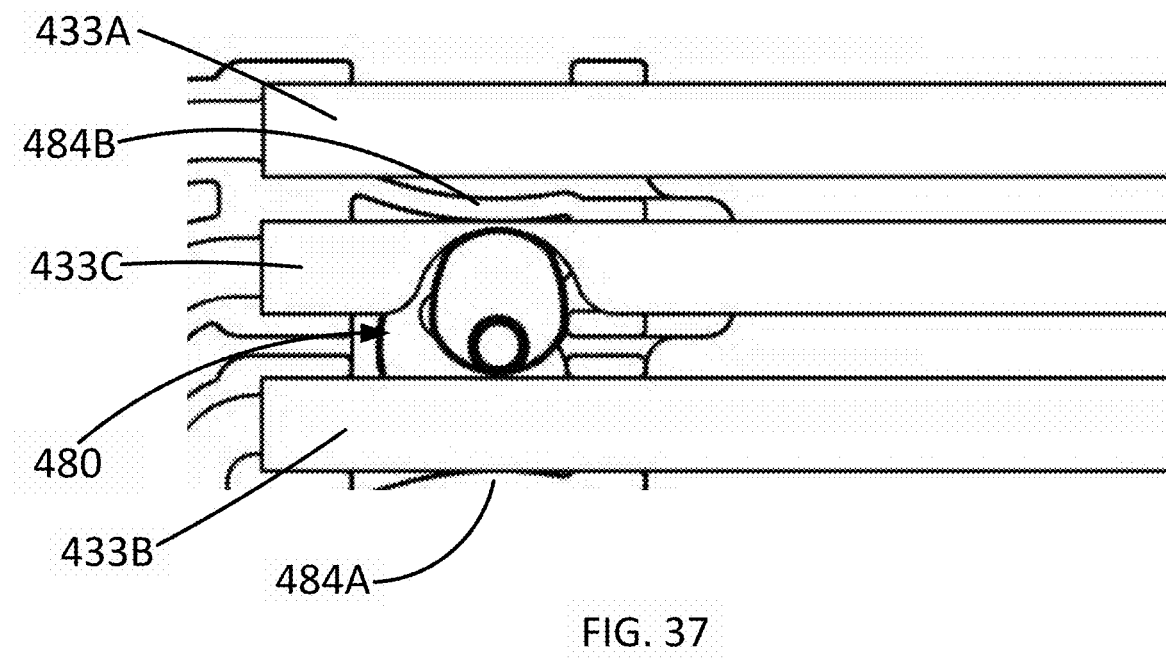

Depending on whether air is sensed in the pre-pump air detection portion 474A and/or the post-pump air detection portion 474B by the air sensors 454 of the motor drive assembly 440, the torque transfer mechanism 472 can be rotated similarly as described with respect to other embodiments herein to cause either the patient fluid tubing 433B or the recirculation tubing 433C to be selectively occluded by the clamping device 480 (also referred to as a cam) and to allow fluid flow through the other of the patient fluid tubing 433B or the recirculation tubing 433C. For example, FIGS. 36 and 37 are schematic illustrations of the clamping device 480 in a first configuration and a second configuration relative to the fluid delivery assembly 430. As shown in FIGS. 36 and 37, a pair of pinching surfaces 484 can be included in the fluid delivery assembly 430 (e.g., included or formed within the fluid manifold 499) and disposed relative to the patient fluid tubing 433B and the recirculation tubing 433C and relative to the clamping device 480 such that the clamping device 480 can selectively clamp the patient fluid tubing 433B against the first pinching surface 484A and clamp the recirculation tubing 433C against the second pinching surface 484B. In the first configuration of the clamping device 480 shown in FIG. 36, the clamping device 480 compresses the patient fluid tubing 433B against the first pinching surface 484A to occlude the patient fluid tubing 433B and fluid is allowed to flow through the recirculation tubing 433C. In the second configuration of the clamping device 480 shown in FIG. 37, the clamping device 480 compresses the recirculation tubing 433C against the second pinching surface 484B to occlude the recirculation tubing 433C and fluid is allowed to flow through the patient fluid tubing 433B.

The clamping device 480 can transition between the first and second configuration via rotating (e.g., 180 degrees) about an axis through rotational shaft 486. The rotational shaft 486 can be engaged, for example, with a recess of a housing portion of the fluid delivery assembly 430 configured to receive the rotational shaft 486 (which can optionally be formed as a projection from the cam portion of the device 480). As shown in FIGS. 36 and 37, the cam portion of the device 480 can have a non-circular perimeter. The clamping device 480 can be coupled to the torque transfer mechanism 472 such that rotation of the torque transfer mechanism 472 causes rotation of the clamping device 480 between the first configuration and the second configuration (e.g., about the axis through the shaft 486). Thus, a pump motor of the motor drive assembly 440 can operate to control rotation of the clamping device 480 between the first and second configurations (e.g., under the control of a controller of the motor drive assembly 440 in response to data provided by one or more air sensors 454 of the motor drive assembly 440).

Figure 40:
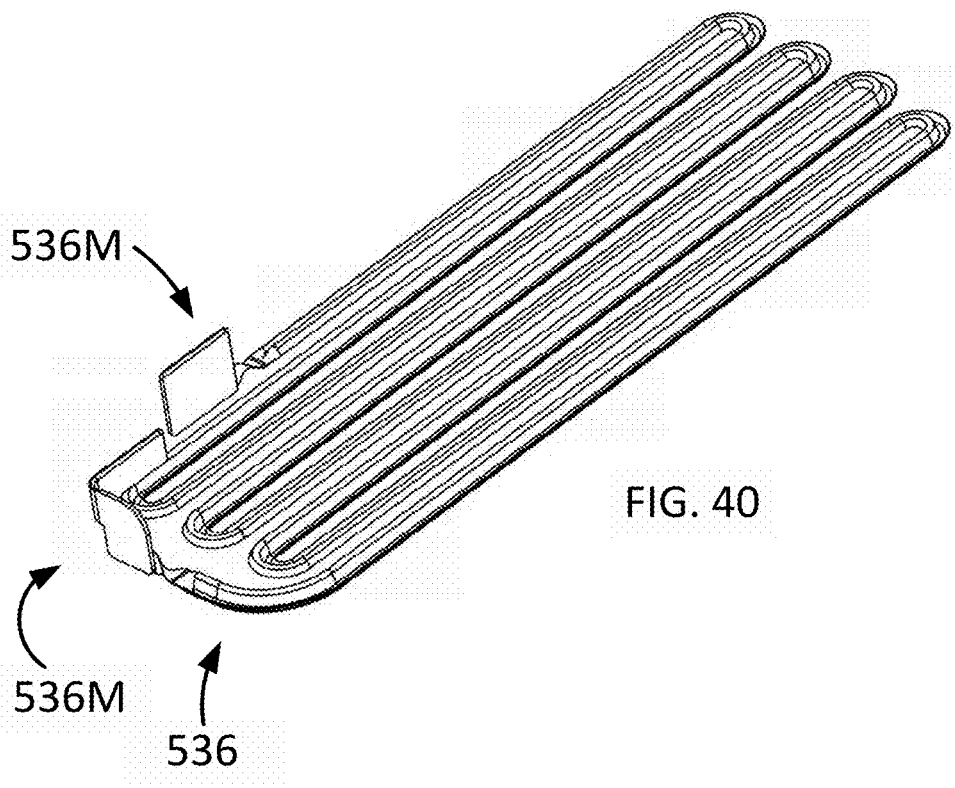
FIGS. 40-42 are various views of an elongated heating element and associated components, according to an embodiment.
Figure 41:
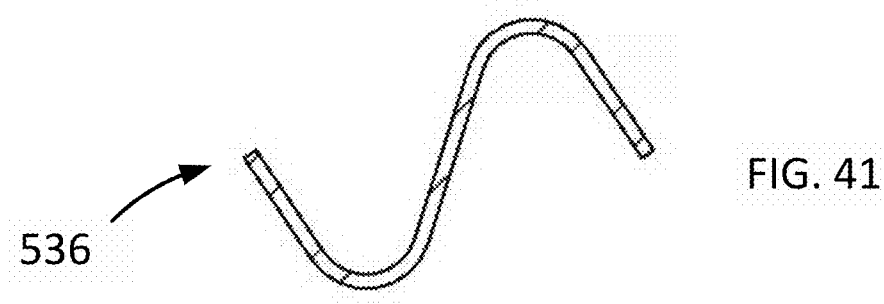

In some embodiments, rather than an elongated heating element having a planar configuration as described with respect to the elongated heating element 436, a warmer such as any of the warmers described herein can include elongated segments and curved segments each having a contoured cross-section. For example, as shown in FIG. 40, the elongated heating element 536 can have a contoured cross-section at any location along the length of the serpentine elongated heating element 536 between a first end and a second end of the elongated heating element 536. FIG. 41 is an illustration of the contoured cross-sectional shape of the elongated heating element 536 shown in FIG. 40. As shown in FIG. 41, the shape can be sinusoidal. In some embodiments, the contoured shape of the elongated heating element 536 can have a larger surface area for contact with fluid traveling through a fluid passageway of a warmer (e.g., the warmer 432). In some embodiments, the contoured shape can be associated with increased structural strength of the elongated heating element 536 such that fewer supports are needed within the fluid passageway to maintain a position of the elongated heating element 536 within the passageway (e.g., away from passageway walls) compared to a non-contoured elongated heating element (e.g., elongated heating element 436). For example, in some embodiments, the elongated heating element 536 can be supported by projections or supports of a housing of a warmer that extend into the fluid passageway and contact the elongated heating element 536 in the regions of the curved segments, without any supports needed to maintain the elongated segments in place within the fluid passageway. In some embodiments, the fluid passageway within which the elongated heating element 536 is disposed can have a circular cross-section.

Figure 42:
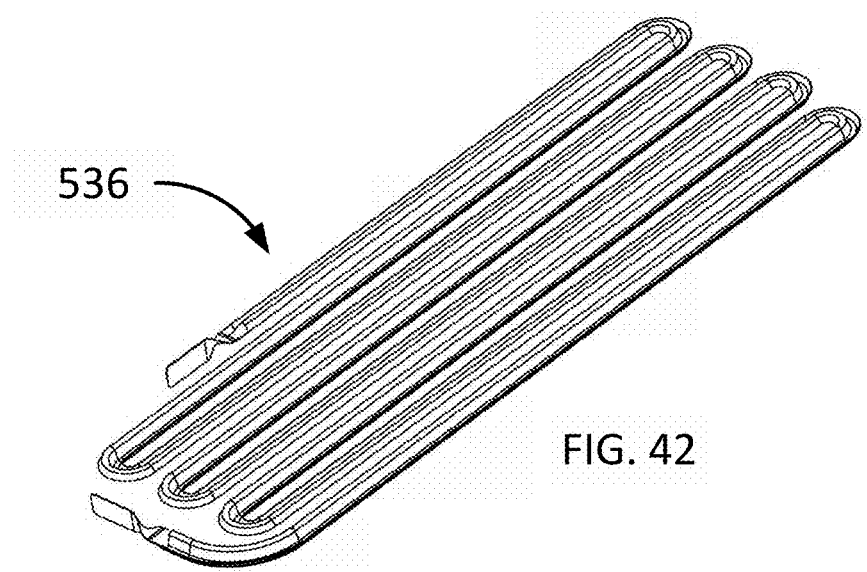

As shown in FIG. 40, conductive members 536M, which can be the same or similar in structure and/or function to the conductive members 436M, can be coupled to the first end and the second end of the elongated heating element 536. FIG. 42 is a perspective view of the elongated heating element 536 without the conductive member 536M coupled to the first and second end of the elongated heating element 536.

Figure 45:
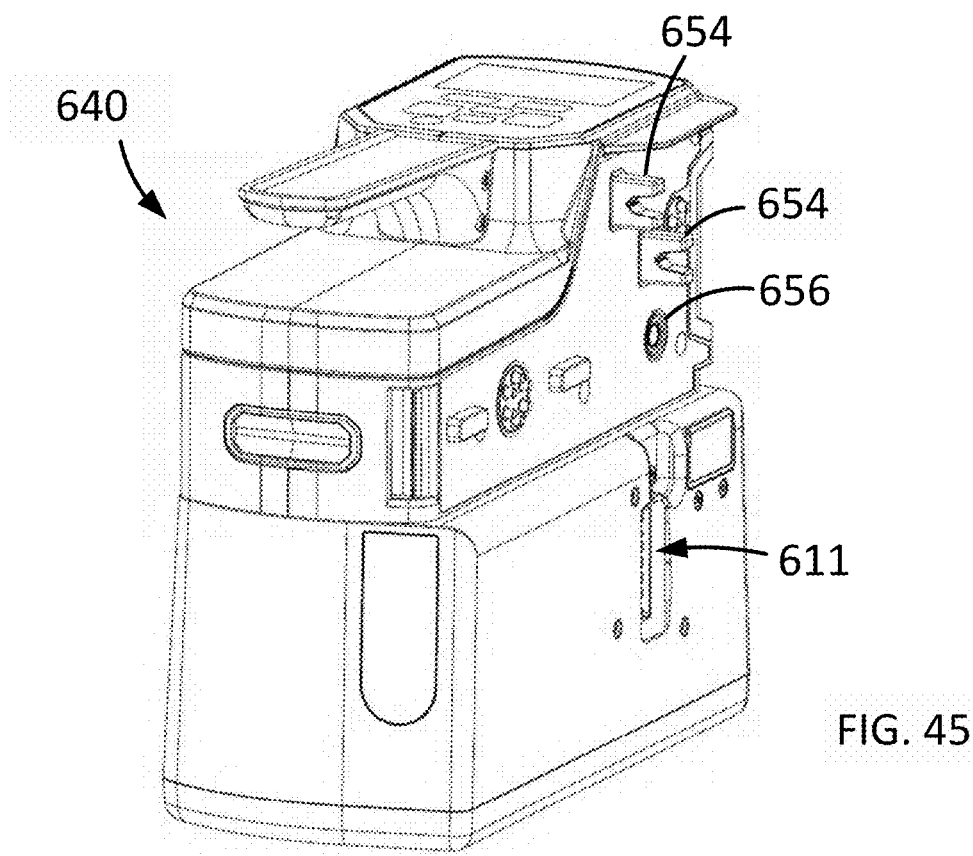
Figure 46:
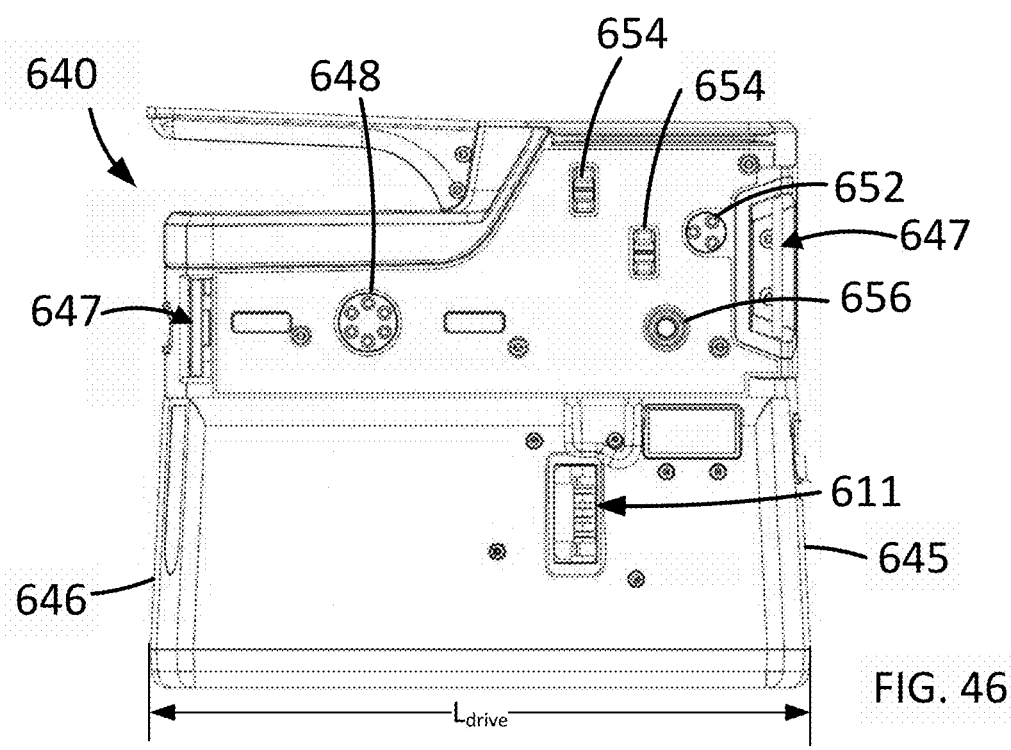

In some embodiments, the fluid delivery assembly and the motor drive assembly can be configured to be coupled or locked together with a lower amount of force, such as, for example, less than about 5 lbs. of force applied by a user, while still securing contact between components thereof during use of the coupled system. For example, in some embodiments, rather than a system, such as the system 400, including a pair of retention mechanisms 437 formed as similar latches configured to removably couple a fluid delivery assembly to a motor drive assembly, a system, such as any of the systems described herein, can be configured to removably couple a fluid delivery assembly to a motor drive assembly via a retention mechanism that simplifies initial engagement and coupling therebetween with reduced or minimal force, and/or that can retain components of the motor drive assembly in proper contact with components of the fluid delivery assembly after coupling and during use (e.g., despite internal pressure changes). Such a system can include a pair of retention mechanisms in which at least one retention mechanism includes or is a hook. For example, FIGS. 43-56 are schematic illustrations of a system 600 that includes a fluid delivery assembly 630 and a motor drive assembly 640. The system 600 can be the same as or include features similar in structure and/or function to any of the systems described herein, such as the system 100, the system 200, the system 300, the system 400 and/or the system 500. For example, as shown in FIGS. 47-51, the system 600 includes the fluid delivery assembly 630 that includes a torque transfer mechanism 660, a torque transfer mechanism 672, a fluid pump 631, a flexible diaphragm 656D that can be configured to mate with a pressure sensor 656 of the motor drive assembly 640, inlet tubing 633A, patient fluid tubing 633B, recirculation tubing 633C, and a fluid manifold 699, which can be the same as or similar to corresponding components of any system described herein, such as system 400. In another example, as shown in FIGS. 45-46, the system 600 includes the motor drive assembly 640 that includes a housing 649, a handle 649A, the torque transfer mechanism 648, the torque transfer mechanism 652, the air sensors 654, the pressure sensor 656, and alignment features 653, which can be the same as or similar to corresponding components of any system described herein, such as system 400. Accordingly, such features are not described in detail herein with respect to system 600.

The components of the fluid delivery assembly 630 are configured to interface or operatively couple with a component of the motor drive assembly 640. Thus, the associated components can be configured to interface or mate serially when the fluid delivery assembly 630 is coupled to the motor drive assembly 640. For example, in some embodiments, the fluid delivery assembly 630 can be configured to be coupled to the motor drive assembly 640 via a pivoting or rotational movement (e.g., a single pivot motion, in the direction of arrow A1 in FIG. 43). A first end 634 of the fluid delivery assembly 630 can be coupled to a first end 645 of the motor drive assembly 640, and then the fluid delivery assembly 630 can be rotated relative to the motor drive assembly 640 until a second end 635 of the fluid delivery assembly 630 is coupled to a second end 646 of the motor drive assembly (e.g., via a mating retention mechanism 637 of the fluid delivery assembly 630 and a retention portion 647 of the motor drive assembly 640, which can be similar to latch retention portion 447A of FIG. 28, that automatically securely mate due to the relative rotational contact). As described in more detail herein, such a rotational coupling movement may allow for greater mechanical force to be applied to properly operatively couple mating components of the fluid delivery assembly 630 and the motor drive assembly 640 (e.g., air sensors 654 of the motor drive assembly 640 and air detection portions of the tubing 633A and/or 633B, the pressure sensor 656 of the motor drive assembly 640 and the flexible diaphragm 656D of the fluid delivery assembly 630), while still allowing for a secure coupling of the fluid delivery assembly 630 and the motor drive assembly 640 via a single relative movement.

Figure 47:
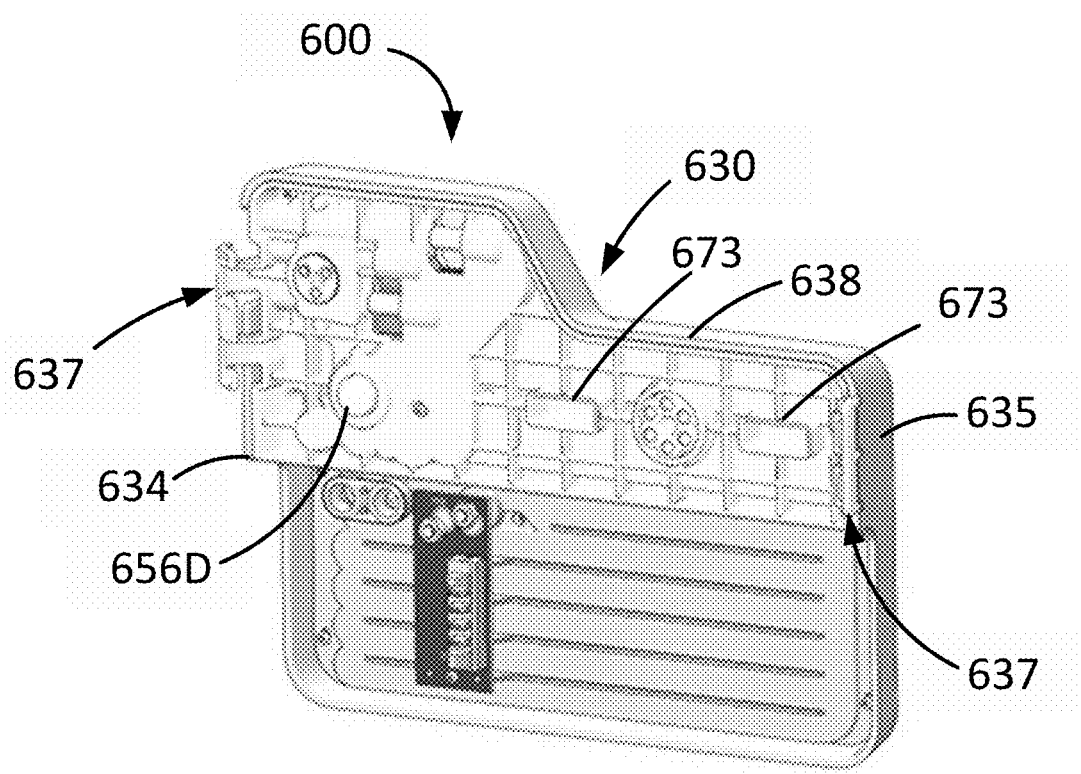
Figure 48:
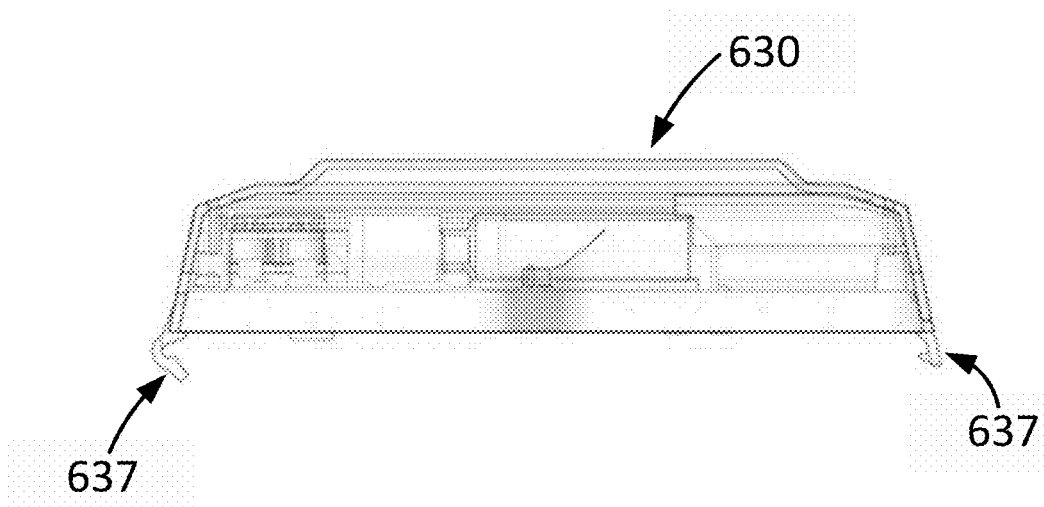

As shown in FIGS. 47-48, the retention mechanism 637 at the first end 634 of the fluid delivery assembly 630 can include a hook that defines a channel configured to at least partially receive or otherwise be at least partially disposed around the retention portion 647 (e.g., a rod, bar, dowel, or the like) of the motor drive assembly 640. The hook of the retention mechanism 637 can be extended from a housing 638 of the fluid delivery assembly 630, for example by a pair of parallel bars with an opening therebetween, as shown in FIG. 47. In some embodiments, the hook optionally includes multiple free end segments that are spaced apart from each other. The shape of the hook of the retention mechanism 637, and the channel in particular, provides a distinct point of initial engagement for the retention portion of the motor drive assembly 640, which enables a user to more easily achieve an initial engagement between the fluid delivery assembly 630 and the retention portion 647 of the motor drive assembly 640. In particular, the hook shape helps to guide the retention portion 647 of the motor drive assembly 640 into the hook. When the retention portion 647 is received in the hook, the motor drive assembly 640 and the fluid delivery assembly 630 can pivot or rotate with respect to each other.

Figure 43:
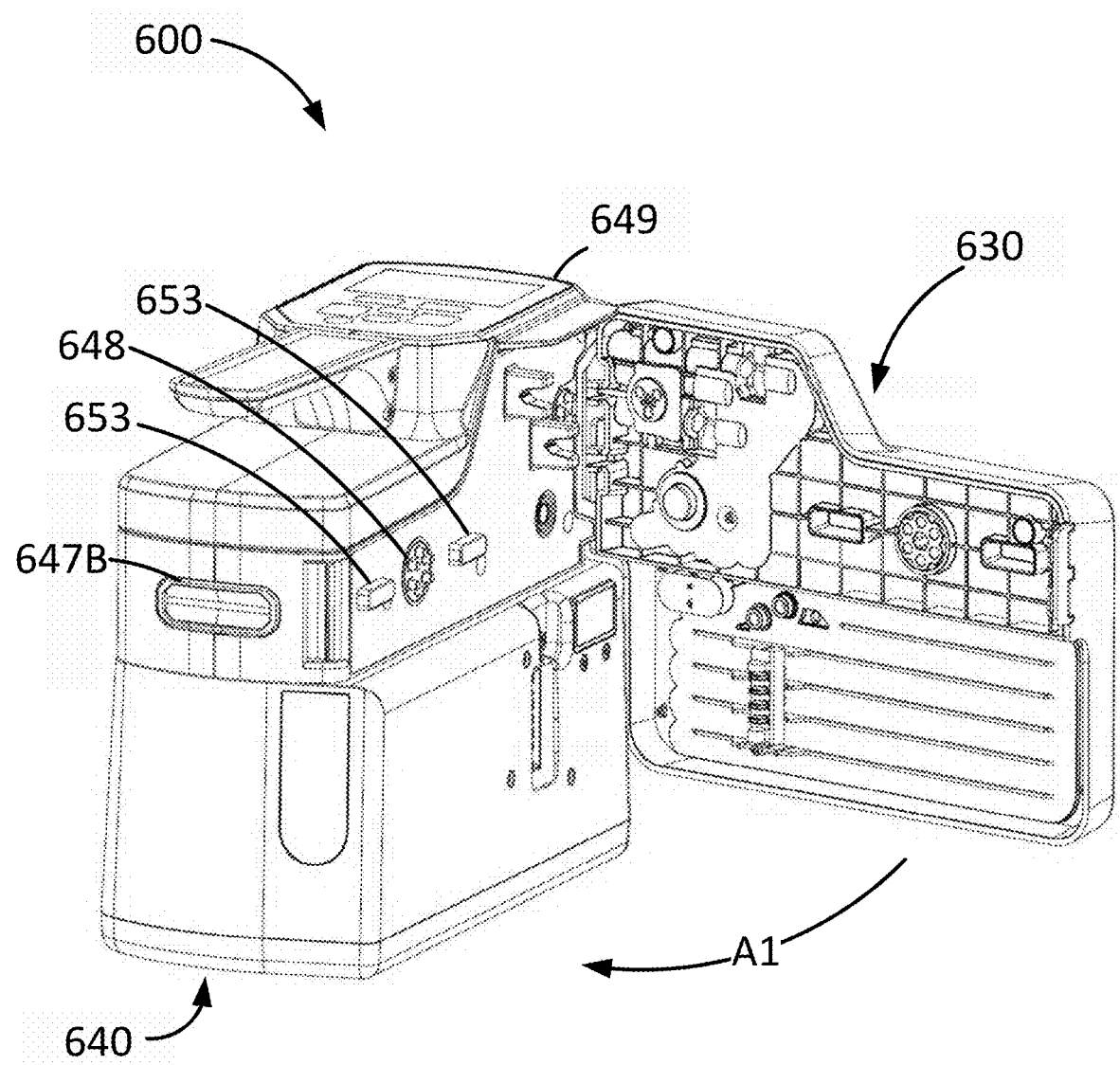
FIGS. 43-56 are various views of schematic illustrations of implementations of a system 600 and components thereof, according to an embodiment.
Figure 44:
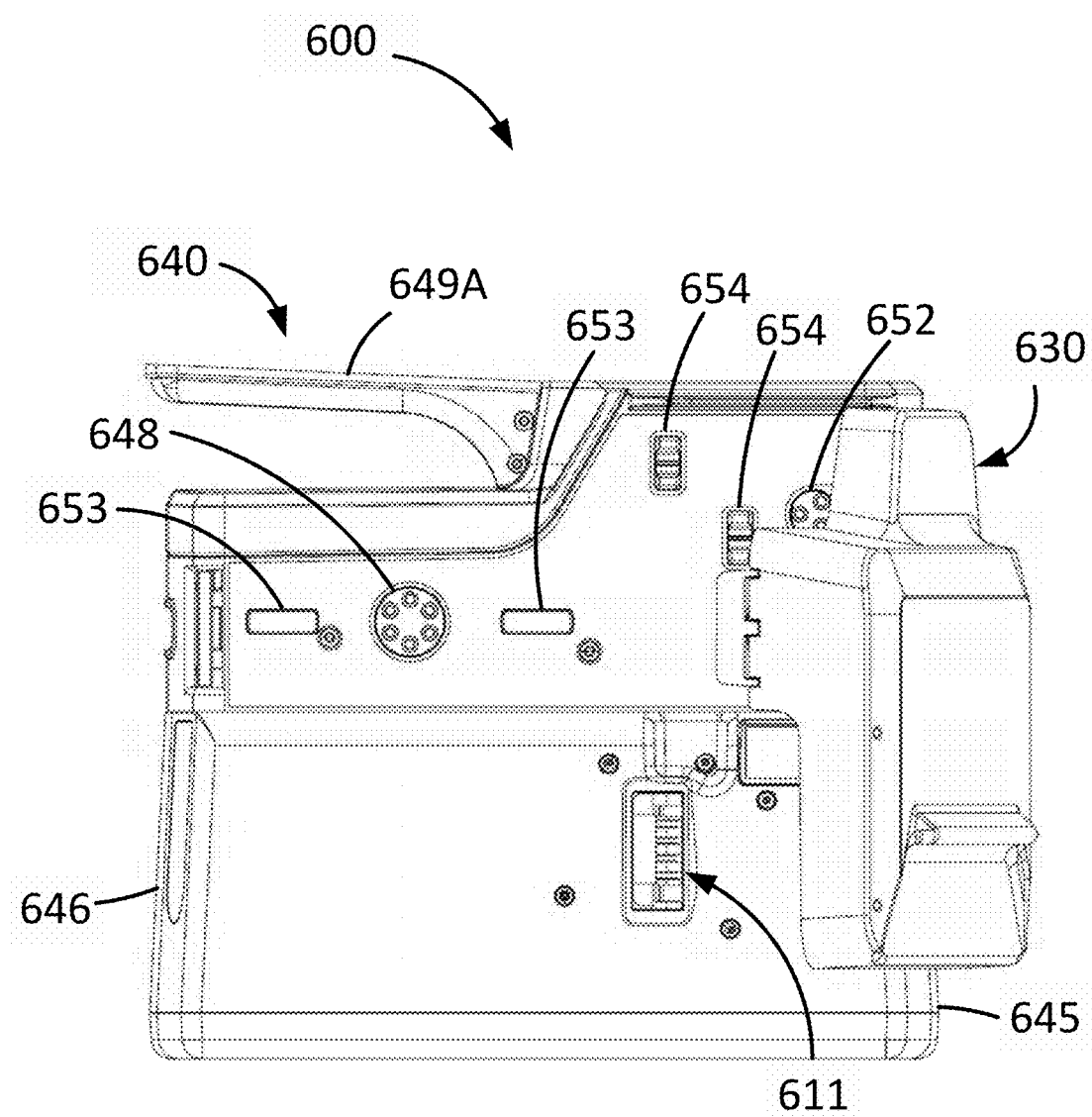

After the retention portion 647 of the motor drive assembly 640 is received in the hook of the fluid delivery assembly 630, the fluid delivery assembly 630 is pivoted or rotated about the retention portion and with respect to the motor drive assembly (e.g., in the direction of arrow A1, as shown in FIG. 43) until the retention mechanism 637 at the second end 635 of the fluid delivery assembly 630 is engaged with the latch retention portion 647 of the motor drive assembly (which can be disposed at the second end 646 of the motor drive assembly 640 opposite the first end 645 of the motor drive assembly) and secures the fluid delivery assembly 630 to the motor drive assembly 640. In use, rotation of the fluid delivery assembly 630 with respect to the motor drive assembly 640 after the retention portion 647 is received in the hook can help to vertically align the fluid delivery assembly 630 with respect to the motor drive assembly 640. As such, the hook and the retention portion collectively align the fluid delivery assembly 630 with the motor drive assembly 640 (and a warmer module thereof) along both the X axis and the Y axis. In this manner, the alignment features 653 of the motor driver assembly 640 can be received in alignment features 673 (e.g., recesses) defined by an outer surface of the housing 638 of the fluid delivery assembly 630. The retention mechanism 637 at the second end 635 of the fluid delivery assembly 630 can be a tapered latch feature, e.g., with a toothed free end, similar to the retention mechanism 437 described herein.

The retention mechanism 637 can be configured to be removed from the motor drive assembly 640 by any suitable release mechanism described herein, e.g., with respect to retention mechanism 437 or another retention mechanism described herein. For example, the motor drive assembly 440 can include a latch release 647B (see, e.g., FIG. 43) at the second end 646 of the motor drive assembly 640. The latch retention portion 647 is configured to releasably engage with the retention mechanism (e.g., latch) 637 of the fluid delivery assembly 630 and the engagement is configured to be released via depression of the latch release 647B. The fluid delivery assembly 630 can then be pivoted from the motor drive assembly 640 (e.g. in a direction opposite arrow A1 of FIG. 43), thereby separating the second end 635 of the fluid delivery assembly 630 from the second end 646 of the motor drive assembly 640. When the second end 635 of the fluid delivery assembly 630 from the second end 646 of the motor drive assembly 640 are separated by a sufficient distance, the retention mechanism 637 at the first end 634 of the fluid delivery assembly 630 can be separated from being disposed about the retention portion (e.g., rod) at the first end 645 of the motor drive assembly 640, allowing the fluid delivery assembly 630 to be fully uncoupled from the motor drive assembly 640.

Figure 49:
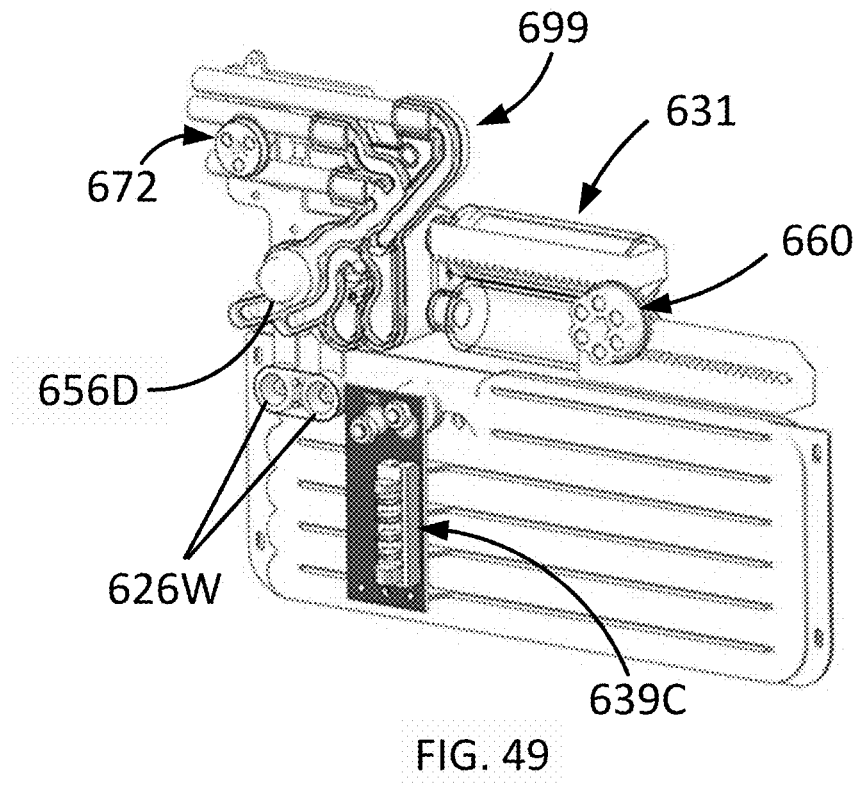
Figure 50:
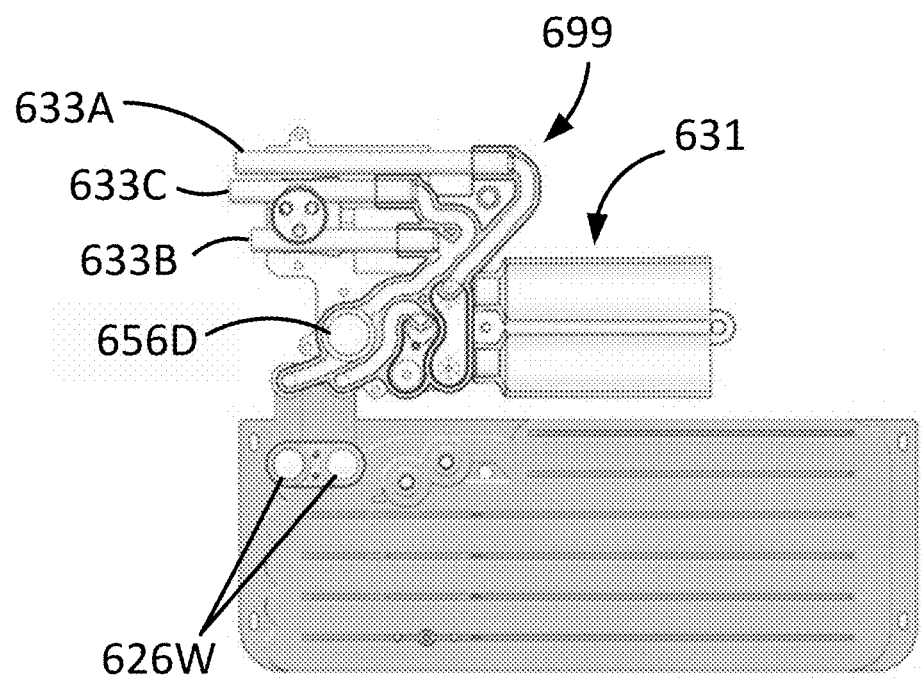

The system 600 can optionally include one or more air sensors and tubing with air detection portions that are configured differently than those of the system 400, which is shown and described as including a fluid delivery assembly 430 that includes distinct air detection portions 474 that are fluidically coupled to the inlet tubing 433A and the patient fluid tubing 433B and that project away from the housing 438. More specifically, in system 600, one or more air sensors 654 of the drive assembly 640 can be aligned with and configured to sense the presence of air within inlet tubing and/or patient fluid tubing directly. For example, as shown in FIG. 45, the motor drive assembly 640 includes one or more air sensors 654 that extent from an external surface of the drive assembly 640. Referring to FIGS. 49-50, the fluid delivery assembly 630 includes inlet tubing 633A and patient fluid tubing 633B with which the air sensor(s) 654 of the drive assembly 640 can be aligned and within which the air sensor(s) 654 can sense the presence of air. In other words, any air detection portion(s) can be integral with the inlet tubing 633A and the patient fluid tubing 633B, respectively. In this manner, manufacturing of the fluid delivery assembly 630 can be improved because the number of components is reduced and manufacturing challenges may be minimized by elimination of curved or U-shaped air detection portions. Reliability can also be improved, because straight tubing can engage better with the air sensor(s) in comparison to curved tubing sections, the potential for leaks at tubing connections is reduced, and the potential for deformation of the curved or U-shaped sections during use is eliminated.

Figure 52:
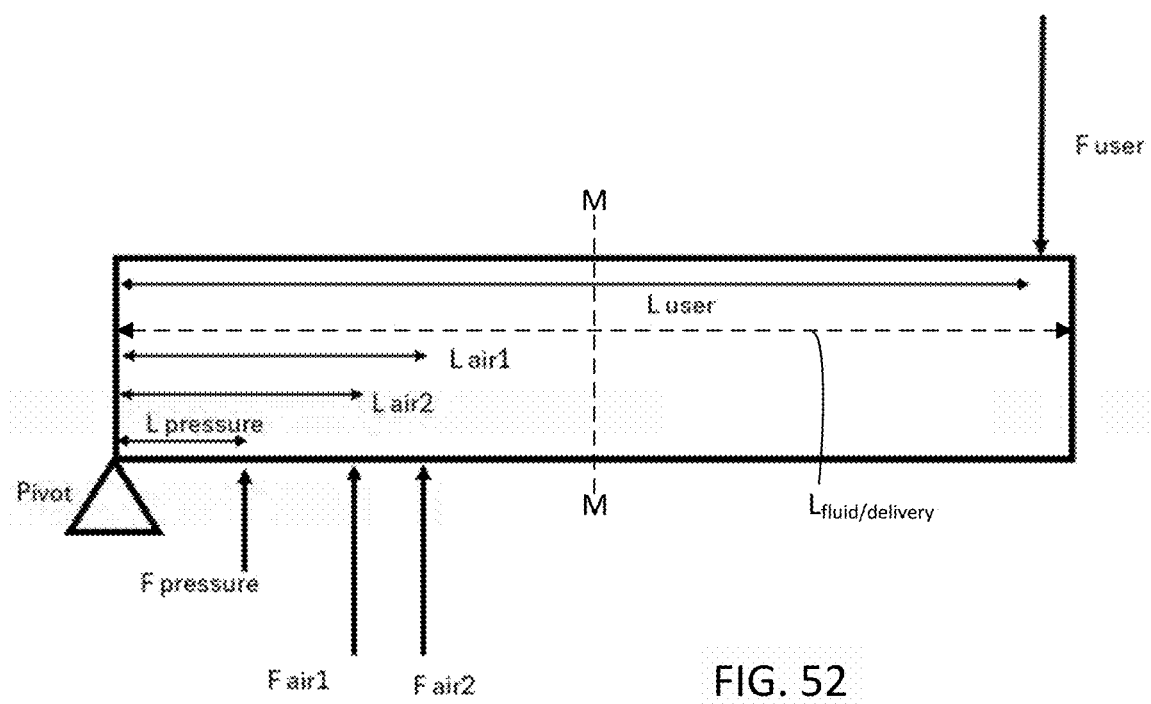

The position or location of various components of the system with respect to the pivot point engagement between the fluid delivery assembly 630 and the motor drive assembly 640 can be configured to utilize the mechanical advantage of the rotational coupling movement to ensure a sufficient force can be produced between engaging components with a lower force applied by the user. A predetermined amount of force can be needed to engage the tubing (i.e., each of inlet tubing 433A and the patient fluid tubing 433B) with the respective air sensor 654 of the drive assembly 640. In some embodiments, the predetermined amount of force (F) needed to engage the tubing with the respect air sensor 654 is within the range of about 0.1 lb. to about 1 lbs of force. In some implementations, the system 600 can be configured for the pressure diaphragm 656D to apply a predetermined amount of force (e.g., about 1 lb. to about 5 lbs. of force) against the pressure sensor 656 of the drive assembly when the fluid delivery assembly 630 is coupled to the motor drive assembly 640, but prior to use of the system 600 for fluid delivery (also referred to as a pre-load force). As such, in the system 600, components of each of the fluid delivery assembly 630 and the motor drive assembly 640 can be positioned close to the pivot point engagement between the fluid delivery assembly and the motor drive assembly to take utilize the mechanical advantage of the rotational coupling movement to achieve the foregoing application of forces in response to coupling the fluid delivery assembly to the motor drive assembly. Referring to FIG. 52, resolving forces can be characterized as:

$$(F_{user})(L_{user}) = (F_{pressure})(L_{pressure}) + (F_{air1})(L_{air1}) + (F_{air2})(L_{air2})$$

In other words, the force applied by the user, or user force, can be minimized by maximizing its relative value compared to (1) the distance ($L_{pressure}$) between the pressure sensor 656 and pressure diaphragm 656D, collectively, and the pivot point of engagement (referenced as Pivot in FIG. 52) at rod of the retention portion 647 and hook of the retention mechanism 637, (2) the distance ($L_{air1}$) between a first air sensor 654 and the pivot point of engagement, and (3) the distance ($L_{air2}$) between a second air sensor 654 and the pivot point of engagement. The table below provides example of approximate suitable ranges for each of the above values:

TABLE 1

| | |
|---|---|
| $F_{user}$ | <5 lbs |
| $F_{pressure}$ | 1-5 lbs |
| $F_{air1}$ | 0.1-1 lb |
| $F_{air2}$ | 0.1-1 lb |
| $L_{sensors}/L_{user}$ | 0.1-0.5 |

In Table 1, $L_{sensors}$ can represent moment arms for all three points of engagement between the fluid delivery assembly 630 and the motor drive assembly 640 (i.e., at the air sensors 654 and pressure sensor 656).

The motor drive assembly 640 can have a length $L_{drive}$ (see, e.g., FIG. 46) between the first end 645 of the motor drive assembly 640 and the second end 646 of the motor drive assembly 640. The one or more air sensors 654 and the pressure sensor 656, and optionally a warmer assembly electrical connection 611 (discussed below), can each be positioned with respect to the motor drive assembly 640 at no more than 50% of the length $L_{drive}$ away from the first end 645 of the motor drive assembly (or away from the pivot connection). The fluid delivery assembly 630 can have a length $L_{fluid}$ (see, e.g., FIG. 51 and FIG. 52) between the first end 634 of the fluid delivery assembly 630 and the second end 635 of the fluid delivery assembly 630. The air detection portions of the tubing 633A and tubing 633B, respectively, the pressure diaphragm 656D, and optionally an electrical connection 639C of the fluid delivery assembly 630 (discussed below) can each be positioned with respect to the fluid delivery assembly 630 at no more than 50% of the length $L_{fluid}$ away from the first end 634 of the fluid delivery assembly 630 (or away from the pivot connection). In FIG. 52, dashed line M-M represents a midline of the length of the fluid delivery assembly and/or a midline of the length of the motor drive assembly (the lengths collectively referenced as $L_{fluid/delivery}$ in FIG. 52), and shows the air detection portions and the pressure diaphragm of the fluid delivery assembly being disposed to one side of the midline (e.g., less than about 50% of the length of the fluid delivery assembly) and also shows the air sensors and pressure sensors of the motor drive assembly being disposed to the one side of the midline (e.g., less than about 50% of the length of the respective assembly). The lengths of the fluid delivery assembly and the motor drive assembly are schematically shown in FIG. 52 as being the same for the purpose of simplifying illustration, however, their respective lengths can differ. Similarly, the fluid delivery assembly and the motor drive assembly are schematically shown in FIG. 52 as having a common midline represented by line M-M, however, the midline of the length of the fluid delivery assembly can be offset from the midline of the length of the motor drive assembly. In some implementations, the one or more air sensors 654 and the pressure sensor 656, and optionally the electrical connection 611, can each be positioned with respect to the motor drive assembly 640 at no more than about one-third (⅓ or 33%) of the length $L_{drive}$ away from the first end 645 of the motor drive assembly (or away from the pivot connection), and/or the air detection portions of the tubing 633A and tubing 633B, the pressure diaphragm 656D, and optionally the electrical connection 639C of the fluid delivery assembly 630 can each be positioned with respect to the fluid delivery assembly 630 at no more than about one-third (⅓ or 33%) of the length $L_{fluid}$ away from the first end 634 of the fluid delivery assembly 630 (or away from the pivot connection). In some implementations, the system 600 is configured with the following approximate lengths:

TABLE 2

| | |
|---|---|
| $L_{latch}$ ($L_{user}$ assumed to be same) | 8" |
| $L_{pressure}$ | 1.5" |
| $L_{air1}$ | 1.8" |
| $L_{air2}$ | 2.6" |

The system 600 can also be configured such that, in use, the fluid delivery assembly 630 remains securely coupled to the motor drive assembly such that engaged components therebetween remain in contact, even in the presence of forces generated during use of the system 600. In particular, during use, the pressure diaphragm 656D is pressurized and can produce a force that would otherwise have a tendency to push the fluid delivery assembly 630 off of or otherwise away from (e.g., in a direction opposite the rotational direction of movement for coupling) the motor drive assembly 640. The force produced by the pressure diaphragm 656D can be calculated as follows: $F=((\pi d^2)/4)(P)$, where P=pressure on the pressure diaphragm 656D and d=diameter of the pressure diaphragm 656D. The retention mechanism 637 (or latch) at the second end of the fluid delivery assembly 630 can be configured to withstand such force produced by the pressure diaphragm 656D during use. Pressure on the pressure diaphragm 656D during use can be, for example, up to 40 psi. The pressure diaphragm 656D can have a diameter within the range of about 0.2 inches to about 0.75 inches. As an example, in an implementation in which the pressure diaphragm 656D has a diameter of 0.75 inches and pressure on the pressure diaphragm 656D during use is 40 psi, the pressure diaphragm 656D can produce about 17.6 lbs of force that would tend to separate the fluid delivery assembly 630 from the motor drive assembly 640 if the retention mechanism 637 were not coupled to the latch retention portion 647 and the retention mechanism 637 were not configured to withstand such force. The force the retention mechanism 637 is configured to withstand (e.g., remain coupled to the latch retention portion 647 in a manner that properly retains the fluid delivery assembly 630 to the motor drive assembly 640) can be calculated as follows:

$$F_{latch} L_{latch} = F_{pressure} L_{pressure}$$

$$F_{latch} / F_{pressure} = L_{pressure} / L_{latch}$$

Figure 56:
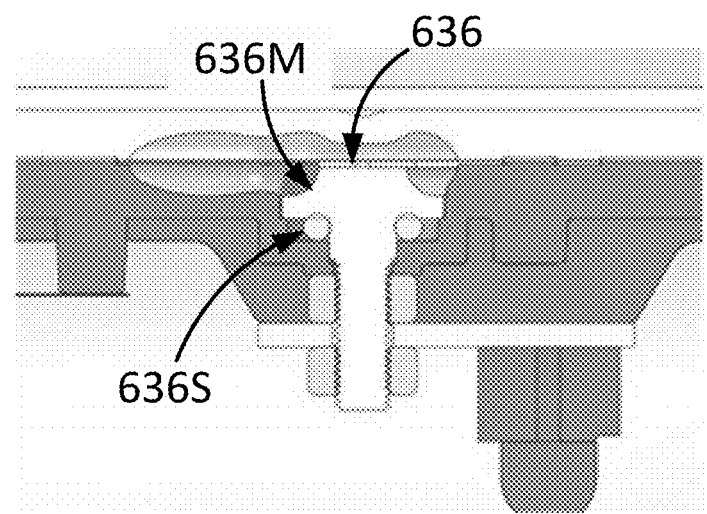

In the above formula, $L_{latch}$ can substantially equal $L_{user}$ as shown in Table 1 and FIG. 56, with an assumption that force is applied at substantially the same location as in the previous example. The smaller the ratio is between $L_{pressure}$ and $L_{latch}$, the less force the retention mechanism 637 needs to withstand relative to the force of the pressure diaphragm 656D. The retention mechanism 637 can be configured to withstand up to about 20 lbs. of force produced by the pressure diaphragm 656D during use. In some implementations, the system 600 can be configured such that any forces on the retention mechanism 637 produced during use (e.g., by the pressure diaphragm 656D) are no greater than 5 lbs.

Figure 51:
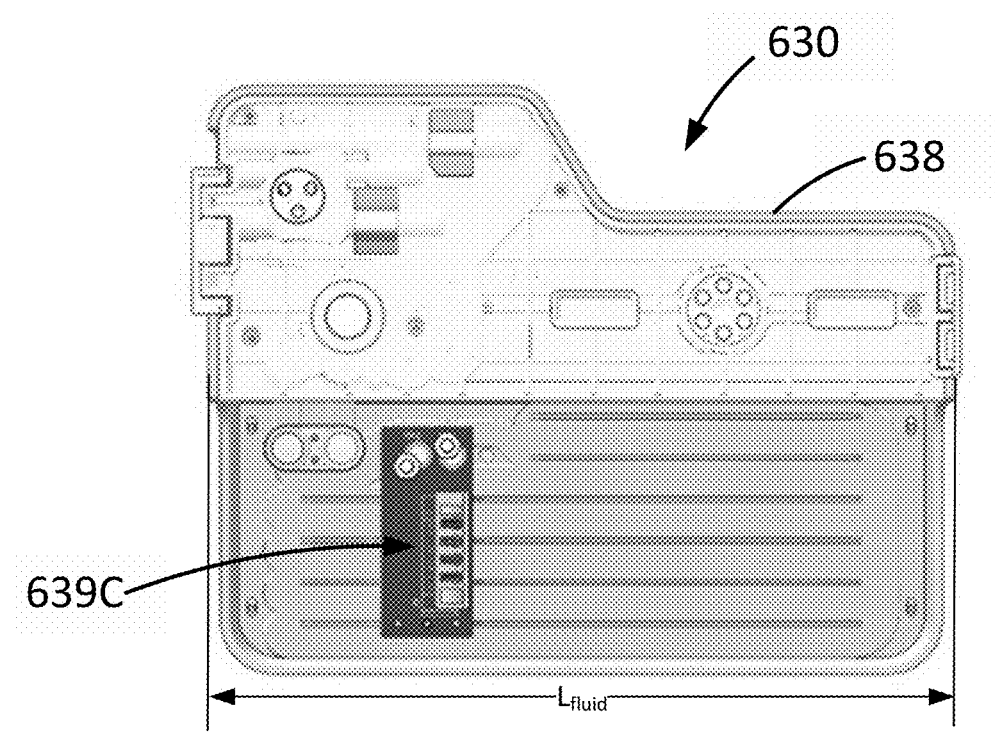

A warmer assembly 632 can be included in the fluid delivery assembly 630 and can include an electrical connection 639C configured to be coupled to an electrical connection (not shown) of the drive assembly (not shown). The warmer assembly 632 can be similar in many respects to any warmer assembly described herein, such as warmer assembly 432, and so some components and/or functions thereof are not described herein. The electrical connection 639C can include, for example, one or more "blade" style connections, similar to the electrical connection 239C shown in FIG. 10, configured to be coupled to an electrical connection of the drive assembly (not shown). As shown in FIGS. 49 and 51, the electrical connection 639C can be coupled to the housing 638 such that a length of the electrical connection 639C is disposed substantially perpendicular to substantially parallel elongated segments of an elongated heating element (or member) 636. The electrical connection 639C can be positioned with respect to the elongated heating element 636 proximate to a pair of windows 626W of the warmer assembly 632. The drive assembly 640 can include a complementary electrical connection 611 configured to be coupled to the electrical connection 639C of the fluid delivery assembly 630.

The warmer assembly 632 can include an elongated heating element 636 that can be the same or similar in structure and/or function to any of the elongated heating elements described herein (e.g., elongated heating element 436). The elongated heating element 636 can be disposed within a fluid passageway of the warmer assembly 632 such that fluid can contact the elongated heating element 636 and heat can transfer from the elongated heating element 636 to the fluid while the fluid travels through the fluid passageway.

Figure 53:
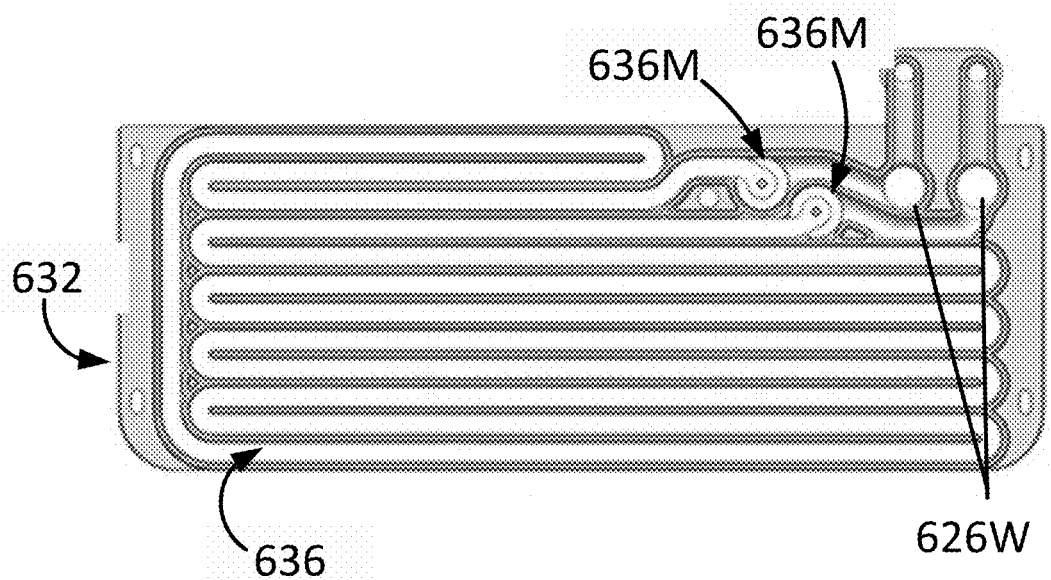
Figure 54:
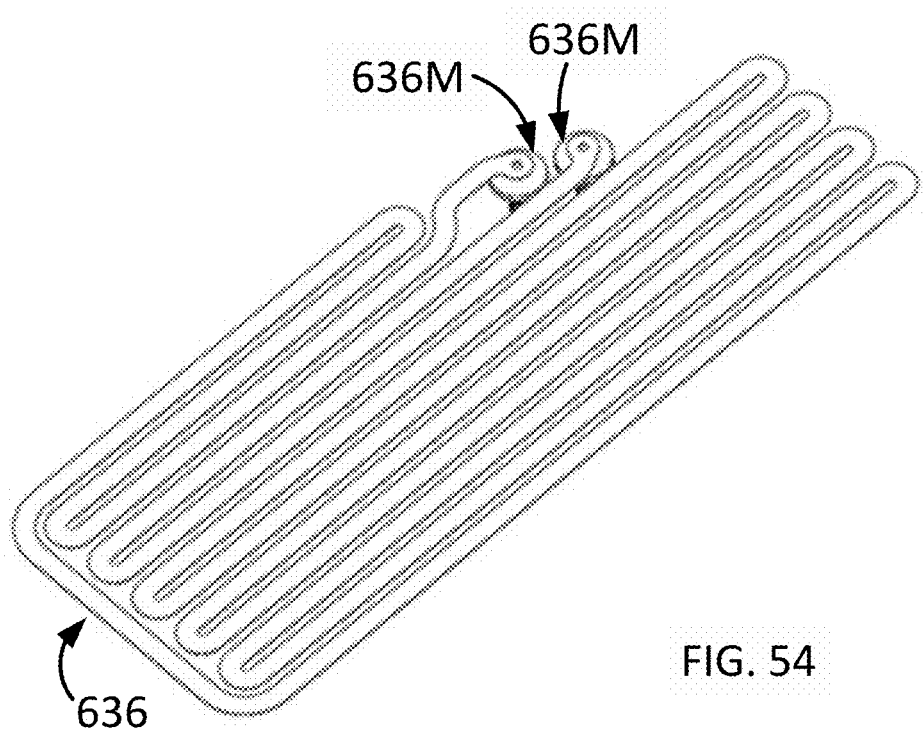
Figure 55:
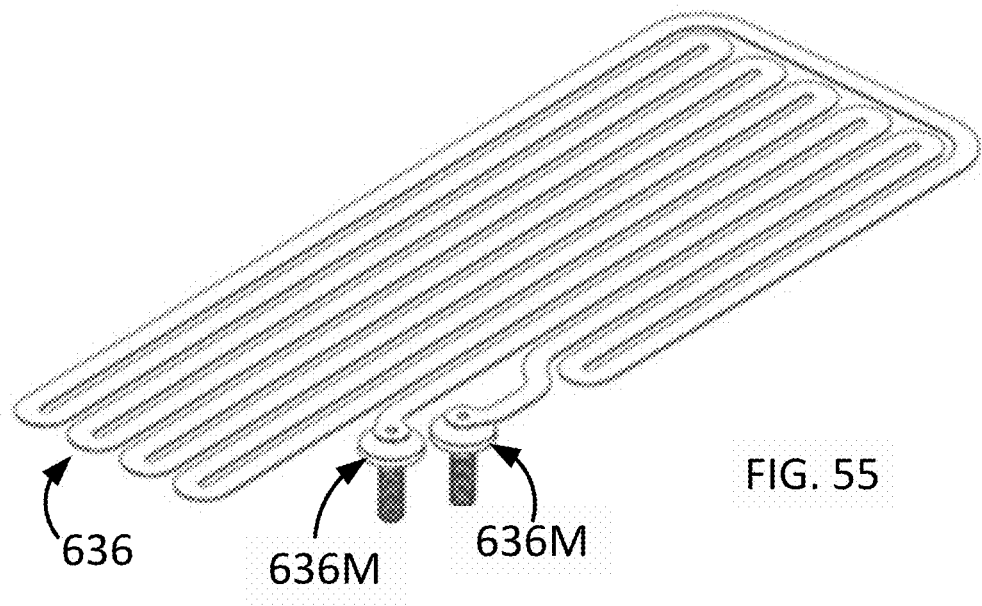

As shown in FIGS. 53-55, the elongated heating element 636 can be planar and formed as a flat ribbon. The elongated heating element 636 can be, for example, stamped out of sheet stock. In some embodiments, as shown in FIGS. 53-55, the elongated heating element 636 can include a set of elongated segments coupled to adjacent elongated segments by curved segments. An increased number of elongate segments (and therefore increased number of curved segments therebetween), for example compared to the elongated heating element 436 of FIG. 38, provides for an increased surface area to which to the fluid is exposed while the fluid travels through the fluid passageway, thereby increasing the amount of heat transfer. The elongated heating element 636 can include any suitable number of elongated segments, for example from six to 20 segments, and more specifically, eight segments (as shown in FIG. 38) or twelve segments (as shown in FIG. 53). Each of the elongated segments and the curved segments can include a first or upper surface that are all disposed in a first plane and a second or lower surface that are all disposed in a second plane parallel to the first plane. The elongated heating element 636 can have a consistent cross-section (e.g., in size and/or shape) along each elongated straight segment and/or curved segment.

The elongated heating element 636 can include a first end and a second end, and each end can be conductively coupled to a respective conductive member 636M. Each conductive member 636M can be shaped and sized to extend through openings in a housing of the warmer assembly 632 and/or the housing 638 such that each can be electrically coupled to a warmer electrical connection (not shown) of the motor drive assembly for the transfer of energy from an electrical connection to the elongated heating element 636 to heat the elongated heating element 636 via the conductive member 636M.

As shown in FIGS. 55 and 56, the conductive members 636M can be formed, for example, as a screw, and can extend (or have a male portion that extends) away from the respective ends of the elongated heating element 636 (e.g., through openings in the housing of the warmer 632 and/or the housing 638) in a direction perpendicular to the plane including the upper surface and/or the plane including the lower surface of the elongated segments and curved segments. The warmer assembly can define a threaded shaped and sized to receive a male portion of each conductive member 636M. The conductive members 636M can each include a seal 636S (e.g., and O-ring or other suitable seal). In some embodiments, the conductive members 636M can be, for example, spot-welded to the first end and the second end of the elongated heating element 636.

In some embodiments, as shown in FIG. 53, the fluid passageway of the warmer 632 can include elongated segments and curved segments of the same shape as the elongated heating element 636 and configured to receive respective elongated and curved segments of the elongated heating element 636. The cross-section of the fluid passageway can be any suitable shape, such as circular or oblong. In some embodiments, the warmer 632 includes support projections (e.g., bosses) extending from a sidewall of the fluid passageway toward the elongated heating element 636 to maintain a position of the elongated heating element 636 within the fluid passageway. The warmer 632 can include pairs of coaxial support projections that extend from the sidewall to contact opposing surfaces of the elongated heating element 636, such as at locations along the curved segments and/or the elongated straight segments. In some embodiments, the cross-sectional shape and size of the fluid passageway can be consistent from end to end along each straight segment and/or curved segment, with the exception of the projecting supports.

The warmer assembly 632 also includes the pair of windows 626W disposed near an inlet and the outlet of the fluid passageway of the warmer assembly 632 and configured to be aligned with infrared non-contact temperature sensors included in the drive assembly such that the temperature sensors 426 can sense the temperature of the fluid within the fluid passageway at the locations associated with the windows 626W.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. For example, although the fluid delivery assembly 230 is shown and described herein as including a pair of retention mechanisms 237 formed as latches, in some embodiments, the fluid delivery assembly can include a retention mechanism formed as a hook like that of fluid delivery assembly 630, or vice versa. In another example, although the conductive members 436M of elongated heating element 436 are shown formed as "flags", in some embodiments, the conductive members 436M can be formed as a screw, similar to conductive member 636M, or vice versa.

Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

The invention claimed is:

1. A system, comprising:
a motor drive assembly including a pump motor, a first torque transmission mechanism operably coupled to and rotatable by the pump motor, a recirculation motor, and a second torque transmission mechanism operably coupled to and rotatable by the recirculation motor, the first torque transmission mechanism and the second torque transmission mechanism forming a portion of an exterior surface of the motor drive assembly; and
a fluid delivery assembly including a fluid pump, a first torque receiving mechanism operably coupled to the fluid pump such that rotation of the first torque receiving mechanism causes the fluid pump to dispense fluid, a valve, and a second torque receiving mechanism operably coupled to the valve such that rotation of the second torque receiving mechanism causes the valve to transition between a fluid dispensing configuration and a fluid recirculation configuration, the first torque receiving mechanism and the second torque receiving mechanism forming a portion of an exterior surface of the fluid delivery assembly, the fluid delivery assembly configured to be removably coupled to the motor drive assembly such that, simultaneously, the first torque transmission mechanism is coupled to the first torque receiving mechanism in a non-mating orientation and the second torque transmission mechanism is coupled to the second torque receiving mechanism, the first torque transmission mechanism being configured to mate with the first torque receiving mechanism such that rotation of the first torque transmission mechanism causes rotation of the first torque receiving mechanism, the first torque transmission mechanism is configured to rotate relative to the first torque receiving mechanism from the non-mating orientation to mate with the first torque receiving mechanism while a housing of the fluid delivery assembly is coupled to a housing of the motor drive assembly, the second torque transmission mechanism being configured to mate with the second torque receiving mechanism such that rotation of the second torque transmission mechanism causes rotation of the second torque receiving mechanism.

2. The system of claim 1, wherein the first torque receiving mechanism is operably coupled to the fluid pump such that rotation of the first torque receiving mechanism causes translational movement of a plunger of the fluid pump.

3. The system of claim 2, wherein the first torque receiving mechanism is coupled to the plunger of the fluid pump via a pinion gear and a rack gear, the first torque receiving mechanism fixedly coupled to the pinion gear.

4. The system of claim 1, wherein the first torque transmission mechanism includes a first plate and a plurality of pins extending from a surface of the first plate, the first torque receiving mechanism includes a second plate defining a plurality of holes, each hole from the plurality of holes configured to receive a pin from the plurality of pins.

5. The system of claim 4, wherein the first torque transmission mechanism includes a plurality of springs, each spring from the plurality of springs disposed within a respective recess of a plurality of recesses of the first plate and configured to urge a respective pin from the plurality of pins toward an extended configuration relative to the first plate.

6. The system of claim 1, wherein the first torque transmission mechanism and the first torque receiving mechanism are configured to rotate about a common axis when the first torque transmission mechanism is removably mated with the first torque receiving mechanism.

7. The system of claim 1, wherein the motor drive assembly includes at least one air sensor and the fluid delivery assembly includes a tube having a first end and a second end, the first end couplable to a fluid source and the second end coupled to the fluid pump, the tube having at least one portion forming an exterior surface of the fluid delivery assembly and configured to be aligned with the at least one air sensor of the motor drive assembly when the motor drive assembly is coupled to the fluid delivery assembly.

8. The system of claim 7, wherein the motor drive assembly includes a controller, the controller configured to control operation of the recirculation motor to transition the valve between the fluid dispensing configuration and the fluid recirculation configuration in response to the at least one air sensor sensing a presence of air in the tube.

9. The system of claim 1, wherein:
the fluid delivery assembly includes a first retention mechanism disposed at a first end of the fluid delivery assembly and a second retention mechanism disposed at a second end of the fluid delivery assembly, the first retention mechanism including a hook defining a channel, the motor drive assembly includes a first retention portion disposed at a first end of the motor drive assembly and a second retention portion disposed at a second end of the motor drive assembly, the first retention portion including a rod configured to be at least partially disposed within the channel of the hook such that the fluid delivery assembly is rotatable with respect to the rod, the second retention portion configured to be coupled to the second retention mechanism of the fluid delivery assembly.

10. The system of claim 9, wherein:
the motor drive assembly has a length between the first end of the motor drive assembly and the second end of the motor drive assembly, the motor drive assembly including an electrical connection, an air sensor, and a pressure sensor, the electrical connection of the motor drive assembly, the air sensor and the pressure sensor each positioned with respect to the motor drive assembly at no more than 50% of the length away from the first end of the motor drive assembly, and the fluid delivery assembly has a length between the first end of the fluid delivery assembly and the second end of the fluid delivery assembly, the fluid delivery assembly including an electrical connection configured to be coupled to the electrical connection of the motor drive assembly, a tube having at least one portion forming an exterior surface of the fluid delivery assembly and configured to be aligned with the air sensor of the motor drive assembly, a pressure diaphragm configured to contact the pressure sensor of the motor drive assembly, the electrical connection of the fluid delivery assembly, the at least one portion of the tube, and the pressure diaphragm each positioned with respect to the fluid delivery assembly at no more than 50% of the length away from the first end of the fluid delivery assembly.

11. A system, comprising:
a motor drive assembly including a pump motor, a first torque transmission mechanism operably coupled to and rotatable by the pump motor, a recirculation motor, and a second torque transmission mechanism operably coupled to and rotatable by the recirculation motor, the first torque transmission mechanism and the second torque transmission mechanism forming a portion of an exterior surface of the motor drive assembly, the motor drive assembly including a first retention portion disposed at a first end of the motor drive assembly and a second retention portion disposed at a second end of the motor drive assembly, the first retention portion of the motor drive assembly including a rod, the motor drive assembly having a length between the first end of the motor drive assembly and the second end of the motor drive assembly, the motor drive assembly including an electrical connection, an air sensor, and a pressure sensor, the electrical connection of the motor drive assembly, the air sensor and the pressure sensor each positioned with respect to the motor drive assembly at no more than 50% of the length away from the first end of the motor drive assembly; and a fluid delivery assembly including a fluid pump, a first torque receiving mechanism operably coupled to the fluid pump such that rotation of the first torque receiving mechanism causes the fluid pump to dispense fluid, a valve, and a second torque receiving mechanism operably coupled to the valve such that rotation of the second torque receiving mechanism causes the valve to transition between a fluid dispensing configuration and a fluid recirculation configuration, the first torque receiving mechanism and the second torque receiving mechanism forming a portion of an exterior surface of the fluid delivery assembly, the fluid delivery assembly including a first retention mechanism disposed at a first end of the fluid delivery assembly and a second retention mechanism disposed at a second end of the fluid delivery assembly, the first retention mechanism including a hook defining a channel, the rod of the first retention portion of the motor drive assembly configured to be at least partially disposed within the channel of the hook such that the fluid delivery assembly is rotatable with respect to the rod, the second retention portion configured to be coupled to the second retention mechanism of the fluid delivery assembly, the fluid delivery assembly having a length between the first end of the fluid delivery assembly and the second end of the fluid delivery assembly, the fluid delivery assembly including an electrical connection configured to be coupled to the electrical connection of the motor drive assembly, a tube having at least one portion forming an exterior surface of the fluid delivery assembly and configured to be aligned with the air sensor of the motor drive assembly, a pressure diaphragm configured to contact the pressure sensor of the motor drive assembly, the electrical connection of the fluid delivery assembly, the at least one portion of the tube, and the pressure diaphragm each positioned with respect to the fluid delivery assembly at no more than 50% of the length away from the first end of the fluid delivery assembly, the fluid delivery assembly configured to be removably coupled to the motor drive assembly such that, simultaneously, the first torque transmission mechanism is coupled to the first torque receiving mechanism and the second torque transmission mechanism is coupled to the second torque receiving mechanism, the first torque transmission mechanism being configured to mate with the first torque receiving mechanism such that rotation of the first torque transmission mechanism causes rotation of the first torque receiving mechanism, the second torque transmission mechanism being configured to mate with the second torque receiving mechanism such that rotation of the second torque transmission mechanism causes rotation of the second torque receiving mechanism.

12. The system of claim 11, wherein the first torque receiving mechanism is operably coupled to the fluid pump such that rotation of the first torque receiving mechanism causes translational movement of a plunger of the fluid pump.

13. The system of claim 12, wherein the first torque receiving mechanism is coupled to the plunger of the fluid pump via a pinion gear and a rack gear, the first torque receiving mechanism fixedly coupled to the pinion gear.

14. The system of claim 11, wherein the first torque transmission mechanism and the first torque receiving mechanism are configured to rotate about a common axis when the first torque transmission mechanism is removably mated with the first torque receiving mechanism.

15. The system of claim 11, wherein the tube of the fluid delivery assembly has a first end and a second end, the first end couplable to a fluid source and the second end coupled to the fluid pump.

16. The system of claim 11, wherein the motor drive assembly includes a controller, the controller configured to control operation of the recirculation motor to transition the valve between the fluid dispensing configuration and the fluid recirculation configuration in response to the air sensor sensing a presence of air in the tube.

17. A system, comprising:
a motor drive assembly including a pump motor, a first torque transmission mechanism operably coupled to and rotatable by the pump motor, a recirculation motor, and a second torque transmission mechanism operably coupled to and rotatable by the recirculation motor, the first torque transmission mechanism and the second torque transmission mechanism forming a portion of an exterior surface of the motor drive assembly, the first torque transmission mechanism including a first plate, a plurality of pins extended from a surface of the first plate, and a plurality of springs, each spring from the plurality of springs disposed within a respective recess of a plurality of recesses of the first plate and configured to urge a respective pin from the plurality of pins toward an extended configuration relative to the first plate; and
a fluid delivery assembly including a fluid pump, a first torque receiving mechanism operably coupled to the fluid pump such that rotation of the first torque receiving mechanism causes the fluid pump to dispense fluid, a valve, and a second torque receiving mechanism operably coupled to the valve such that rotation of the second torque receiving mechanism causes the valve to transition between a fluid dispensing configuration and a fluid recirculation configuration, the first torque receiving mechanism and the second torque receiving mechanism forming a portion of an exterior surface of the fluid delivery assembly, the first torque receiving mechanism including a second plate defining a plurality of holes, each hole from the plurality of holes configured to receive a pin from the plurality of pins,
the fluid delivery assembly configured to be removably coupled to the motor drive assembly such that, simultaneously, the first torque transmission mechanism is coupled to the first torque receiving mechanism and the second torque transmission mechanism is coupled to the second torque receiving mechanism, the first torque transmission mechanism being configured to mate with the first torque receiving mechanism such that rotation of the first torque transmission mechanism causes rotation of the first torque receiving mechanism, the second torque transmission mechanism being configured to mate with the second torque receiving mechanism such that rotation of the second torque transmission mechanism causes rotation of the second torque receiving mechanism.

18. The system of claim 17, wherein the first torque receiving mechanism is operably coupled to the fluid pump such that rotation of the first torque receiving mechanism causes translational movement of a plunger of the fluid pump.

19. The system of claim 18, wherein the first torque receiving mechanism is coupled to the plunger of the fluid pump via a pinion gear and a rack gear, the first torque receiving mechanism fixedly coupled to the pinion gear.

20. The system of claim 17, wherein:
- the fluid delivery assembly is configured to be removably coupled to the motor drive assembly such that the first torque transmission mechanism is coupled to the first torque receiving mechanism in a non-mating orientation, and
- the first torque transmission mechanism is configured move relative to the first torque receiving mechanism from the non-mating orientation to mate with the first torque receiving mechanism while a housing of the fluid delivery assembly is coupled to a housing of the motor drive assembly.

\* \* \* \* \*